United States Patent
Bohl et al.

(10) Patent No.: US 9,835,142 B2
(45) Date of Patent: *Dec. 5, 2017

(54) BLADELESS TURBINE

(71) Applicant: Solar Logic Incorporated, Muenster, TX (US)

(72) Inventors: Gregory Bohl, Muenster, TX (US); Frank Germano, Bastrop, TX (US); Martin Dorantes, Bastrop, TX (US)

(73) Assignee: SOLAR LOGIC INCORPORATED, Muenster, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/887,312

(22) Filed: Oct. 19, 2015

(65) Prior Publication Data
US 2016/0298612 A1    Oct. 13, 2016

Related U.S. Application Data

(63) Continuation-in-part of application No. 13/808,081, filed as application No. PCT/US2011/042911 on Jul.
(Continued)

(51) Int. Cl.
*F03G 6/06* (2006.01)
*F01D 1/34* (2006.01)
(Continued)

(52) U.S. Cl.
CPC .............. *F03G 6/065* (2013.01); *F01D 1/34* (2013.01); *F01D 1/36* (2013.01); *F01D 15/10* (2013.01);
(Continued)

(58) Field of Classification Search
CPC . F03G 6/065; F03G 6/04; F03G 6/068; F03G 2006/061; F01D 1/34; F01D 1/36; F01D 15/10; H02K 7/1823
(Continued)

(56) References Cited

U.S. PATENT DOCUMENTS 2,598,678 A   6/1952   Dennis
2,954,157 A   9/1960   Eckberg
(Continued)

FOREIGN PATENT DOCUMENTS

CN   2442188 Y    8/2001
CN   201091064 Y  7/2008
(Continued)

OTHER PUBLICATIONS

Extended Search Report 10817863.3 dated Nov. 3, 2016, 7 pp.
(Continued)

*Primary Examiner* — Hoang Nguyen
(74) *Attorney, Agent, or Firm* — Daniel J. Chalker; Chalker Flores, LLP

(57) ABSTRACT

A bladeless fluid/vapor includes: (a) three or more turbine discs disposed within a case, wherein each turbine disc has a center opening, a first set of holes substantially equally spaced from one another along a first radius, a second set of holes substantially equally spaced from one another along a second radius, and two or more of the turbine discs have a set of exhaust ports positioned annularly around the center opening; (b) the case includes a main housing, a cover and one or more fluid/vapor inlets oriented to direct a fluid/vapor onto an outer portion of the turbine discs; (c) a drive shaft passing through the center openings of the turbine discs and attached to the turbine discs; (d) a fluid/vapor outlet in the cover; and (e) a set of exhaust holes proximate to and connected to the fluid/vapor outlet that are positioned annularly around the drive shaft.

30 Claims, 38 Drawing Sheets

Related U.S. Application Data 4, 2011, now Pat. No. 9,163,512, and a continuation-in-part of application No. PCT/US2010/049196, filed on Sep. 16, 2010.

(60) Provisional application No. 61/361,238, filed on Jul. 2, 2010, provisional application No. 61/321,266, filed on Jul. 2, 2010, provisional application No. 61/361,251, filed on Jul. 2, 2010, provisional application No. 61/361,215, filed on Jul. 2, 2010, provisional application No. 61/243,154, filed on Sep. 16, 2009.

(51) Int. Cl.
  *F01D 15/10* (2006.01)
  *F01D 1/36* (2006.01)
  *H02K 7/18* (2006.01)
  *F03G 6/04* (2006.01)

(52) U.S. Cl.
  CPC ............... *F03G 6/04* (2013.01); *F03G 6/068* (2013.01); *H02K 7/1823* (2013.01); *F03G 2006/061* (2013.01); *Y02B 10/20* (2013.01); *Y02E 10/46* (2013.01); *Y02P 80/21* (2015.11)

(58) Field of Classification Search
  USPC ................ 60/641.8; 416/181, 223 R; 415/90
  See application file for complete search history.

(56) References Cited

U.S. PATENT DOCUMENTS

| | | |
|---|---|---|
| 3,822,692 A | 7/1974 | Demarest |
| 3,913,401 A | 10/1975 | Sweeney |
| 3,990,914 A | 11/1976 | Weinstein et al. |
| 4,000,734 A | 1/1977 | Matlock et al. |
| 4,026,273 A | 5/1977 | Parker |
| 4,044,949 A | 8/1977 | Morawetz et al. |
| 4,135,493 A | 1/1979 | Kennedy |
| 4,202,322 A | 5/1980 | Delgado et al. |
| 4,218,176 A | 8/1980 | Gawne |
| 4,249,083 A | 2/1981 | Bitterly |
| 4,280,791 A | 7/1981 | Gawne |
| 4,286,579 A | 9/1981 | Johnston |
| 4,414,960 A | 11/1983 | Wasserman |
| 4,586,334 A | 5/1986 | Nilsson, Sr. et al. |
| 4,608,964 A | 9/1986 | Russo |
| 5,150,568 A | 9/1992 | White |
| 5,181,654 A | 1/1993 | Yoshimi et al. |
| 5,555,878 A | 9/1996 | Sparkman |
| 6,328,527 B1 | 12/2001 | Conrad et al. |
| 6,700,054 B2 | 3/2004 | Cherney et al. |
| 7,241,106 B2 | 7/2007 | Avina |
| 7,270,295 B2 | 9/2007 | Bennett |
| 7,325,401 B1 | 2/2008 | Kesseli et al. |
| 7,343,913 B2 | 3/2008 | Niedermeyer |
| 7,553,035 B2 | 6/2009 | Wright |
| 7,975,686 B2 | 7/2011 | Prueitt |
| 8,621,867 B2 | 1/2014 | Galbraith |
| 9,163,512 B2 * | 10/2015 | Bohl .................. F01D 1/34 |
| 2004/0231329 A1 | 11/2004 | Carroll et al. |
| 2005/0126170 A1 | 6/2005 | Litwin |
| 2005/0214109 A1 | 9/2005 | Grande, III et al. |
| 2006/0233647 A1 | 10/2006 | Saunders |
| 2008/0128017 A1 | 6/2008 | Ford |
| 2008/0149172 A1 | 6/2008 | Neff et al. |
| 2009/0056699 A1 | 3/2009 | Mills et al. |
| 2009/0139512 A1 | 6/2009 | Lima |
| 2009/0188546 A1 | 7/2009 | McLynn et al. |
| 2010/0018520 A1 | 1/2010 | Prueitt |
| 2010/0205963 A1 | 8/2010 | Ammar |
| 2010/0206296 A1 | 8/2010 | Matalon |

FOREIGN PATENT DOCUMENTS

| | | |
|---|---|---|
| CN | 101354021 A | 1/2009 |
| JP | 2007198334 A | 8/2007 |
| WO | 2009109020 A1 | 9/2009 |

OTHER PUBLICATIONS

International Search Report for PCT/U2011/042911, dated Feb. 21, 2012, Solar Logic Incorporated.

International Search Report for PCT/US2010/049196, dated May 30, 2011, Solar Logic Incorporated.

Soteris Kalogirou, "Recent Patents in Solar Energy Collectors and Applications", 2007, Recent Patents on Engineering, vol. 1, 23-33.

* cited by examiner

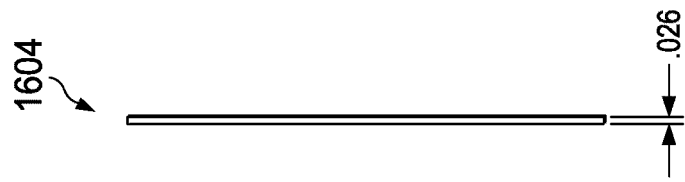
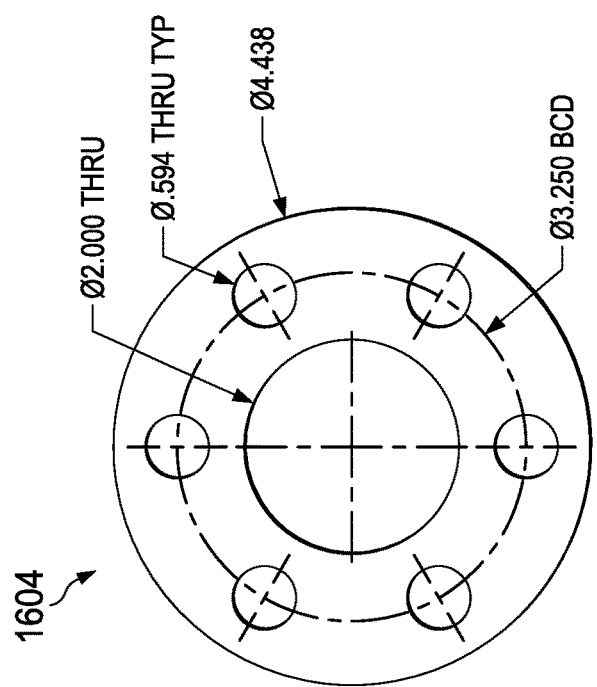
FIG. 20B
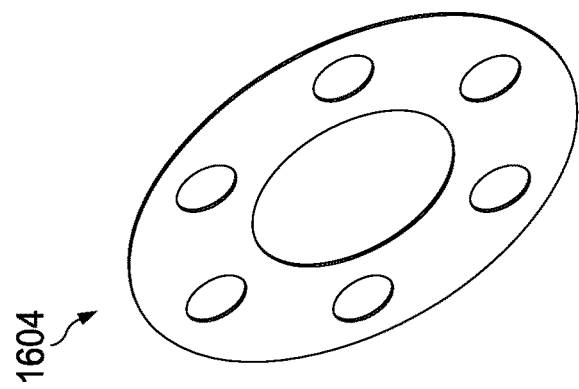

BLADELESS TURBINE

CROSS-REFERENCE TO RELATED APPLICATIONS

This application is a continuation-in-part application of U.S. Ser. No. 13/808,081 filed on May 10, 2013, now U.S. Pat. No. 9,163,512, which is a national phase application of PCT/US2011/42911 filed on Jul. 4, 2011. PCT/US2011/42911 claims benefit of provisional patent applications U.S. Ser. No. 61/361,238 filed Jul. 2, 2010, U.S. Ser. No. 61/361,266 filed on Jul. 2, 2010, U.S. Ser. No. 61/361,251 filed on Jul. 2, 2010, and U.S. Ser. No. 61/361,215 filed on Jul. 2, 2010; and is a continuation-in-part application of PCT/US2010/049196, filed on Sep. 16, 2010 which claims benefit of provisional patent application U.S. Ser. No. 61/243,154 filed on Sep. 16, 2009.

INCORPORATION-BY-REFERENCE OF MATERIALS FILED ON COMPACT DISC

None.

TECHNICAL FIELD OF THE INVENTION

The present invention relates generally to the field of power generation and, more particularly, to a bladeless turbine.

STATEMENT OF FEDERALLY FUNDED RESEARCH

None.

BACKGROUND OF THE INVENTION

The high cost, diminishing supply and environmental impact of fossil fuels continues to promote interest in solar energy, biomass combustion, geothermal heat, industrial waste heat recovery and other alternative clean energy sources. For example, solar energy has been used to heat water for use in homes and businesses for many years. Likewise, direct conversion of solar energy to electricity has been used for many years for satellites and spacecraft. But, these existing solar energy systems typically have low thermal efficiencies, require large installation areas and/or require expensive components. As a result, systems to efficiently and cost effectively convert solar energy to electricity are not available to the general public.

Accordingly, there is a need for a more efficient and economical turbine for use in solar energy, biomass combustion, geothermal heat and industrial waste heat recovery systems.

SUMMARY OF THE INVENTION

The present invention provides a bladeless turbine for driving mechanical loads and generating AC electrical power in solar energy, biomass combustion, geothermal heat and industrial waste heat recovery systems.

More specifically, the present invention provides a bladeless fluid/vapor turbine that includes: (a) three or more turbine discs disposed within a case, wherein each turbine disc has a center opening, a first set of holes substantially equally spaced from one another along a first radius from a centerline, a second set of holes substantially equally spaced from one another along a second radius from the centerline, and two or more of the turbine discs have a set of exhaust ports positioned annularly around the center opening; (b) the case includes a main housing and a cover having the centerline, and one or more fluid/vapor inlets oriented to direct a fluid/vapor onto an outer portion of the three or more turbine discs; (c) a drive shaft passing through the center openings of the three or more turbine discs and attached to the three or more turbine discs, wherein the drive shaft is positioned within the case along the centerline, free to rotate within the case, and extends through the main housing; (d) a fluid/vapor outlet in the cover and aligned with the centerline; and (e) a set of exhaust holes proximate to and connected to the fluid/vapor outlet that are positioned annularly around the drive shaft.

In addition, the present invention provides a solar power system that includes one or more solar collectors, a solar tracking device, a bladeless fluid/vapor turbine, a generator and a controller. Each solar collector includes (a) one or more support structures for securely mounting the solar collector to a surface, (b) a reflective parabolic trough for concentrating solar energy along a focal axis and attached to the support structure(s) to allow rotation of the reflective parabolic trough around a longitudinal axis, (c) one or more receiver tubes attached to the reflective parabolic trough along the focal axis, and (d) a motor operably connected to the reflective parabolic trough to rotate the reflective parabolic trough around the longitudinal axis. Each receiver tube includes (i) a metal tube having an inlet, an outlet and a solar absorption coating, and (ii) a transparent tube having a first seal and a second seal to vacuum or hermetically seal the metal tube between approximately the inlet and the outlet within the transparent tube. The solar tracking device has one or more sensors to control the motor to align each solar collector to maximize the solar energy collected by the one or more receiver tubes. The bladeless fluid/vapor turbine includes: (a) three or more turbine discs disposed within a case, wherein each turbine disc has a center opening, a first set of holes substantially equally spaced from one another along a first radius from a centerline, a second set of holes substantially equally spaced from one another along a second radius from the centerline, and two or more of the turbine discs have a set of exhaust ports positioned annularly around the center opening, (b) the case comprising a main housing and a cover having the centerline, and one or more fluid/vapor inlets connected to the outlet of the receiver tube(s) and oriented to direct a fluid/vapor onto an outer portion of the three or more turbine discs, (c) a drive shaft passing through the center openings of the three or more turbine discs and attached to the three or more turbine discs, wherein the drive shaft is positioned within the case along the centerline, free to rotate within the case, and extends through the main housing, (d) a fluid/vapor outlet in the cover that is aligned with the centerline connected to the inlet of the receiver tube(s), and (e) a set of exhaust holes proximate to and connected to the fluid/vapor outlet that are positioned annularly around the drive shaft. The generator is connected to the drive shaft of the fluid/vapor turbine and having one or more electrical output terminals. The controller is connected to the motor, the solar tracking device, the fluid/vapor turbine and the generator to monitor and control the system.

The present invention is described in detail below with reference to the accompanying drawings.

BRIEF DESCRIPTION OF THE DRAWINGS

Further benefits and advantages of the present invention will become more apparent from the following description of various embodiments that are given by way of example with reference to the accompanying drawings:

FIGS. 17A-1, 17A-2, 17B-1 and 17B-2 are diagrams of a turbine main housing for the fluid/vapor turbine shown in FIG. 16;

FIGS. 17C-1, 17C-2, 17C-3, 17D-1 and 17D-2 are diagrams of a turbine cover for the fluid/vapor turbine shown in FIG. 16;

FIGS. 18A-1, 18A-2, 18B-1, 18B-2, 18C-1 and 18C-2 are diagrams of the rear, intermediate and front discs, respectively, for the fluid/vapor turbine shown in FIG. 16;

FIGS. 20A-1 and 20A-2 are diagrams of a bearing cover for the fluid/vapor turbine shown in FIG. 16; and FIG. 20B is a diagram of a bearing cover gasket for the fluid/vapor turbine shown in FIG. 16.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a bladeless turbine for driving mechanical loads and generating AC electrical power in solar energy, biomass combustion, geothermal heat and industrial waste heat recovery systems. FIGS. 1-11 depict an example of how the bladeless turbine in accordance with the present invention can be used in a solar energy power generation system. FIGS. 12-15 provide details of the bladeless turbine in accordance with the present invention that can be used in many types of systems, such as solar energy, biomass combustion, geothermal heat, industrial waste heat recovery, and other "green" or semi-"green" systems. As will be appreciated by those skilled in the art, the bladeless turbine in accordance with the present invention is not limited to those systems specifically mentioned or described herein.

Figure 1:
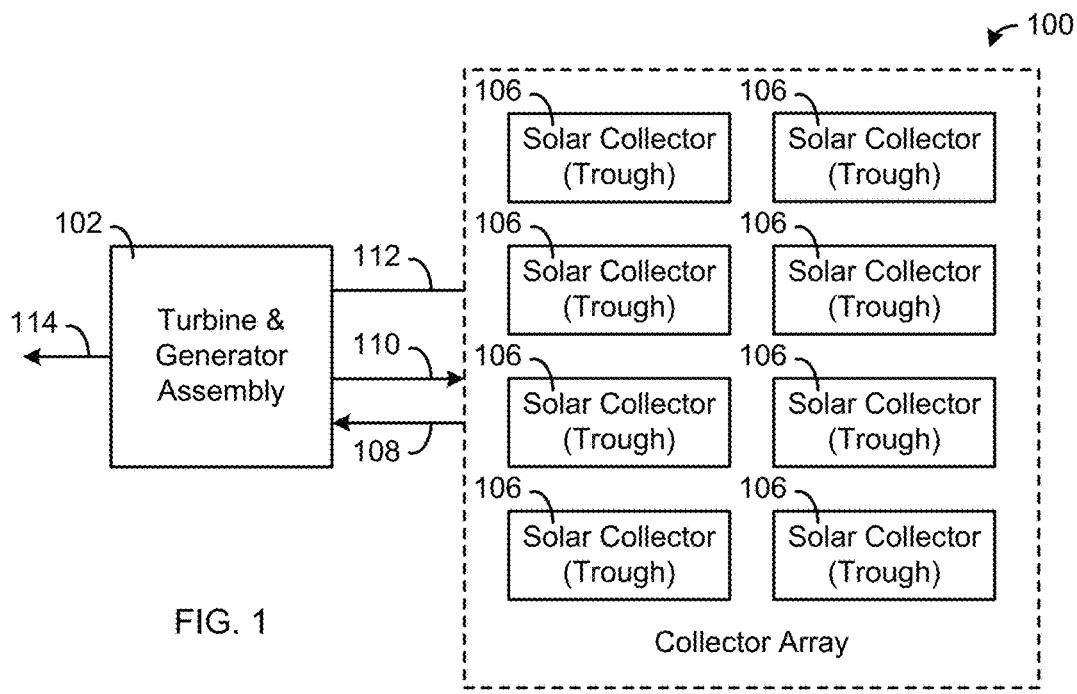
FIG. 1 is a high level block diagram of a solar energy power generation system in accordance with one embodiment of the present invention.

Now referring to FIG. 1, a high level block diagram of a solar energy power generation system 100 in accordance with one embodiment of the present invention is shown. The solar energy power generation system 100 provides an encapsulated solution in which all components and fluids are fully contained within a single compact unit. The major subsystems of the solar energy power generation system 100 are a turbine and generator assembly 102 and a solar collector array 104 that can have one or more solar collectors (troughs) 106. In one example, the turbine and generator assembly 102 weighs approximately 150 lbs and is approximately 4 ft×2 ft×2 ft, and the solar collector (trough) 106 weighs approximately 105 lbs and is approximately 4 ft×12 ft. The turbine and generator assembly 102 are connected to the one or more solar collectors (troughs) 106 with input 108 and output 110 hoses or pipes. A low power cable 112 (e.g., 5V) runs from the turbine and generator assembly 102 to the one or more solar collectors (troughs) 106. Power generated by the turbine and generator assembly 102 is provided to the home, building, business, electrical load or utility circuit via a power connection 114. Note that various meters, relays, breakers, reverse power flow sensors and other monitoring/protection devices may be installed between the generator and the home, building, business, electrical load or utility circuit. The turbine and generator assembly 102 and the solar collector (troughs) 106 will be described in more detail below. Note that the number of solar collectors (troughs) 106 shown in FIG. 1 is merely for illustration purposes and present invention is not limited to the number of solar collector shown.

Figure 2:
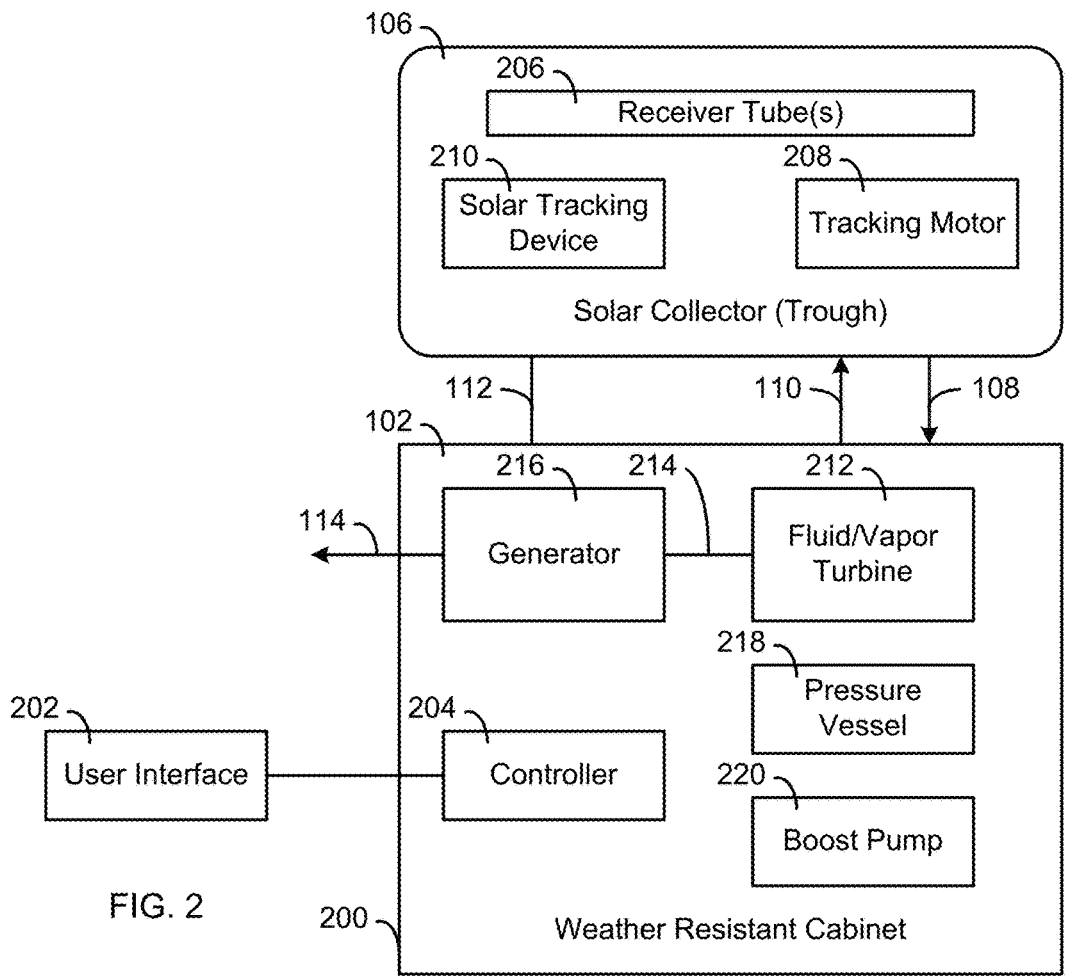
FIG. 2 is a block diagram of a turbine and generator assembly connected to solar collector (trough) in accordance with one embodiment of the present invention.

Referring now to FIG. 2, a block diagram of a turbine and generator assembly 102 connected to solar collector (trough) 106 in accordance with one embodiment of the present invention is shown. The turbine and generator assembly 102 is contained within a weather resistant cabinet 200 suitable for ground or attic installations. The solar energy power generation system 100 can be controlled and monitored by user interface 202 (software) that allows remote control and monitoring of the system. The user interface 202 is not the code running on the controller 204 (e.g., Programmable Logic Controller). Instead, user interface 202 provides allows a user to track power consumption, power production, system diagnostics and other control/monitoring functions. The user interface 202 can be installed on any user device communicably coupled to the controller. For example, the user device may include a computer, a laptop, a PDA, a phone, a mobile communications device or other electronic device. The user device having user interface 202 can be communicably coupled to the controller 204 via a direct connection, a network connection, a USB connection, a wireless network, a wide area network or a combination thereof.

The solar collector 106 includes one or more support structures for securely mounting the solar collector 106 to a surface (not shown), a reflective parabolic trough for concentrating solar energy along a focal axis, one or more receiver tubes 206 attached to the reflective parabolic trough along the focal axis, a motor 208 operably connected to the reflective parabolic trough to rotate the reflective parabolic trough around the longitudinal axis, and a solar tracking device or circuit 210. A typical installation will have six solar collectors 106, although the exact number of solar collectors 106 will be determined by various design specifications, such as energy requirements, geographic location, physical constraints and other factors.

The weather resistant cabinet 200 provides protection and concealment of a fluid/vapor turbine 212 having a drive shaft 214, a generator 216 connected to the drive shaft 214 of the fluid/vapor turbine 212, a controller 204, a pressure vessel 218 and a primer/boost pump 220. The generator 216 and the fluid/vapor turbine 212 can be directly coupled or coupled through a transmission or gear assembly. Note that the fluid/vapor turbine 212 can be a Tesla engine, Sterling engine or an organic Rankine cycle steam turbine. The organic Rankine cycle steam turbine has numerous advantages including, but not limited to, its bladeless design that can extract energy from very high temperatures (fully vaporized fluids) to very low temperatures (fully saturated fluids) without damage. The fluid/vapor turbine 212, pressure vessel 218 and primer/boost pump 220 are connected together and to the receiver tube(s) 206 with input 108 and output 110 hoses or pipes. A low power cable 112 (e.g., 5V) runs from the cabinet 200 to each solar collector 106 (typically in a daisy chain). Power generated by the generator 216 is provided to the home, building, business, electrical load or utility circuit via a power connection 114 (e.g., 480VAC (three phase), 240VAC (single phase), etc. Note that various meters, relays, breakers, reverse power flow sensors and other monitoring/protection devices may be installed between the generator and the home, building, business, electrical load or utility circuit. The controller 204 is connected to the motor 208, the solar tracking device 210, the fluid/vapor turbine 212 and the generator 216 to monitor and control the system. The controller 204 can be a PLC, PCB, computer or SCADA system.

In other words, the present invention provides a solar power system 100 that includes one or more solar collectors 106, a solar tracking device 210, a fluid/vapor turbine 212, a generator 216 and a controller 204. Each solar collector 106 includes (a) one or more support structures 404 for securely mounting the solar collector 106 to a surface, (b) a reflective parabolic trough 400 for concentrating solar energy along a focal axis and attached to the support structure(s) 404 to allow rotation of the reflective parabolic trough 400 around a longitudinal axis, (c) one or more receiver tubes 206 attached to the reflective parabolic trough 400 along the focal axis, and (d) a motor 208 operably connected to the reflective parabolic trough 400 to rotate the reflective parabolic trough 400 around the longitudinal axis. Each receiver tube 206 includes (i) a metal tube 804 having an inlet 318, an outlet 302 and a solar absorption coating, and (ii) a transparent tube 802 having a first seal and a second seal to vacuum or hermetically seal the metal tube 804 between approximately the inlet 318 and the outlet 302 within the transparent tube 802. The solar tracking device 210 has one or more sensors 500 to control the motor 208 to align each solar collector 106 to maximize the solar energy collected by the one or more receiver tubes 206. The fluid/vapor turbine 212 has a drive shaft 214, a fluid/vapor inlet 304 connected to the outlet 203 of the receiver tube(s) 206 and a fluid/vapor outlet 310 connected to the inlet of the receiver tube(s) 318. The generator 216 is connected to the drive shaft 214 of the fluid/vapor turbine 212 and has one or more electrical output terminals 114. The controller 204 is connected to the motor 208, the solar tracking device 210, the fluid/vapor turbine 212 and the generator 216 to monitor and control the system 100. The controller 204 can also position each solar collector 106 to minimize damage in potentially damaging weather via on-site sensors or remote input from the National Weather Service or other alert system. For example, the controller 204 can utilize a storm mode and sleep cycles to position each collector 106 to minimize abrasions, damage and moisture collection during non-productive periods.

In one embodiment, six to eight solar collectors will be required for 10 kW output based on 4.45 square meters of surface per collector. For example, the specifications for a system in accordance with one embodiment of the present invention are:

| Turbine/Generator | |
|---|---|
| Output | 10 kW |
| Input Pressure | 140 PISG |
| Exhaust Pressure | 10 PSIG (Max) |
| Inlet Temperature | 361° F. |
| Outlet Temperature | 240° F. |
| Steam Usage | 2700 LB/HR |
| Inlet Pipe (OD) | One inch |
| Conversion Rates | |
| 1 BTU = 1.06 kJ | |
| 1 lb = 0.4536 kg | |
| Solar Collector Calculations | |
| Energy from Sun (clear summer day) | 1,000 W/m$^2$ |
| Parabolic Trough | 4 ft × 12 ft = 4.46 m$^2$ |
| Collector Efficiency | 0.68 |
| Power from Collector | 1000 × 4.46 × 0.68 = 3.033 kW per trough |
| Six Troughs = 18.197 kW of energy available from the Sun | |
| Steam Characteristics | |
| Total heat of steam at 240° F. = 1160 BTU/lb | |
| Total heat of steam at 361° F. = 1194 BTU/lb | |
| Change in heat/lb = 34 BTU/lb = 36 kJ/lb = 79.36 kJ/kg | |
| Required turbine steam usage: 2700 lb/hr = 1224.7 kg/hr = 0.340 kg/sec | |
| Steam provided by the collector = 3.033 kW/79.36 kJ/kg = 0.038 kg/sec | |

The controller provides a wide range of controls and functionality, such as:

Solar Panel
  Calibration
  Tracking
    One Axis
  Shutdown
    Storms
    Malfunction
Turbine Control
  RPM
    Input and Output Pressures
    Operational Speed
  Malfunction
  Shutdown
  Log/History
Transmission Control (optional depending on the turbine/generator specifications)
  Engage
  Disengage
  Malfunction
  Shutdown
  Log/History
Generator Control
  Speed
  Output
  Temperature
  Shutdown
Transfer Switch Control
  Input Current
  Output Current
  Status
  Log/History
System Management
  System Control
  Error Management
  Sub-System—Enable/Disengage
  Remote Access/Phone home
  Heartbeat Monitor
  History Other control mechanisms, sensors and functionality can be added to the system. Eight solar collector units can occupy a space less than or equal to 700 sqft and provide approximately 14 watts/sqft.

Figure 3:
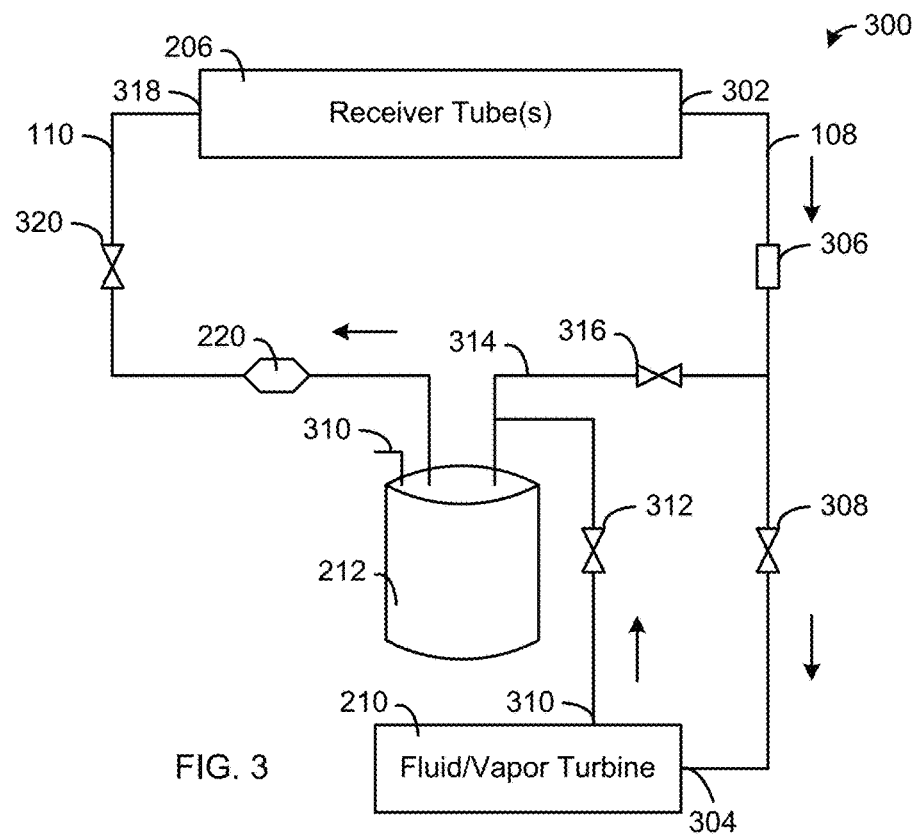
FIG. 3 is a block diagram showing the valve and piping layout for a solar energy to power generation system in accordance with one embodiment of the present invention.

Now referring to FIG. 3, a block diagram showing the valve and piping layout 300 for a solar energy power generation system 100 in accordance with one embodiment of the present invention is shown. The input hose or pipe 108 connects the outlet 302 of the receiver tube(s) 206 to the fluid/vapor inlet 304 of the fluid/vapor turbine 210. A temperature and pressure probe or sensor 306 and a first operating pressure modulation valve (2-way) 308 are connected between the outlet 302 of the receiver tube(s) 206 and the fluid/vapor inlet 304 of the fluid/vapor turbine 210. The fluid/vapor outlet 310 of the fluid/vapor turbine 210 is connected to the pressure vessel 212. A back flow prevention valve 312 is connected between the fluid/vapor outlet 310 of the fluid/vapor turbine 210 and the pressure vessel 212. A secondary line 314 connects the pressure vessel 212 to the input hose or pipe 108 between the temperature and pressure probe or sensor 306 and the first operating pressure modulation valve (2-way) 308. A third operating pressure modulation valve (2-way) 316 on the secondary line 314 is located between the pressure vessel 212 and the input hose or pipe 108. The output hose or pipe 110 connects the inlet 318 of the receiver tube(s) 206 to the boost pump 220 which is connected to pressure vessel 212. A second operating pressure modulation valve 320 is connected between the inlet 318 of the receiver tube(s) 206 and the boost pump 220 to control flow into the system and stop the flow in an emergency (Emergency Shutdown). Arrows show the flow of the fluid/vapor. The pressure vessel 212 has a pressure relief valve 310 and may also have other sensors/probes, such as temperature, pressure, fluid level, etc. Temperature and/or pressure sensors/probes can be installed at various monitoring points throughout the system 100, such as near the receiver tubes 206, the fluid/vapor turbine 210, the pressure vessel 212, etc. The temperature and pressure probe/sensors (e.g., 306) are communicably coupled to the controller 204. A RPM sensor (not shown) is attached to the drive shaft 214 and communicably coupled to the controller 204. In one embodiment, the system 300 operates at approximately 140 PSI.

Figure 4:
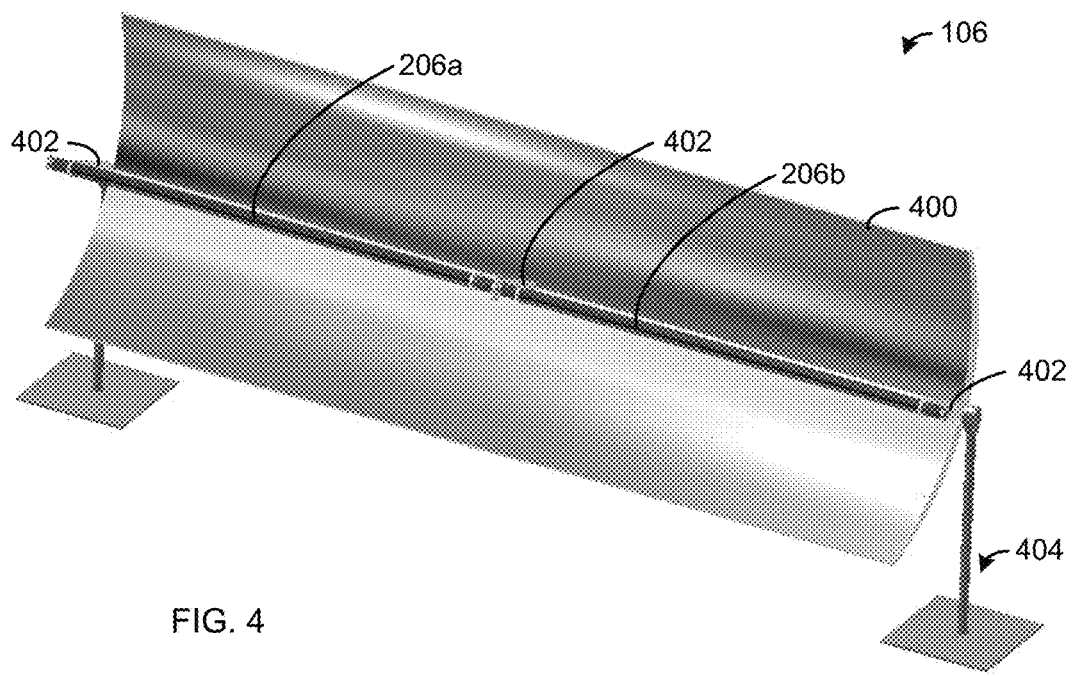
FIG. 4 is a diagram of a reflective parabolic trough in accordance with one embodiment of the present invention.

Referring now to FIG. 4, a diagram of a solar collector 106 in accordance with one embodiment of the present invention is shown. In this embodiment of the present invention, the reflective parabolic trough 400 is made of aluminum or an aluminum alloy and has an aperture of approximately four feet, a length of approximately 12 feet (not including mounting pylons), a rim angle to approximately 82.5 degrees, a focal length of approximately 1.14 feet and a surface area facing the focal axis of 62.8 square feet. The solar collector 106 is roof mountable and weights approximately 105 pounds. The solar collector 106 includes adjustable brackets 402 and support pylons 404 (see FIG. 9). Each solar collector 106 has two receiver tubes 206a and 206b that are approximately six feet long (each). They are mounted to the collector with three adjustable mounting brackets 402. The brackets 402 allow for three axis of alignment for the receiver tubes 206a and 206b. The surface of the reflective parabolic trough 400 facing the focal axis is coated with a reflective material.

For example, the curve dimensions of a parabolic reflector 400 in accordance with one embodiment of the present invention can be:

| Y (ft) | X (ft) | Y (in) | X (in) | Focal Point (ft) |
|---|---|---|---|---|
| 0.877 | 2.000 | 10.526 | 24 | 1.14 |
| 0.806 | 1.917 | 9.667 | 23 | 1.14 |
| 0.737 | 1.833 | 8.845 | 22 | 1.14 |
| 0.672 | 1.750 | 8.059 | 21 | 1.14 |
| 0.609 | 1.667 | 7.310 | 20 | 1.14 |
| 0.550 | 1.583 | 6.597 | 19 | 1.14 |
| 0.493 | 1.500 | 5.921 | 18 | 1.14 |
| 0.440 | 1.420 | 5.281 | 17 | 1.14 |
| 0.390 | 1.330 | 4.678 | 16 | 1.14 |
| 0.343 | 1.250 | 4.112 | 15 | 1.14 |
| 0.298 | 1.167 | 3.582 | 14 | 1.14 |
| 0.257 | 1.083 | 3.088 | 13 | 1.14 |
| 0.219 | 1.000 | 2.632 | 12 | 1.14 |
| 0.184 | 0.917 | 2.211 | 11 | 1.14 |
| 0.152 | 0.833 | 1.827 | 10 | 1.14 |
| 0.123 | 0.750 | 1.480 | 9 | 1.14 |
| 0.097 | 0.667 | 1.170 | 8 | 1.14 |
| 0.075 | 0.583 | 0.895 | 7 | 1.14 |
| 0.055 | 0.500 | 0.658 | 6 | 1.14 |
| 0.038 | 0.417 | 0.457 | 5 | 1.14 |
| 0.024 | 0.333 | 0.292 | 4 | 1.14 |
| 0.014 | 0.250 | 0.164 | 3 | 1.14 |
| 0.006 | 0.167 | 0.073 | 2 | 1.14 |
| 0.002 | 0.083 | 0.018 | 1 | 1.14 |
| 0.000 | 0.000 | 0.000 | 0 | 1.14 |
| 0.002 | −0.083 | 0.018 | −1 | 1.14 |
| 0.006 | −0.167 | 0.073 | −2 | 1.14 |
| 0.014 | −0.250 | 0.164 | −3 | 1.14 |
| 0.024 | −0.333 | 0.282 | −4 | 1.14 |
| 0.038 | −0.417 | 0.457 | −5 | 1.14 |

-continued

| Y (ft) | X (ft) | Y (in) | X (in) | Focal Point (ft) |
|---|---|---|---|---|
| 0.055 | −0.500 | 0.658 | −6 | 1.14 |
| 0.075 | −0.583 | 0.895 | −7 | 1.14 |
| 0.097 | −0.667 | 1.170 | −8 | 1.14 |
| 0.123 | −0.750 | 1.480 | −9 | 1.14 |
| 0.152 | −0.833 | 1.827 | −10 | 1.14 |
| 0.184 | −0.917 | 2.211 | −11 | 1.14 |
| 0.219 | −1.000 | 2.632 | −12 | 1.14 |
| 0.257 | −1.083 | 3.088 | −13 | 1.14 |
| 0.298 | −1.167 | 3.582 | −14 | 1.14 |
| 0.343 | −1.250 | 4.112 | −15 | 1.14 |
| 0.390 | −1.330 | 4.678 | −16 | 1.14 |
| 0.440 | −1.420 | 5.281 | −17 | 1.14 |
| 0.493 | −1.500 | 5.921 | −18 | 1.14 |
| 0.550 | −1.583 | 6.597 | −19 | 1.14 |
| 0.609 | −1.667 | 7.310 | −20 | 1.14 |
| 0.672 | −1.750 | 8.059 | −21 | 1.14 |
| 0.737 | −1.833 | 8.845 | −22 | 1.14 |
| 0.806 | −1.917 | 9.667 | −23 | 1.14 |
| 0.877 | −2.000 | 10.526 | −24 | 1.14 |

Figure 5A:
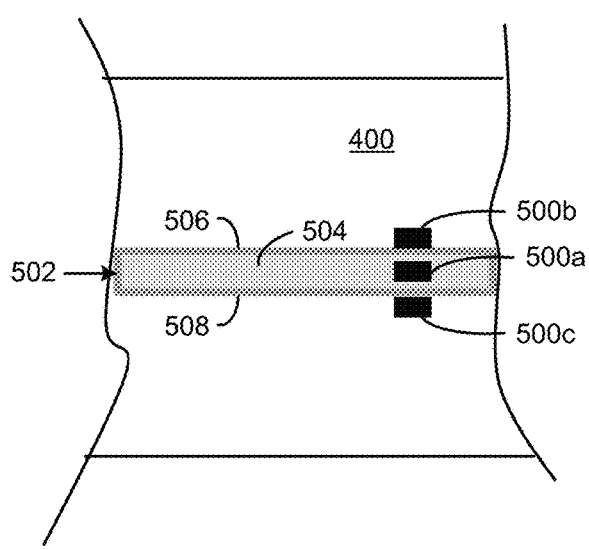
FIGS. 5A and 5B are diagrams of a solar tracking device mounted on a reflective parabolic trough in accordance with one embodiment of the present invention.
Figure 5B:
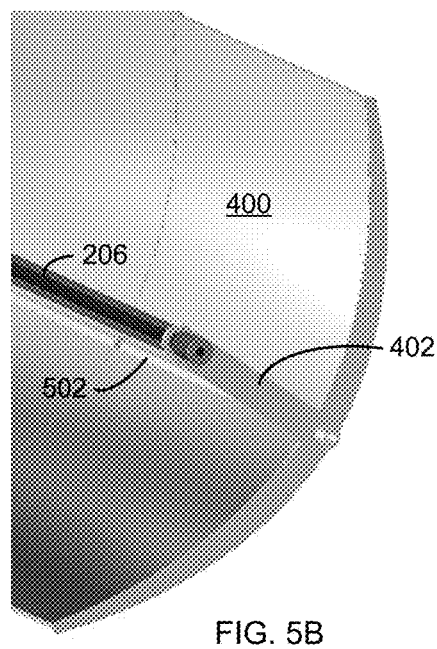

Now referring to FIGS. 5A and 5B, diagrams of a solar tracking device or circuit 210 mounted on the reflective parabolic trough 400 in accordance with one embodiment of the present invention are shown. The solar tracking device or circuit 210 includes one or more sensors. In this embodiment, the one or more sensors include three or more photosensitive diodes 500 disposed on the reflective parabolic trough 400 such that when the reflective parabolic through 400 is properly aligned: (a) at least a first of the photosensitive diodes 500a is positioned within a center 504 of a shadow 502 cast by the receiver tube(s) 206, (b) a least a second of the photosensitive diodes 500b is positioned within and near a first edge 506 of the shadow 502 cast by the receiver tube(s) 206, and (c) a least a third of the photosensitive diodes 500c is positioned within and near a second edge 508 of the shadow 502 cast by the receiver tube(s) 206. The solar tracking device 210 can position the solar collector 106 at a previously recorded time-based position whenever the one or more sensors 500 do not provide a position to maximize the solar energy collected by the receiver tube(s) 206. As a result, the solar tracking device aligns each solar collector to maximize the solar energy collected by the receiver tube(s) regardless of weather conditions.

In other words, to track the sun, one diode 500a is placed in the shadow of the receiver tub and two more 500b and 500c on each edge. The solar tracking device or circuit 210 measures the difference in light intensity measured by the photosensitive diodes 500 and if the diodes in sunlight (e.g., 500b or 500c) move to the shadow 502, the tracking motor 209 (e.g., stepper motor) adjusts the position of the reflective parabolic trough 400 to move the diodes (e.g., 500b or 500c) back into sunlight. If this cannot be achieved within a pre-defined number of steps, the solar tracking device or circuit 210 will position the reflective parabolic trough 400 to a prior days position for the given time slot. As a result, the solar tracking device 210 aligns each solar collector 106 to be in the correct position to maximize the solar energy collected by the receiver tube(s) 206 regardless of weather conditions.

Figure 6:
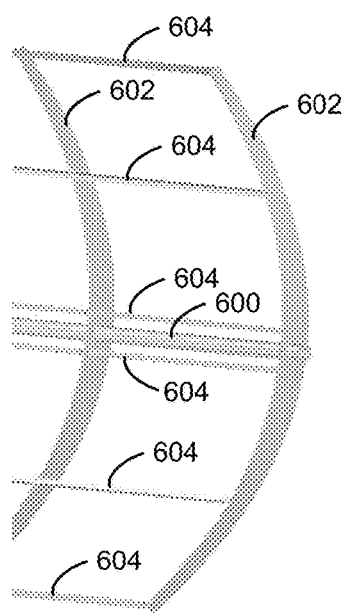
FIG. 6 is a diagram of some structural details of a reflective parabolic trough in accordance with one embodiment of the present invention.

Referring now to FIG. 6, a diagram of some structural details of a reflective parabolic trough 400 in accordance with one embodiment of the present invention is shown. The structural details of the reflective parabolic trough 400 includes a central support tube 600, three or more support ribs 602 attached to the central support tube 600 to provide a parabolic shape, a support stringer 604 attached between the support ribs 602 at or near an end of the support ribs 602, and a metallic sheet (not shown) attached to the support ribs 604 to form the parabolic shape. As shown, the trough is constructed with five support ribs 602 spaced 36 inches apart, six support stringers 604, and a central support tube 600 on which the reflective parabolic trough 400 rotates. Note that the present invention is not limited to the specific support ribs 602, support stringers 604, or spacing shown. The frame is covered with a 20 gauge aluminum skin which the reflective material is bonded to. Other materials and thicknesses can also be used.

Figure 7:
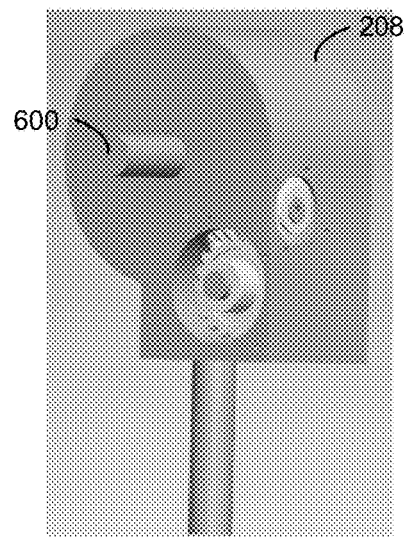
FIG. 7 is a diagram of a motor assembly for rotating a reflective parabolic trough in accordance with one embodiment of the present invention.

Now referring to FIG. 7, a diagram of a tracking motor assembly 208 for rotating a reflective parabolic trough 400 in accordance with one embodiment of the present invention is shown. As shown in this embodiment of the present invention, the reflective parabolic trough 400 rotation is controlled by a gear box assembly driven by an electric stepper motor. Alternatively, a worm gear assembly can be used. The gear box (or worm gear assembly) and electric stepper motor are mounted to one of the pylons 404.

Figure 8A:
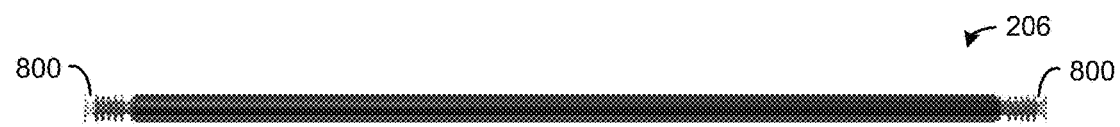
FIGS. 8A and 8B are diagrams of a receiver tube in accordance with one embodiment of the present invention.
Figure 8B:
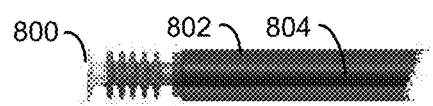

Referring now to FIGS. 8A and 8B, diagrams of a receiver tube 206 in accordance with one embodiment of the present invention are shown. The receiver tube 206 is an evacuated tube approximately six feet in length with a clamp and gasket style connector 800 extending from each end. The flanged and grooved end facilitates an O-ring and clamp. A threaded connector can also be used. The receiver tube 206 has an exterior layer (transparent tube) 802 that is constructed from borosilicate glass having an outer diameter of approximately 2.3 inches. The inner pipe 804 is a ¾ inch metal pipe (aluminum or an aluminum alloy metal tube) coated with a solar absorption coating applied to the exterior surface of the entire pipe. The inner pipe 804 may or may not have one or more copper heat fins soldered to it. The receiver tube 206 is sealed to the fluid pipe 804 in a manner which allows a vacuum to be applied to the interior space between the exterior layer 802 and the inner pipe 804 thereby creating an evacuated tube. In one embodiment, each end has a ¾ inch NPT threaded end approximately ¾ inch past the formed hex nut. The hex nut is formed or welded to the inner pipe 804.

Figure 9:
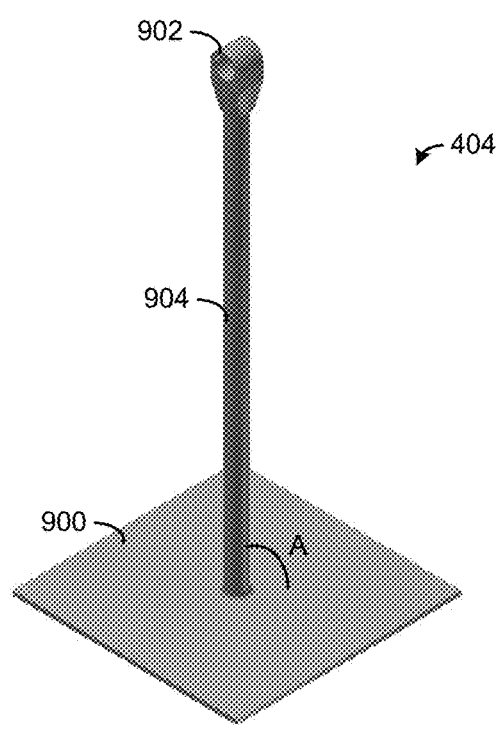
FIG. 9 is a diagram of a support structure in accordance with one embodiment of the present invention.

Now referring to FIG. 9, a diagram of a support structure 404 in accordance with one embodiment of the present invention is shown. Each support structure 404 includes a base plate 900 used to secure the solar collector 106 to the surface, a mounting block 902 for connection to the reflective parabolic trough 400, and a support 904 disposed between the base plate 900 and the mounting block 902. Note that an angle between the base plate 900 and the surface is adjustable. As shown, each mounting pylon consists of two major parts: (a) Base Plate 900; and (b) Mounting pole 904. The two components (900 and 904) are held together with a common bolt (not shown). With respect to the trough mounting block 902, the hole in the center supports the central support tube 600 and is lined with a Teflon strip which acts as a bearing surface. The central tube 904 is a 1.5 inch round tube approximately 24-26 inches long with bolt holes as the connection point of the two parts. The base plate 900 is used to fasten the collector to the roof or ground. The angle of the plate 900 to the connector (angle "A") is determined by the pitch of the roof or the slope of the ground.

Figure 10A:
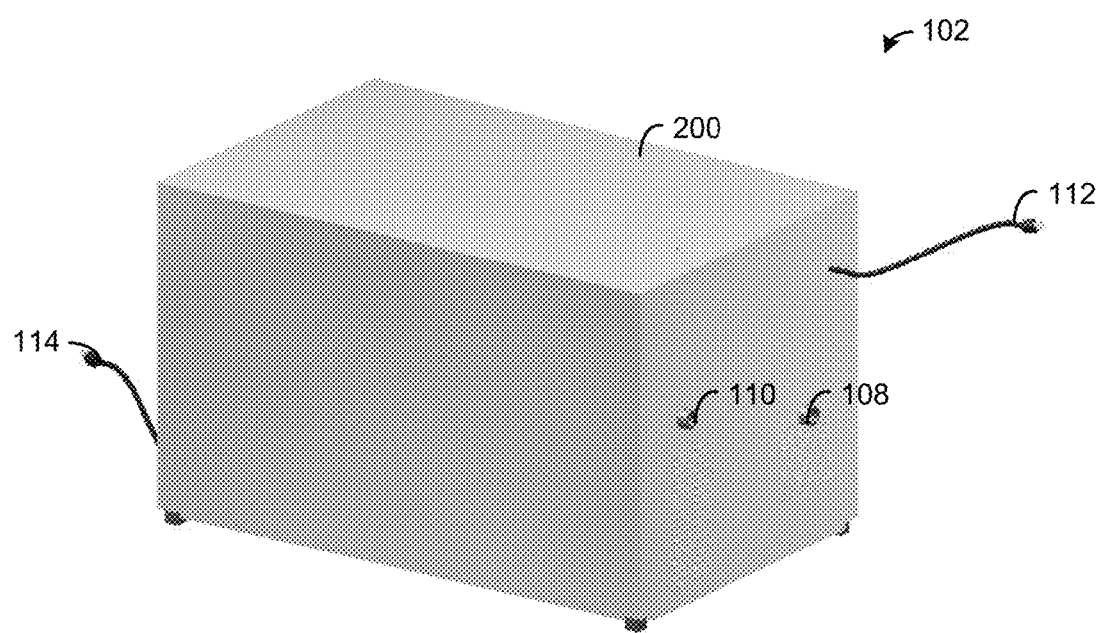
FIGS. 10A-10C are various diagrams of a housing for some of the components in accordance with one embodiment of the present invention.
Figure 10B:
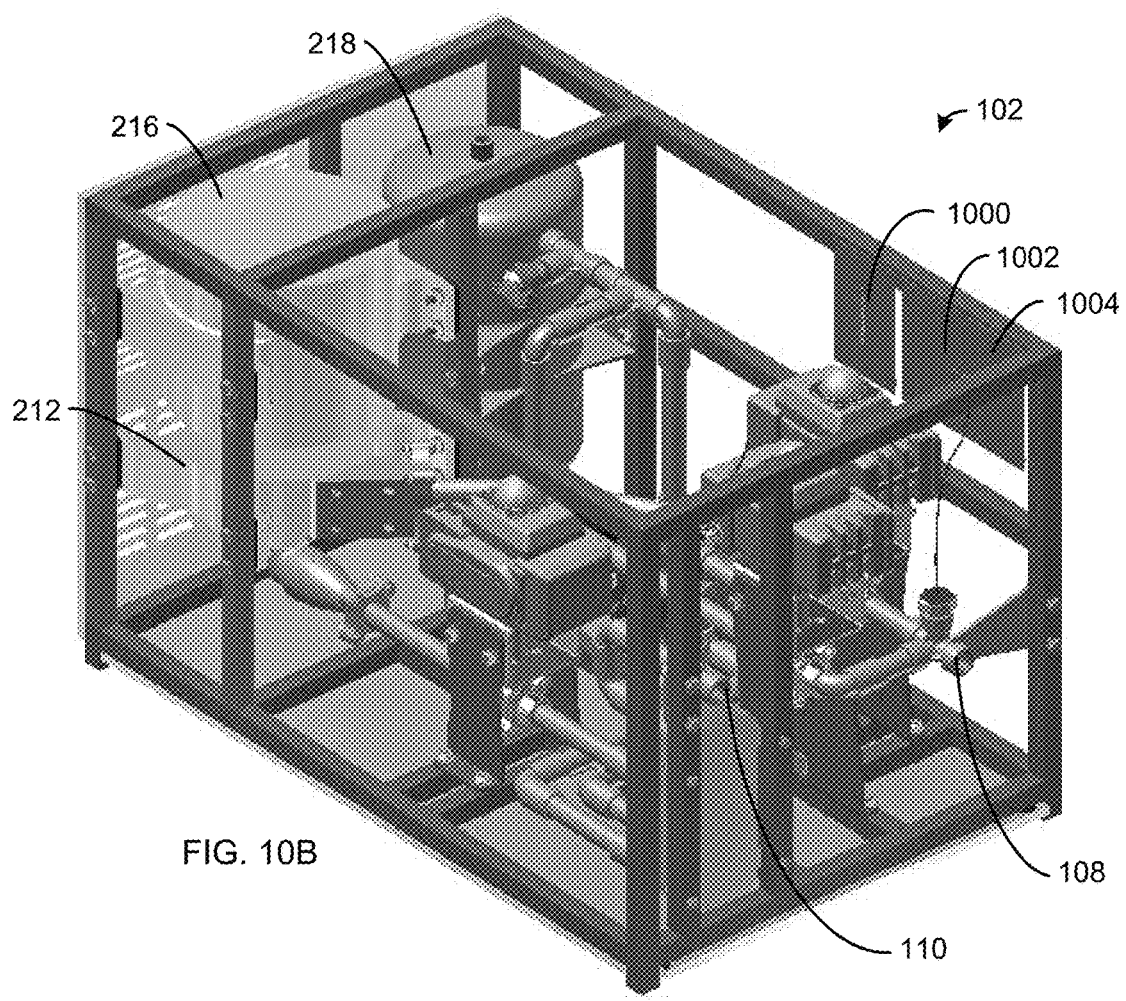
Figure 10C:
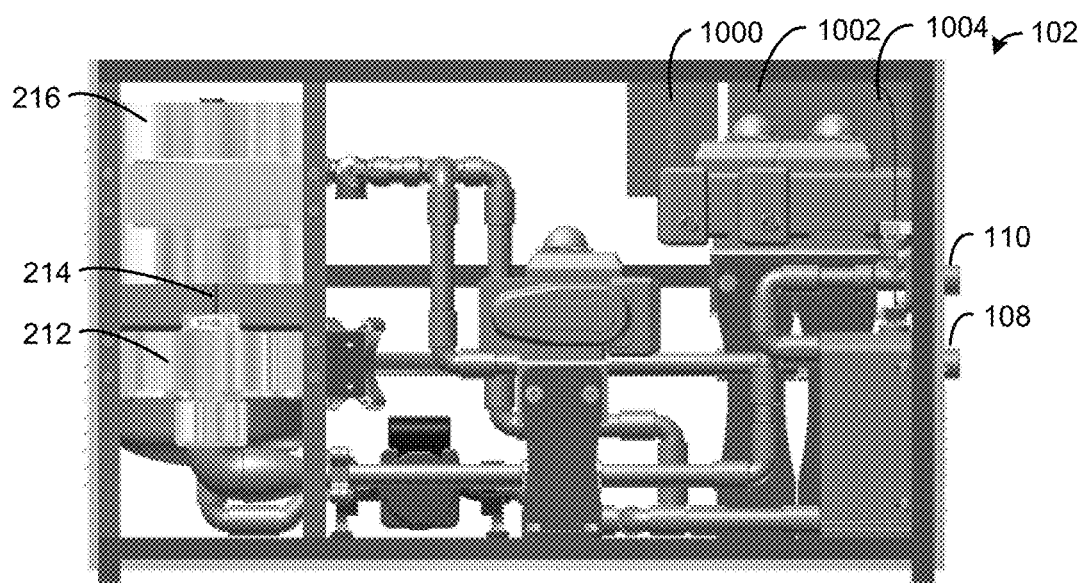

Referring now to FIGS. 10A-10C, various diagrams of the housing or cabinet 200 for some of the components are shown in accordance with one embodiment of the present invention. FIG. 10A shows an example of the housing or cabinet 200 for the turbine and generator assembly 102 that is weatherproof and suitable for outdoor or attic installation. The housing or cabinet 200 includes the input 108 and output 110 hoses or pipes, the low power cable 112 that goes to the solar collectors 106, and the power connection 144 that provides the power generated by the generator 216 to the home, building, business, electrical load or utility circuit. The power connection 114 may also include a connection to the user interface 202.

FIGS. 10B and 10C show a 3D perspective view and a side view, respectively, of the turbine and generator assembly 102 in accordance with one embodiment of the present invention. The major components are shown, such as the fluid/vapor turbine 212, generator 216, pressure vessel 218, inlet 108 and outlet 110, along with the internal bracing, piping, valves, heat exchangers, pumps, and other items. Various circuit boards (collectively the controller 204) are also shown, such as sun tracker board 1000, system control board 1002 and motor control board 1004.

Figure 11:
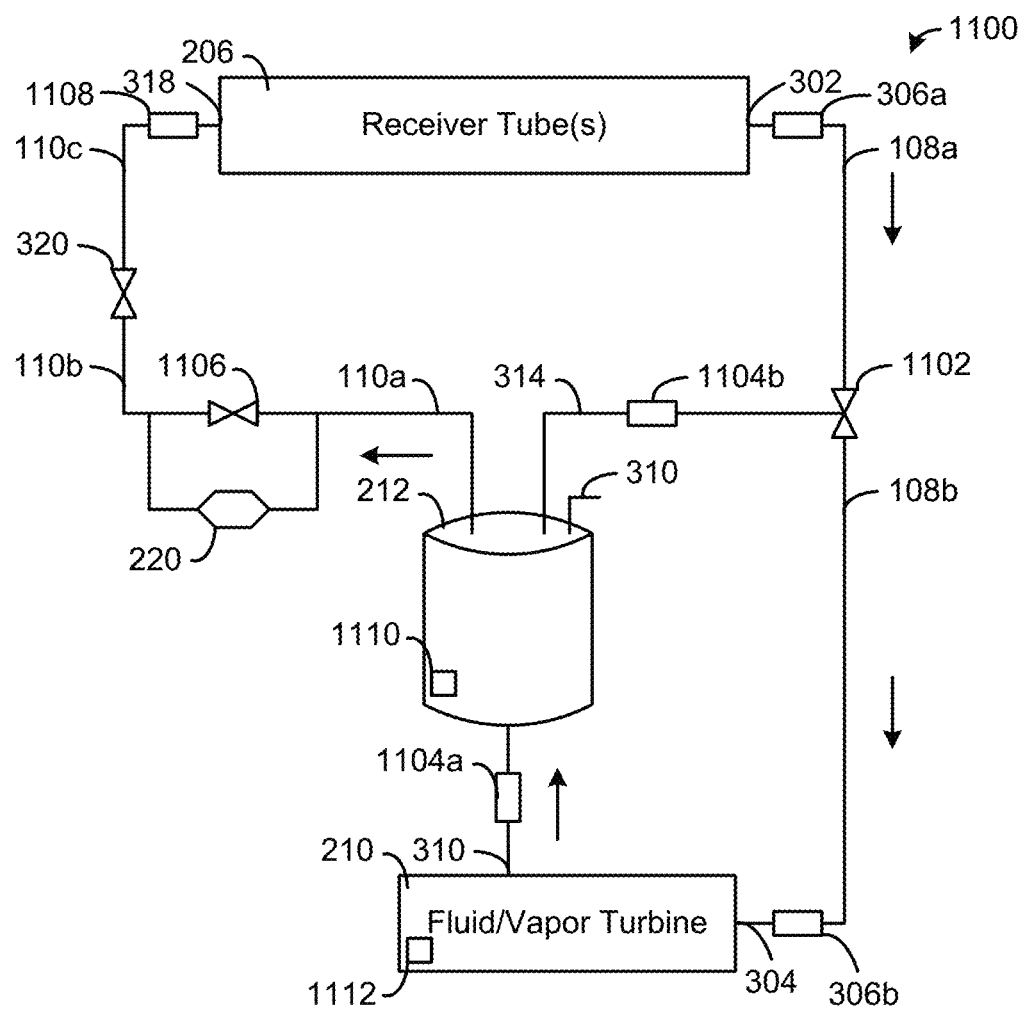
FIG. 11 is a block diagram showing the valve and piping layout for a solar energy power generation system in accordance with another embodiment of the present invention.

Now referring to FIG. 11, a block diagram showing the valve and piping layout 300 for a solar energy power generation system 1100 in accordance with another embodiment of the present invention is shown. A first input hose or pipe 108a connects the outlet 302 of the receiver tube(s) 206 to a first operating pressure modulation valve (3-way) 1102. A first temperature and pressure probe or sensor 306a is connected proximate to the output 302 of the receiver tube(s) 206, meaning that the temperature and pressure probe or sensor 306a can be integrated into the receiver tube(s) 206, or attached to the output 302 or attached to the input hose or pipe 108a. A second input hose or pipe 108b connects the first operating pressure modulation valve (3-way) 1102 to the fluid/vapor inlet 304 of the fluid/vapor turbine 210. A second temperature and pressure probe or sensor 306b is connected proximate to the fluid/vapor inlet 304 of the fluid/vapor turbine 210, meaning that the second temperature and pressure probe or sensor 306b can be integrated into the fluid/vapor turbine 210, or attached to the fluid/vapor inlet 304 or attached to the input hose or pipe 108b. The fluid/vapor outlet 310 of the fluid/vapor turbine 210 is connected to the pressure vessel 212. A first pressure probe 1104a is connected between the fluid/vapor outlet 310 of the fluid/vapor turbine 210 and the pressure vessel 212. Alternatively, the first pressure probe 1104 can be integrated into the fluid/vapor turbine 210 or the pressure vessel 212. A secondary line 314 connects the pressure vessel 212 to the first operating pressure modulation valve (3-way) 1102. A second pressure probe 1104b on the secondary line 314 is located between the pressure vessel 212 and the first operating pressure modulation valve (3-way) 1102. Alternatively, the second pressure probe 1104b can be integrated into or connected directly to the pressure vessel 212 or connected directly to the first operating pressure modulation valve (3-way) 1102. A boost pump 220 is connected in parallel with an anti-siphon valve 1106, both of which are connected to the pressure vessel 212 with a first output hose or pipe 110a, and to a second operating pressure modulation valve (2-way) 320 with a second output hose or pipe 110b. The second operating pressure modulation valve 320 controls flow into the system and stops the flow in an emergency (Emergency Shutdown). A third output hose or pipe 110c connects the inlet 318 of the receiver tube(s) 206 to the second operating pressure modulation valve (2-way) 320. A temperature probe or sensor 1108 is connected proximate to the input 318 of the receiver tube(s) 206, meaning that the temperature probe or sensor 1108 can be integrated into the receiver tube(s) 206, or attached to the input 318 or attached to the third output hose or pipe 108c. Arrows show the flow of the fluid/vapor. The pressure vessel 212 has a pressure relief valve 310 and may also have other sensors/probes, such as temperature, pressure, fluid level 1110, etc. Additional temperature and/or pressure sensors/probes can be installed at various monitoring points throughout the system 1100. The temperature and/or pressure probe/sensors (e.g., 306, 1104, 1108, etc.) are communicably coupled to the controller 204. A RPM sensor 1112 is attached to the drive shaft 214 and communicably coupled to the controller 204. In one embodiment, the system 1100 operates at approximately 140 PSI.

A bladeless turbine, such as fluid/vapor turbine 212, in accordance with one embodiment of the present invention will now be described in reference to FIGS. 12-15. This design is provided as an example of a suitable fluid/vapor turbine 212 for the solar power generation system previously described. The bladeless turbine described in FIGS. 12-15 is not limited to use in solar energy systems and can be used in many types of systems, such as biomass combustion, geothermal heat, industrial waste heat recovery (e.g., recovering heat from oil field flaring), and other "green" or semi-"green" systems. Moreover, the bladeless turbine can be used with water, steam, hydrocarbons and refrigerants. As will be appreciated by those skilled in the art, the bladeless turbine in accordance with the present invention is not limited to those systems specifically mentioned or described herein. Finally, any details or components not shown in FIGS. 12-15 that are required to replicate the fluid/vapor turbine in accordance with the present invention will be well known or apparent to those skilled in the art in light of the following FIGURES and description, and are not necessary for a complete understanding of the inventive aspects of the bladeless turbine.

Figure 12A:
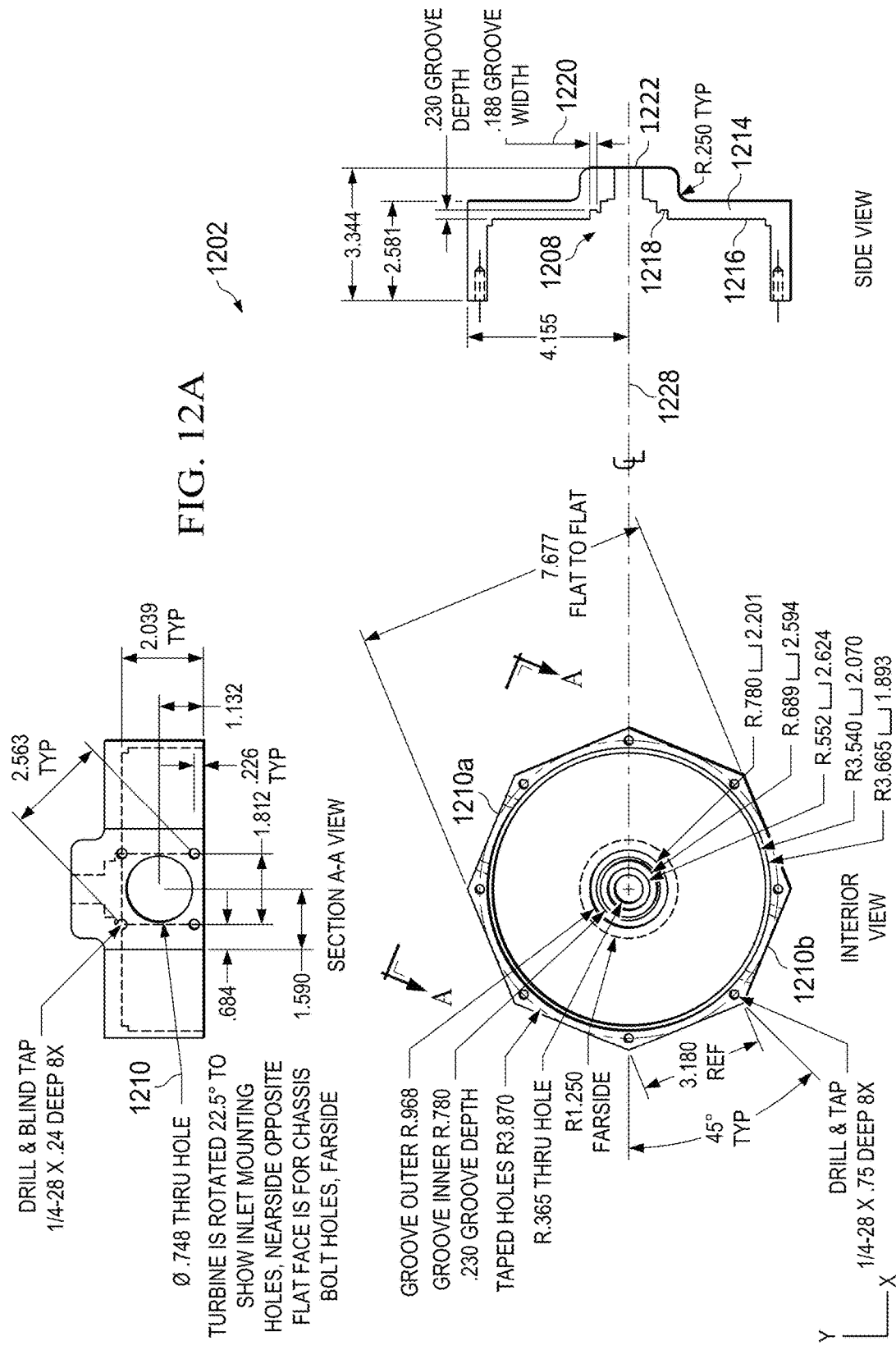
FIGS. 12A, 12B and 12C are diagrams of a turbine case and gasket in accordance with one embodiment of the present invention.
Figure 12B:
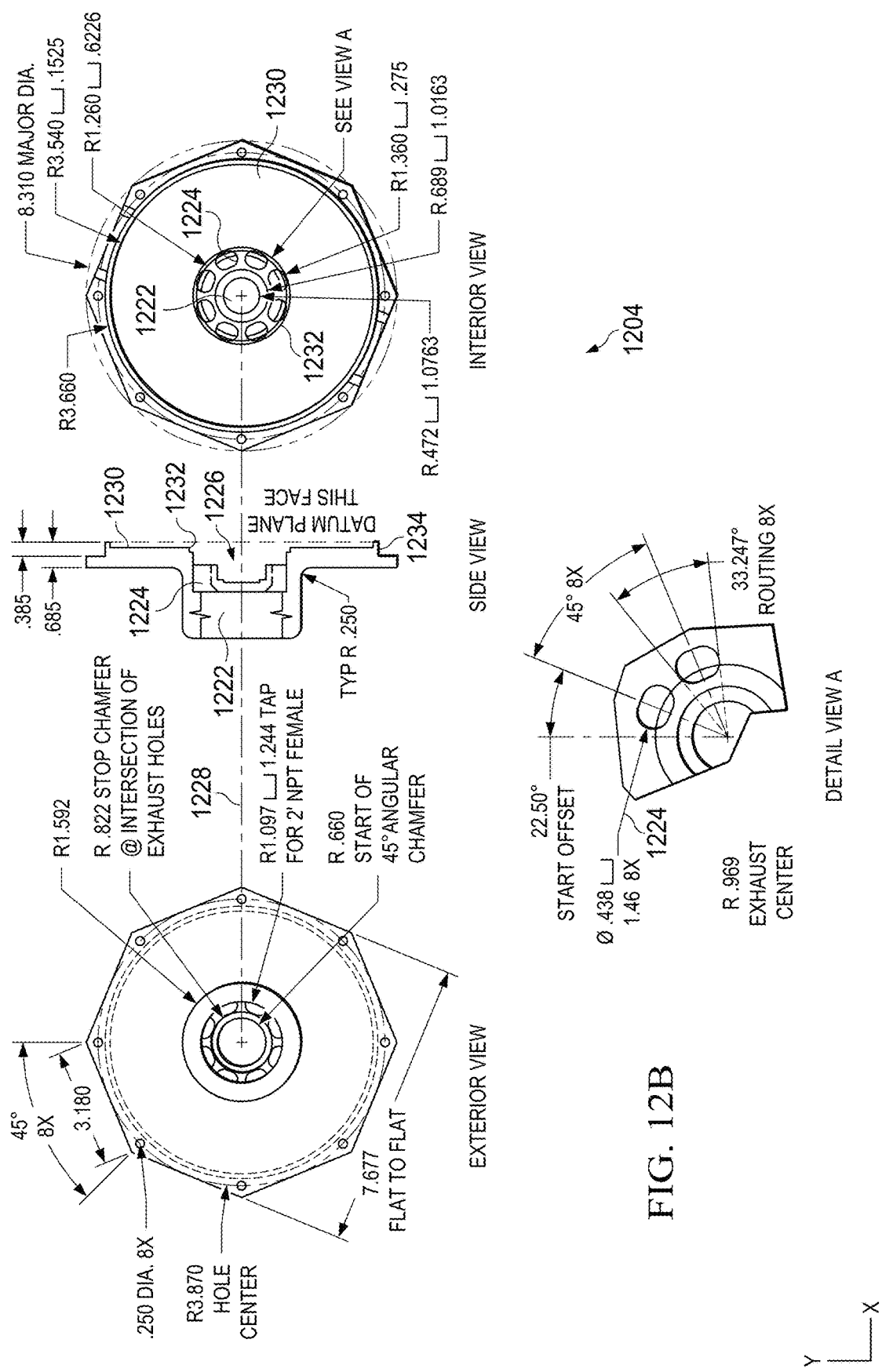
Figure 12C:
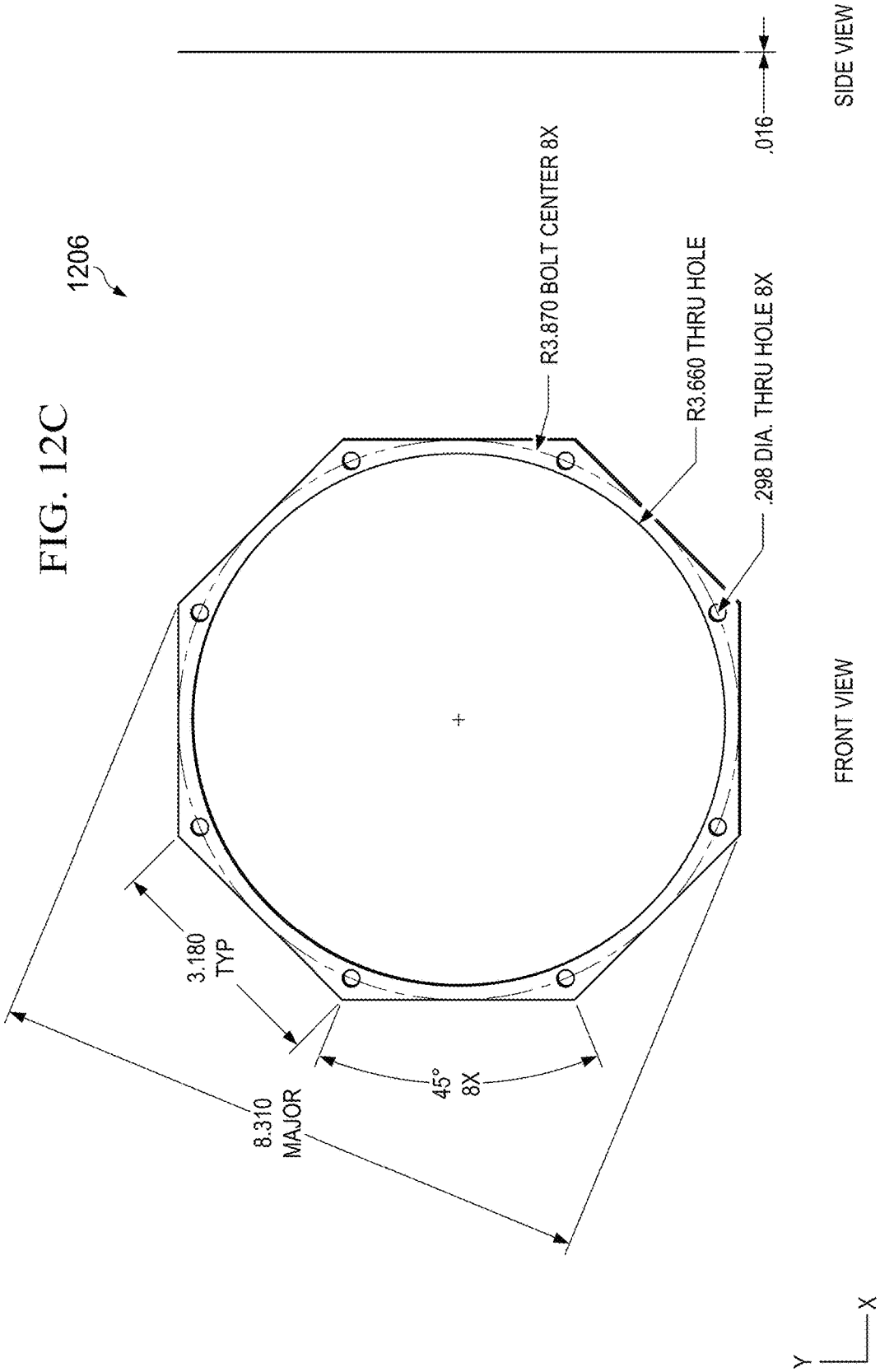
Figure 13A:
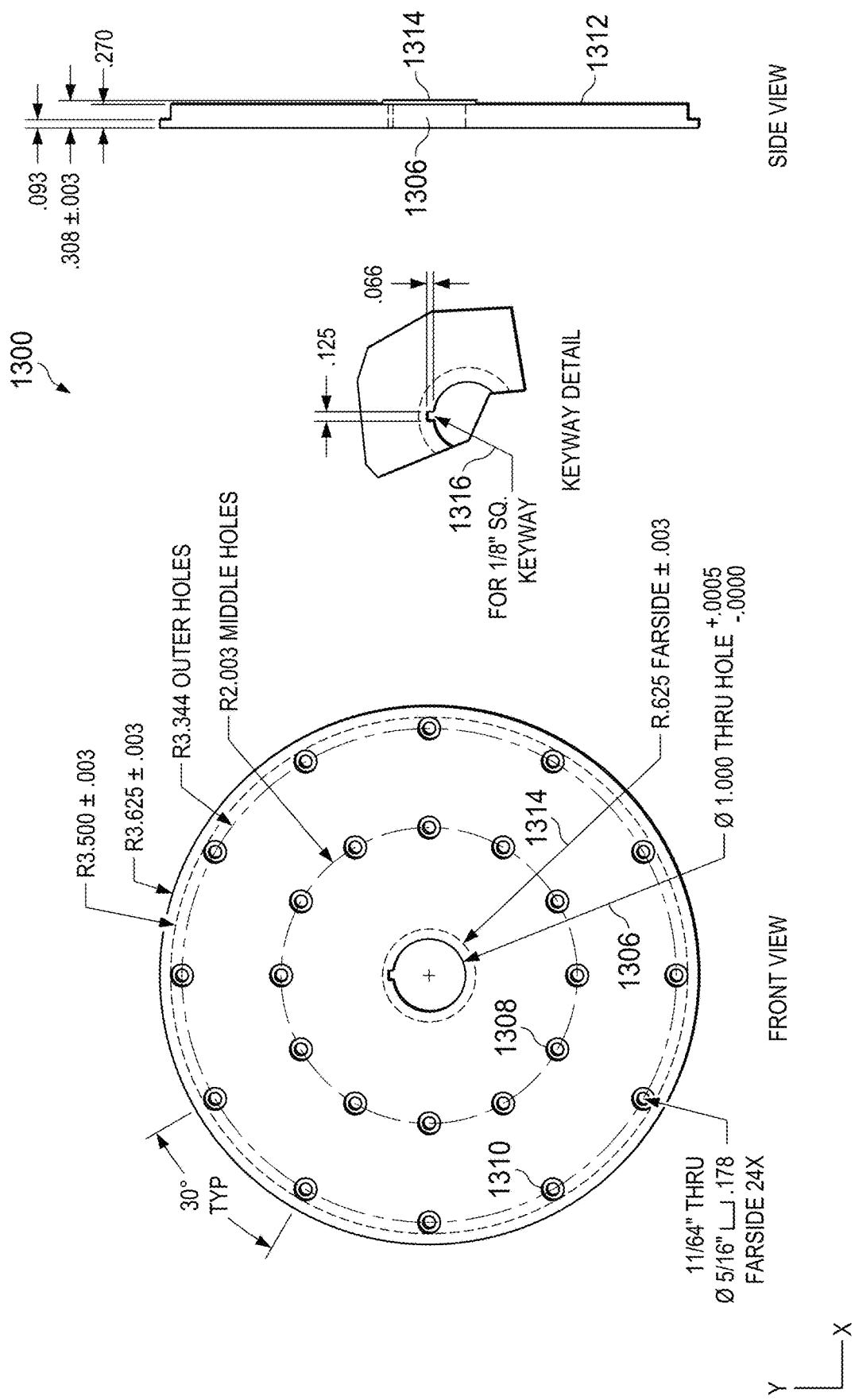
FIGS. 13A, 13B and 13C are diagrams of the rear, intermediate and front discs, respectively, for the fluid/vapor turbine in accordance with one embodiment of the present invention.
Figure 13B:
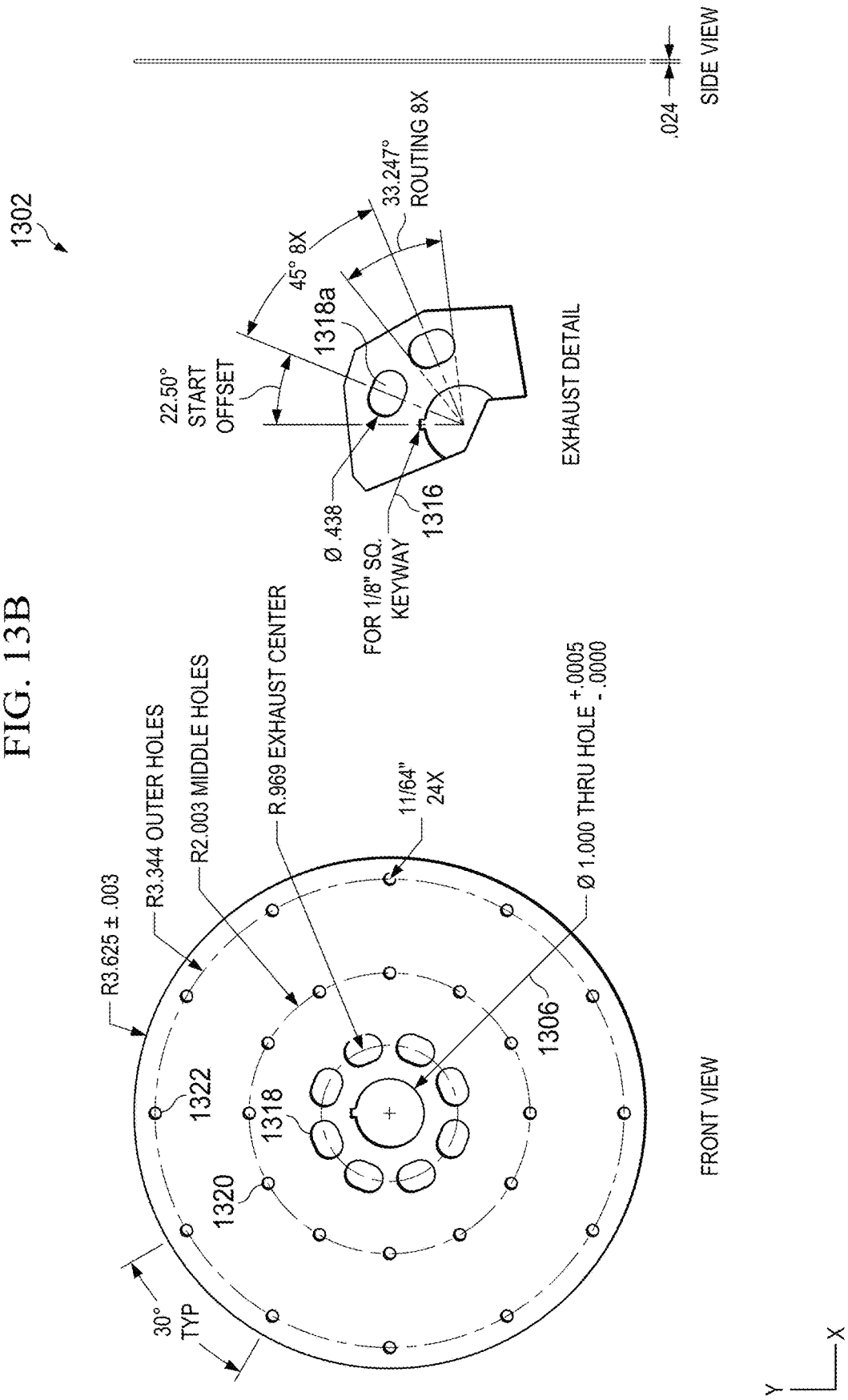
Figure 13C:
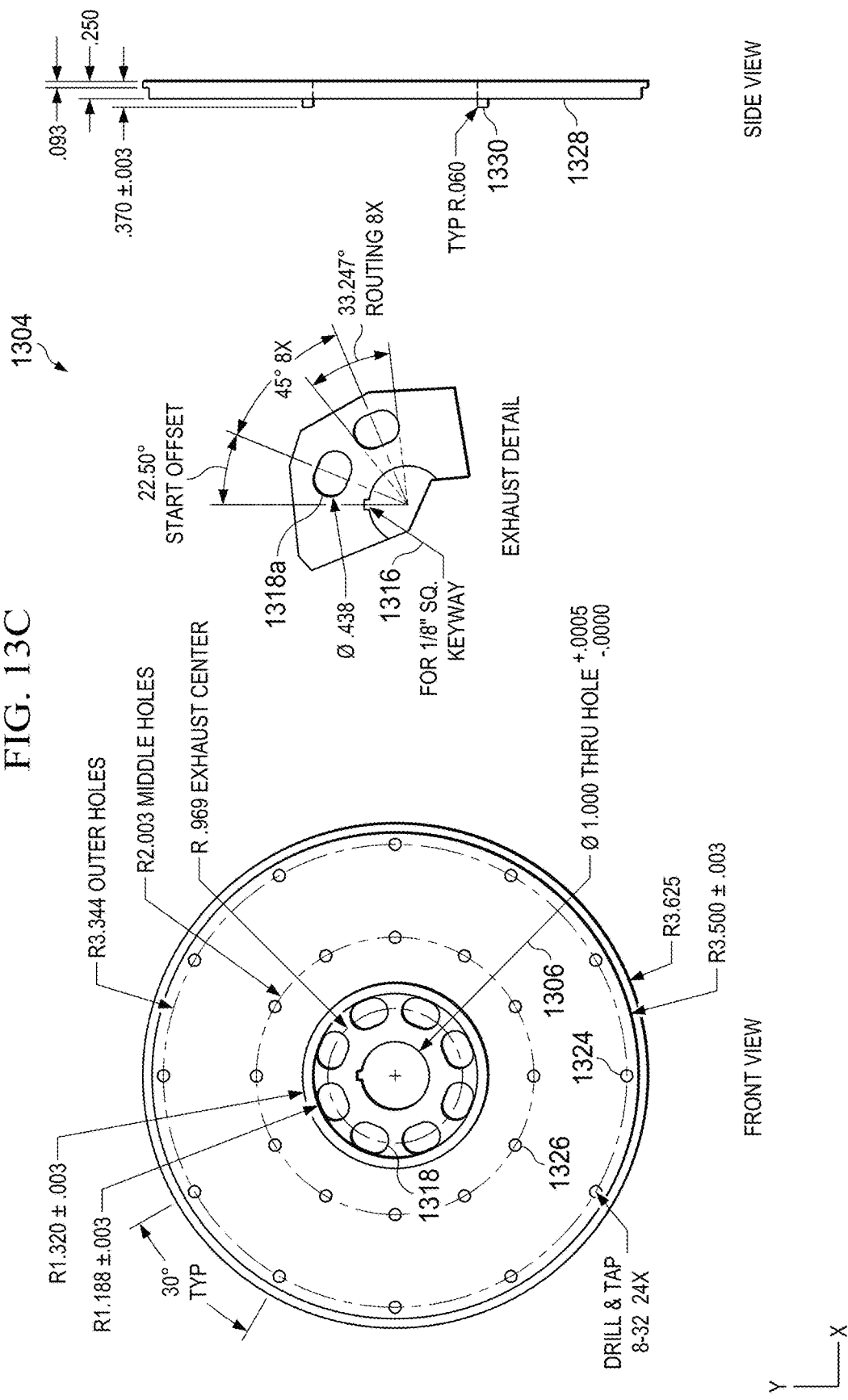
Figure 14A:
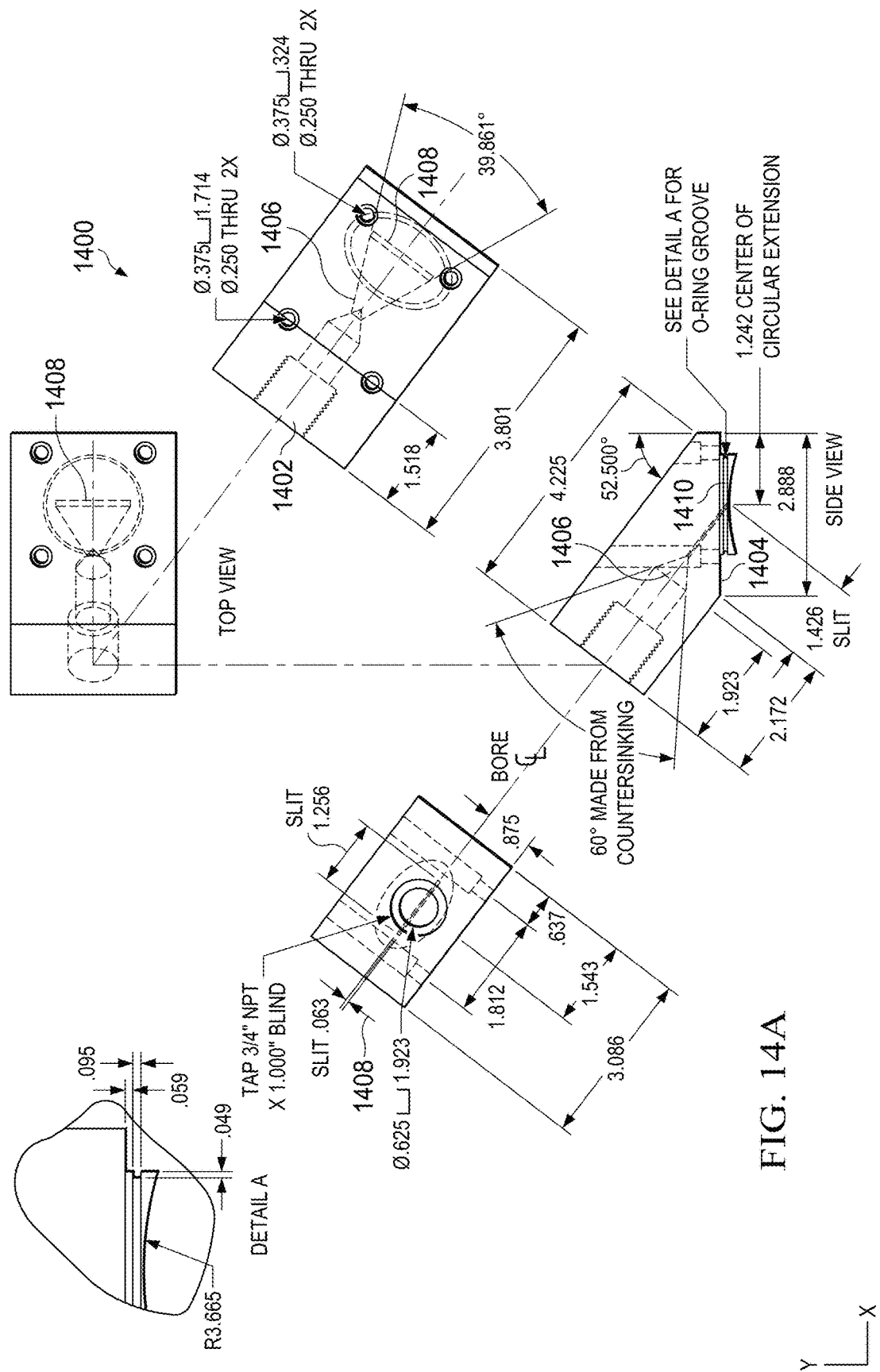
FIGS. 14A and 14B are diagrams of an inlet nozzle and gasket for the fluid/vapor turbine in accordance with one embodiment of the present invention.
Figure 14B:
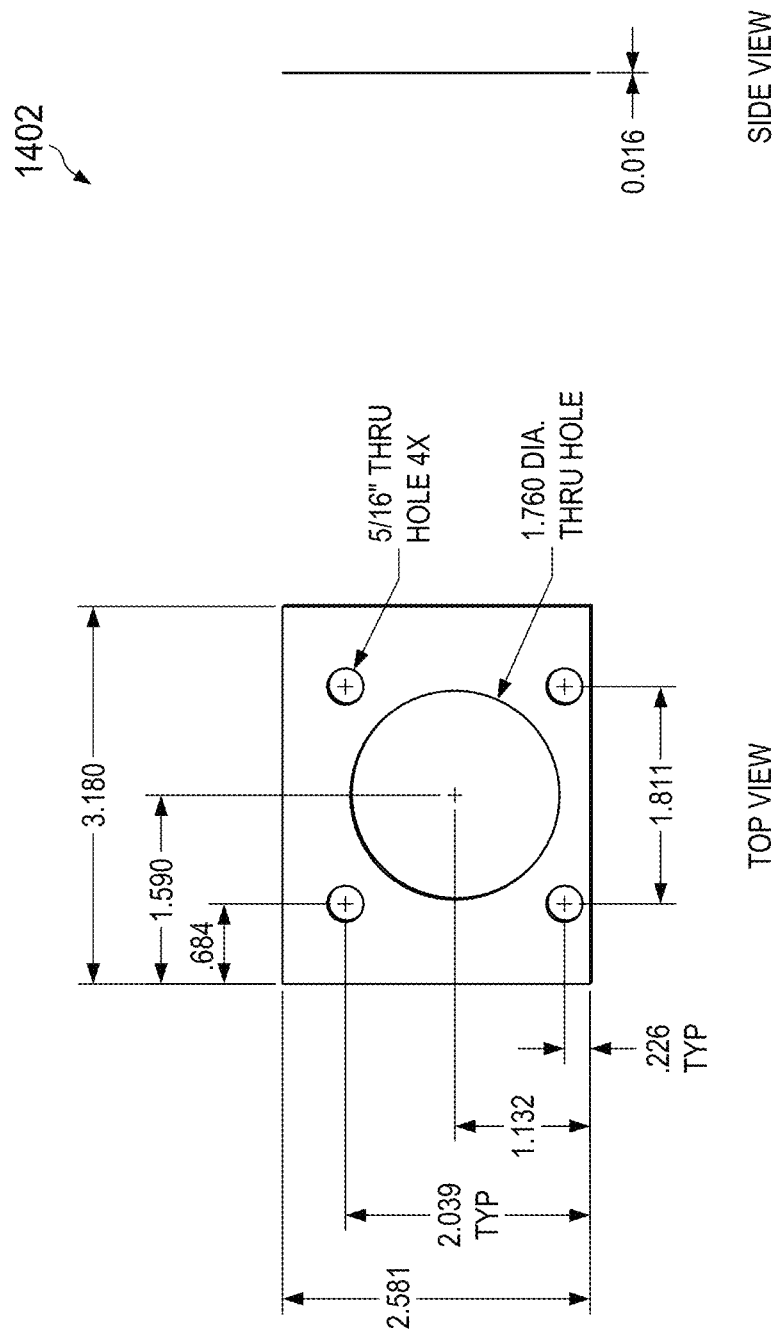
Figure 15:
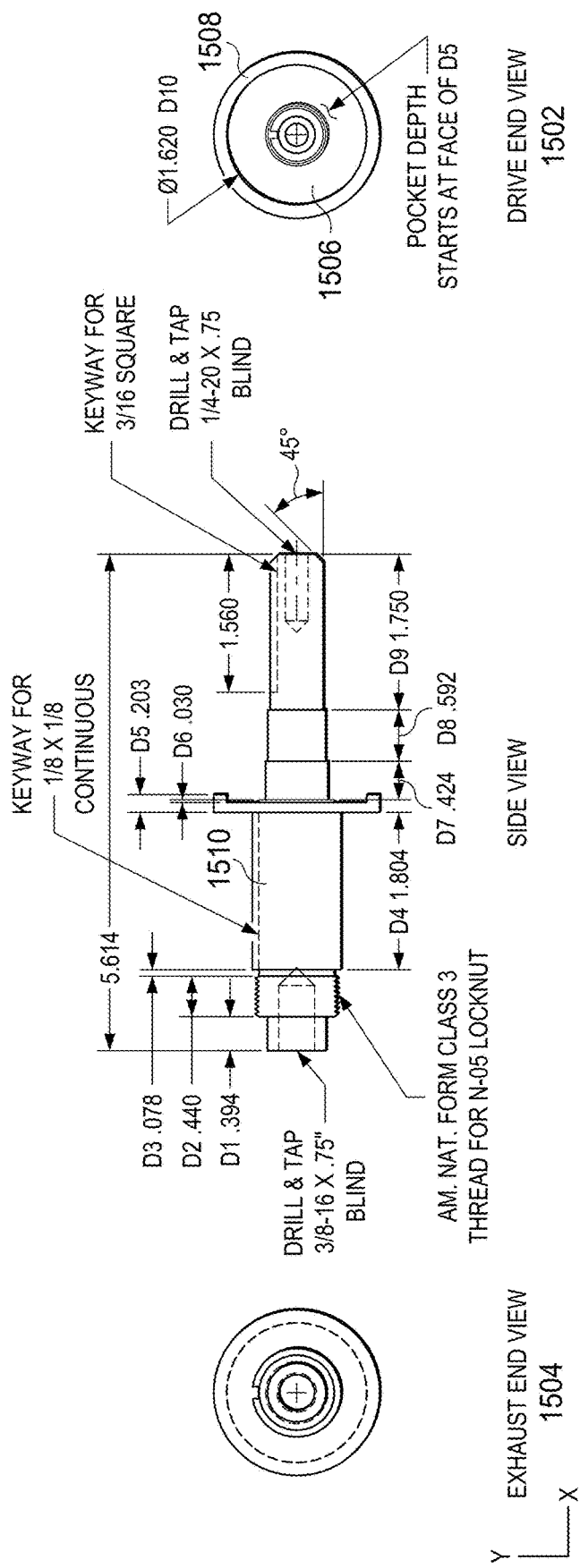
FIG. 15 is a diagram of a shaft for the fluid/vapor turbine in accordance with one embodiment of the present invention.

More specifically, FIGS. 12A, 12B and 12C are diagrams showing various views and details of a turbine case 1200 for the bladeless turbine in accordance with one embodiment of the present invention. FIGS. 13A, 13B and 13C are diagrams of the front, intermediate and rear discs, respectively, for the bladeless turbine in accordance with one embodiment of the present invention. FIGS. 14A and 14B are diagrams of an inlet nozzle and a gasket in accordance with one embodiment of the present invention. FIG. 15 is a diagram of a turbine/generator common shaft in accordance with one embodiment of the present invention.

The turbine case 1200 is a metal housing having a main housing 1202 (FIG. 12A), a cover 1204 (FIG. 12B) and a gasket 1206 (FIG. 12C) disposed between the main housing 1202 (also called a shell) and the cover 1204 (also called a lid). The turbine case 1200 surrounds and completely encases the turbine discs 1300 (FIG. 13A), 1302 (FIG. 13B) and 1304 (FIG. 13C). The turbine case 1200 is designed to contain the flow of fluids and gases from the inlet nozzle 1400 (FIG. 14A), around, over, and through the turbine discs 1300 (FIG. 13A), 1302 (FIG. 13B) and 1304 (FIG. 13C) to the exhaust port 1208. Additionally, integral to the turbine case 1200 is the ability to mount the bladeless to a frame, housing, or other fixture. Part of the case design is the labyrinth seal which prevents the gases from escaping from between the center rotating shaft 1500 (FIG. 15) and the case 1200 itself. More specifically and will be apparent from the description below, the labyrinth seal is formed by shape and positioning of the turbine discs, the main housing, the case and the drive shaft. The turbine case 1200 can be easily manufactured at high volume and low cost. No additional seals are needed or exterior mounting fixtures to hold the turbine to a frame or fixture. Due to its compact size (longer horizontal axis for the same overall surface area) when compared to other turbine disc designs, it can fit into a relatively small space.

As shown in FIG. 12A, the main housing 1202 includes an annular cavity 1208 in which the turbine discs 1300 (rear), 1302 (intermediate) and 1304 (front) are free to rotate, one or more holes 1210 to accommodate a fixed nozzle 1500, and a center through hole 1212 for the drive end 1502 of the shaft 1500 to extend through for connection to the generator 216. As shown, the main housing 1202 includes two holes 1212a and 1212b oriented on opposite sides of the main housing 1202. The radius (e.g., 3.665 in) of the annular cavity 1208 is slightly larger than the radius (e.g., 3.625 in) of the turbine discs 1300, 1302 and 1304. The bottom of the annular cavity 1214 includes a first annular recess 1216 to receive a portion 1312 of the rear disc 1300, and a second annular recess 1218 to receive a ridge 1508 on the annular disc stop 1506 of the shaft 1500. The second annular recess 1218 also includes an annular groove 1220 to receive an annular ridge or ring 1508 on the annular disc stop 1506 of the shaft 1500. The first annular recess 1216 has a slightly smaller radius (e.g., 3.540 in) than the radius (e.g., 3.665 in) the annular cavity 1208. The second annular recess 1218 has a slightly larger radius (e.g., 0.968 in) than the radius (e.g., 0.9375 in) of the annular disc stop 1506 of the shaft 1500.

As shown in FIG. 12B, the cover 1204 includes an exhaust outlet (threaded hole) 1222 for connection to the hoses or pipes that lead to the pressure vessel 218, a set of exhaust holes 1224 positioned proximate to the perimeter of the exhaust outlet 1222, and a recess or opening 1226 for the exhaust end 1504 of the shaft 1500. As shown, the set of exhaust holes 1224 comprise eight ellipse-shaped or oval-shaped holes equally spaced around the shaft 1500 at a fixed distance from the centerline 1228 of the housing 1200. The cover 1204 also includes a first annular recess 1230 to receive a portion of the front disc 1304, and a second annular recess 1232 to receive an annular ridge or ring 1330 on the front disc 1304. The first annular recess 1230 has a slightly smaller radius (e.g., 3.540 in) than the radius (e.g., 3.665 in) the annular cavity 1214. The second annular recess 1232 has a slightly larger radius (e.g., 0.1.360 in) than the radius (e.g., 1.320 in) of the annular ridge or ring 1330 on the front disc 1304. A portion of the cover 1234 extends into the annular cavity 1214 and the cover 1204 is affixed to the main housing 1202 using standard hardware and gasket 1206.

As shown in FIG. 13A, the rear disc 1300 includes an opening 1306 for the shaft 1500, a set of middle holes 1308 positioned annularly around the opening 1306, a set of outer holes 1310 positioned annularly around the opening 1306, a smaller diameter portion 1312, and a raised annular portion 1314 around the opening 1306. The opening 1306 includes a keyway 1316 for rotationally securing the rear disc 1300 to the shaft 1500. As shown, the set of middle holes 1308 comprises twelve holes equally spaced approximately thirty degrees (30°) from one another within a middle portion of the rear disc 1300 (e.g., at a radius of 2.003 in from the centerline 1228), and the set of outer holes 1310 comprises twelve holes equally spaced approximately thirty degrees (30°) from one another proximate to a perimeter of the rear disc 1300 (e.g., at a radius of about 3.344 in from the centerline 1228). Note that a different number, sizing and spacing (e.g., 15° to 60°) can be used. The smaller diameter portion 1312 fits into the first annular recess 1216 of the main housing 1202. The raised annular portion 1314 contacts the disc stop 1506 of the shaft 1500.

As shown in FIG. 13B, the intermediate disc 1302 includes an opening 1306 for the shaft 1500, a set of exhaust ports 1318 positioned annularly around the opening 1306, and a set of middle holes 1320 positioned annularly around the opening 1306, a set of outer holes 1322 positioned annularly around the opening 1306. The opening 1306 includes a keyway 1316 for rotationally securing the rear disc 1300 to the shaft 1500. As shown, the set of middle holes 1320 comprises twelve holes equally spaced approximately thirty degrees) (30°) from one another within a middle portion of the intermediate disc 1302 (e.g., at a radius of 2.003 in from the centerline 1228), and the set of outer holes 1322 comprises twelve holes equally spaced approximately thirty degrees (30°) from one another proximate to a perimeter of the intermediate disc 1302 (e.g., at a radius of about 3.344 in from the centerline 1228). Note that a different number, sizing and spacing (e.g., 15° to 60°) can be used. The set of exhaust ports 1318 comprise eight ellipse-shaped or oval-shaped holes offset from one another by approximately forty-five degrees (45°) at a equal distance (e.g., 0.969 in) from the centerline 1228. The first exhaust port 1318a is offset from the keyway 1316 by approximately twenty-two and one-half degrees (22.5°). Note that a different number, offset (e.g., 15° to 30°), sizing and spacing (e.g., 30° to 60°) can be used. The pattern, size, and location of the discs in relationship to the turbine shaft 1500 is aerodynamically designed to create a turbulent free flow of exhaust gases from the turbine discs 1300, 1302 and 1304 to the exhaust pipe. The design has a higher flow rate and therefore is less restrictive than other designs. This design (better flow rate) facilities the turbine having a higher adiabatic efficiency. Note that more than one intermediate disc 1302 can be used.

As shown in FIG. 13C, the front disc 1304 includes an opening 1306 for the shaft 1500, a set of middle holes 1324 positioned annularly around the opening 1306, a set of outer holes 1326 positioned annularly around the opening 1306, a smaller diameter portion 1328, and a raised annular ridge or ring 1330 around the opening 1306. The opening 1306 includes a keyway 1316 for rotationally securing the rear disc 1300 to the shaft 1500. As shown, the set of middle holes 1324 comprises twelve holes equally spaced approximately thirty degrees (30°) from one another within a middle portion of the front disc 1304 (e.g., at a radius of 2.003 in from the centerline 1228), and the set of outer holes 1326 comprises twelve holes equally spaced approximately thirty degrees (30°) from one another proximate to a perimeter of the front disc 1304 (e.g., at a radius of about 3.344 in from the centerline 1228). Note that a different number, sizing and spacing (e.g., 15° to 60°) can be used. The smaller diameter portion 1328 fits into the first annular recess 1230 of the cover 1204. The raised annular ridge or ring 1330 fits into the second annular recess 1232 of the cover 1204. The set of exhaust ports 1318 comprise eight ellipse-shaped or oval-shaped holes offset from one another by approximately forty-five degrees (45°) at a equal distance (e.g., 0.969 in) from the centerline 1228. The first exhaust port 1318a is offset from the keyway 1316 by approximately twenty-two and one-half degrees (22.5°). Note that a different number, offset (e.g., 15° to 30°), sizing and spacing (e.g., 30° to 60°) can be used. The pattern, size, and location of the turbine discs in relationship to the turbine shaft 1500 is aerodynamically designed to create a turbulent free flow of exhaust gases from the turbine discs 1300, 1302 and 1304 to the exhaust pipe. The design has a higher flow rate and therefore is less restrictive than other designs. This design (better flow rate) facilities the turbine having a higher adiabatic efficiency.

As shown in FIG. 14A, the inlet nozzle 1400 is the pattern, shape and size of the cavity created within the block of material (metal or ceramic) where the inlet pipe connects on one end 1402 of the block and the opposite end 1404 is mounted to the turbine case 1202. The inlet nozzle controls the pattern, pressure, and distribution of the fluid and vapor across the turbine discs 1300, 1302 and 1304. This design is optimized for the flow of two phase steam when used with a turbine disc design. This optimal shape allows the turbine to operate at peak performance. When combined with the high flow rate exhaust design, the disc based turbine efficiencies can be equal to or greater than 50% (preferably in excess of 65%) when compared to 18%-20% of other disc based turbine designs. As shown, the inlet nozzle jet 1406 is aligned at a tangent of approximately fifty-two and one-half degrees) (52.5°) and comprises a wedge-shaped slit 1408 having an angle of approximately forty degrees (e.g., 39.861°) that opens into the annular cavity 1208 parallel to the centerline 1228. Other alignments (e.g., 50° to 55°) and angles can be used. FIG. 14B shows the gasket 1402 used to mount the insert portion 1410 and O-ring of the inlet nozzle 1400 in the hole 1210 in the main casing 1202.

As shown in FIG. 15, the turbine and generator common shaft 1500 is a single rotational shaft supporting both the rotating discs 1300, 1302 and 1304 in the fluid/vapor turbine 212 and the rotating parts of a switch reluctance generator 216. The exhaust end 1504 of the shaft 1500 is supported by a bearing (not shown) located in the turbine case 1200. The drive end 1502 of the shaft 1500 is supported by a bearing (not shown) located in the generator case 216. Designed on the shaft is the labyrinth seal used on both the turbine 1200 and generator 216 cases. By using a single shaft 1500 for both a turbine 212 and generator 216 assembly, the total numbers of parts are reduced. No interim connection shaft or coupling is required and the total number of bearings is reduced from four to two. Additionally the over-all space required is reduced. As previously described, the shaft 1500 includes a keyway 1510, an annular disc stop 1506 and an annular ridge or ring 1508 on the annular disc stop 1506.

A bladeless turbine, such as fluid/vapor turbine 212, in accordance with another embodiment of the present invention will now be described in reference to FIGS. 16-20B. This design is provided as an example of a suitable fluid/vapor turbine 212 for the solar power generation system previously described. The bladeless turbine described in FIGS. 16-20B is not limited to use in solar energy systems and can be used in many types of systems, such as biomass combustion, geothermal heat, industrial waste heat recovery (e.g., recovering heat from oil field flaring), and other "green" or semi-"green" systems. Moreover, the bladeless turbine can be used with water, steam, hydrocarbons and refrigerants. As will be appreciated by those skilled in the art, the bladeless turbine in accordance with the present invention is not limited to those systems specifically mentioned or described herein. Finally, any details or components not shown in FIGS. 16-20B that are required to replicate the fluid/vapor turbine in accordance with the present invention will be well known or apparent to those skilled in the art in light of the following FIGURES and description, and are not necessary for a complete understanding of the inventive aspects of the bladeless turbine.

Figure 16:
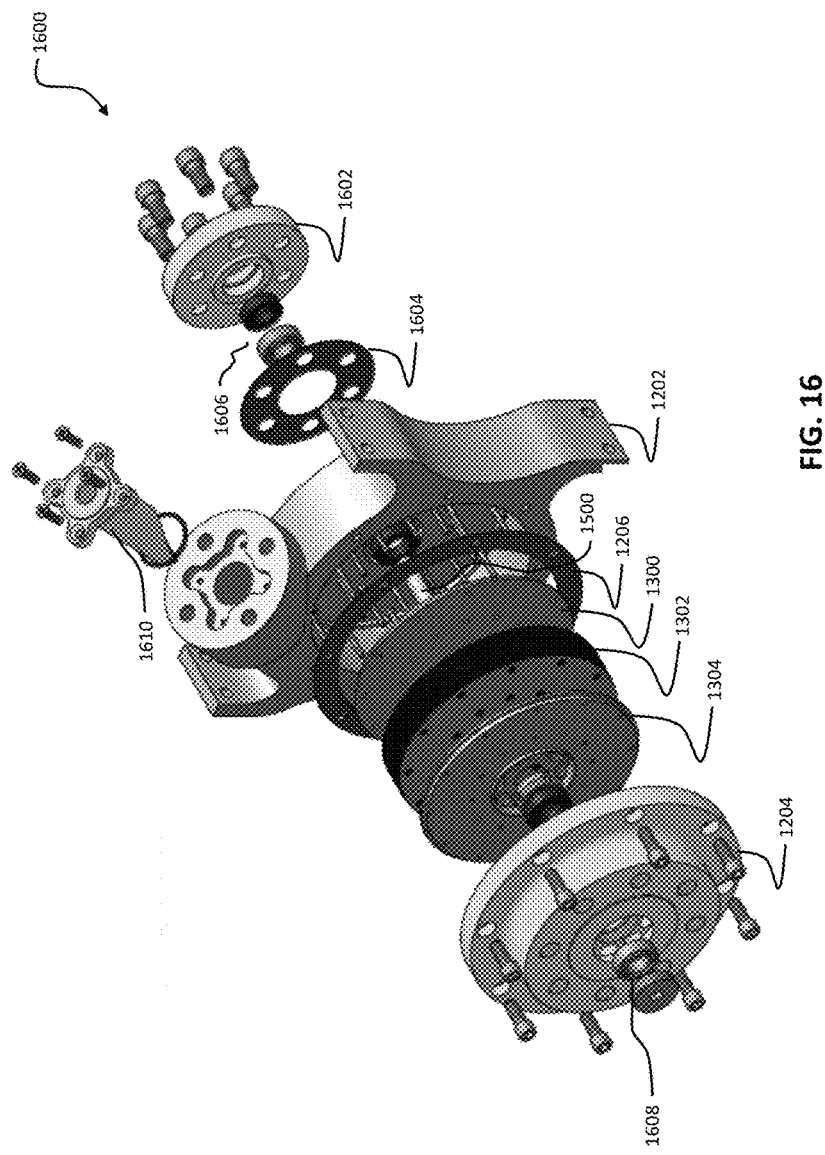
FIG. 16 is an exploded diagram of a fluid/vapor turbine in accordance with another embodiment of the present invention.
Figure 2:
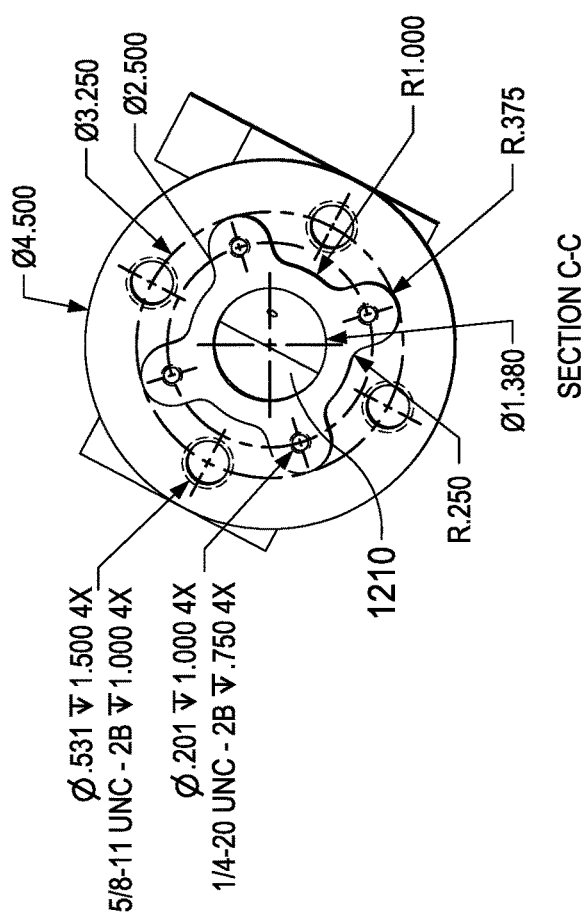

Now referring to FIG. 16, an exploded diagram of a fluid/vapor turbine 212 (1600) in accordance with another embodiment of the present invention is shown. The fluid/vapor turbine 212 (1600) includes three or more turbine discs 1300 (FIG. 18A), 1302 (FIG. 18B) and 1304 (FIG. 18C) disposed within a main housing 1202. Each turbine disc has a center opening, a first set of holes substantially equally spaced from one another along a first radius from a centerline, a second set of holes substantially equally spaced from one another along a second radius from the centerline, and two or more of the turbine discs have a set of exhaust ports positioned annularly around the center opening. The fluid/vapor turbine 212 (1600) also includes a cover 1204 and one or more fluid/vapor inlets oriented to direct a fluid/vapor onto an outer portion of the three or more turbine discs 1300, 1302, 1304. A connector, injector, jet or nozzle 1610 is disposed within each fluid/vapor inlet and secured to the main housing 1202. A drive shaft 1500 passes through the center openings of the three or more turbine discs 1300, 1302, 1304 and attached to the three or more turbine discs 1300, 1302, 1304. The drive shaft 1500 is positioned within the main housing 1202 along the centerline, free to rotate within the case, and extends through the main housing 1202. A fluid/vapor outlet is disposed in the cover 1204 and aligned with the centerline. A set of exhaust holes are proximate to and connected to the fluid/vapor outlet and are positioned annularly around the drive shaft 1500. A first gasket 1206 is disposed between the main housing 1202 and the cover 1204. A bearing cover 1602 is attached to the main housing 1202 and aligned with the center through hole. A bearing cover gasket 1604 is disposed between the main housing 1202 and the bearing cover 1602. One or more sets of first bearings 1606 are disposed within the bearing cover 1602 that support the drive shaft 1500. One or more sets of second bearings 1608 are disposed within the cover 1204 of the main housing 1202 that support the drive shaft 1500.

Figures 1, 17A:
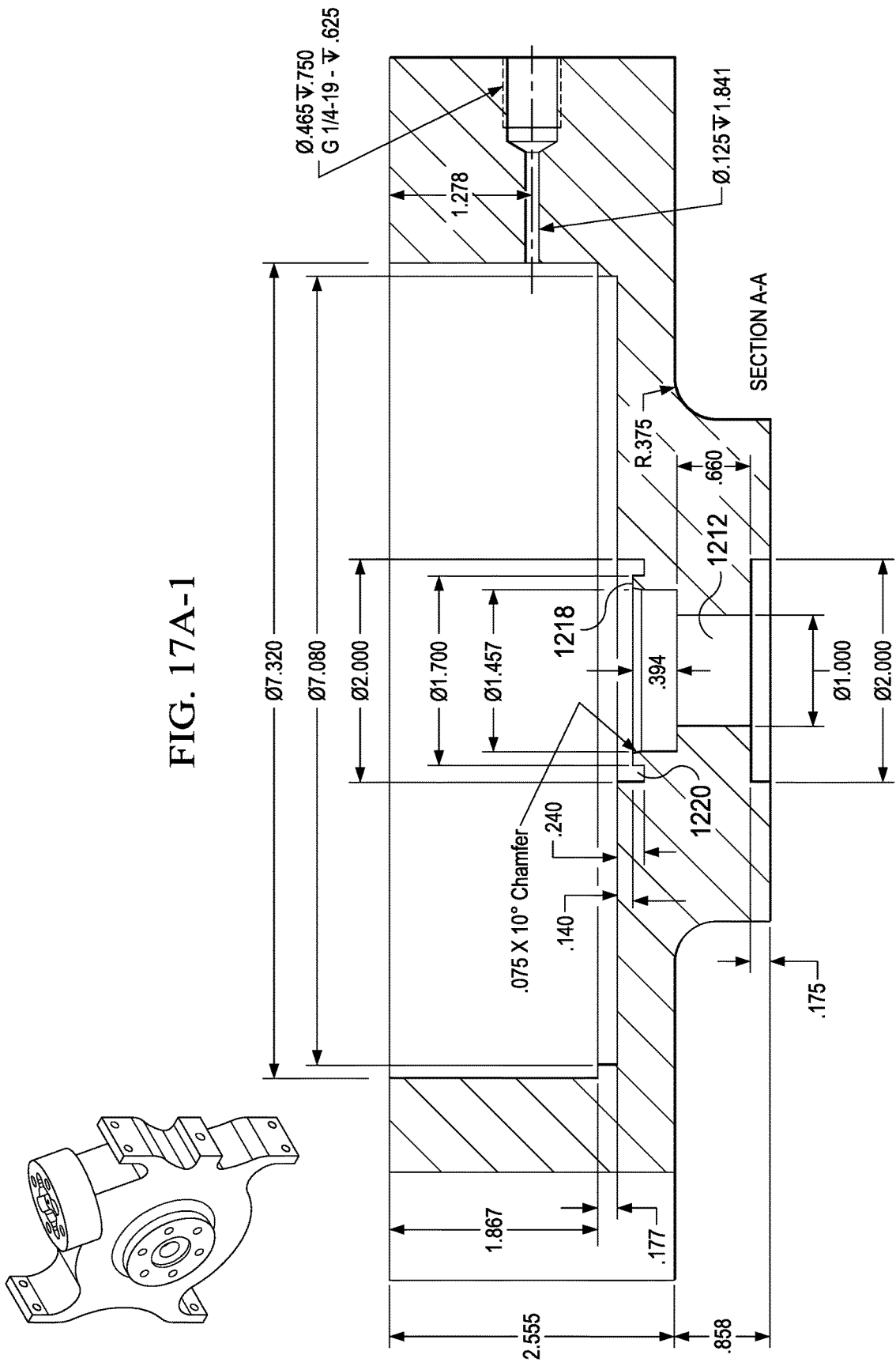
Figures 2, 17A:
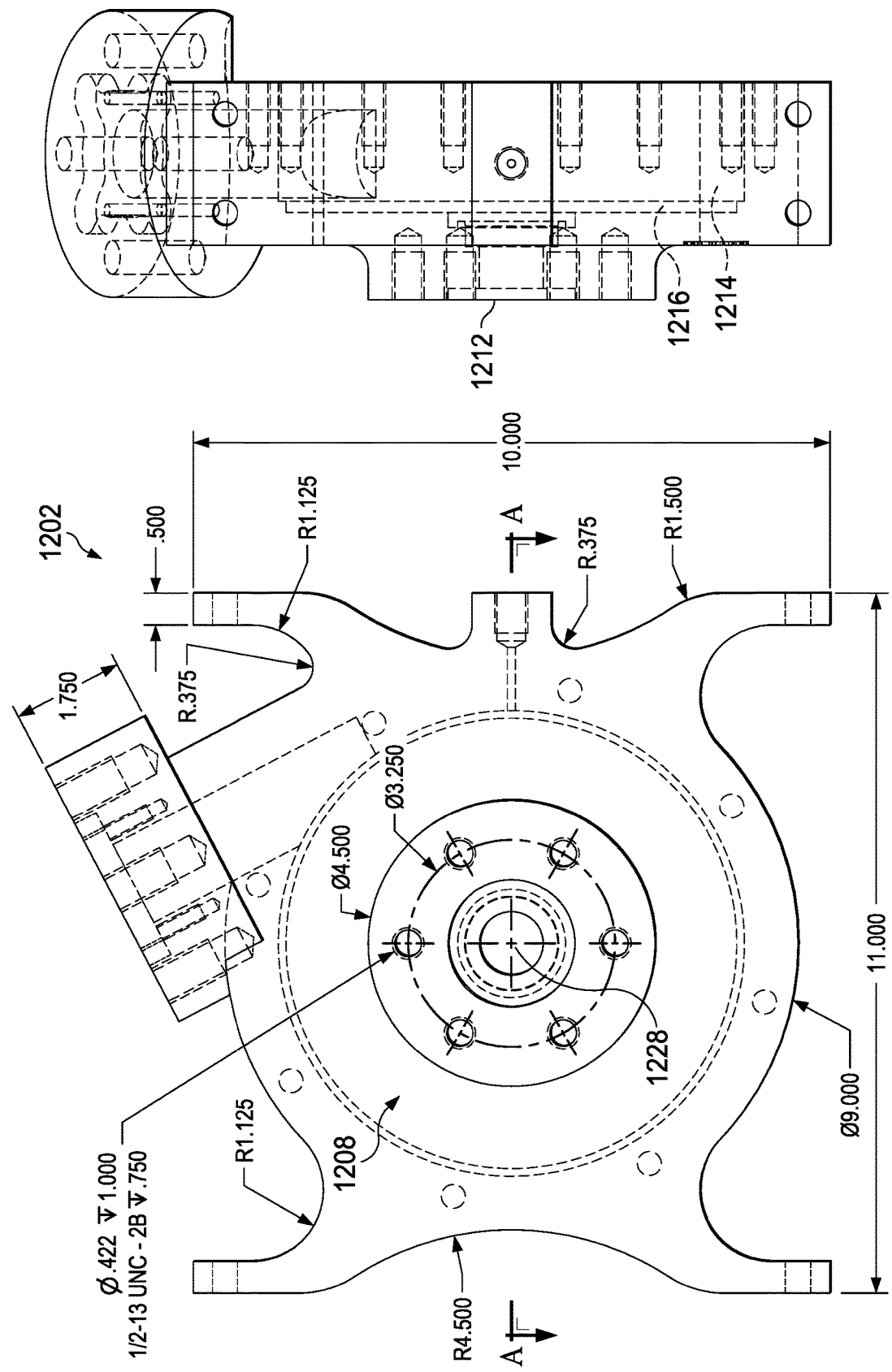
Figures 1, 17B:
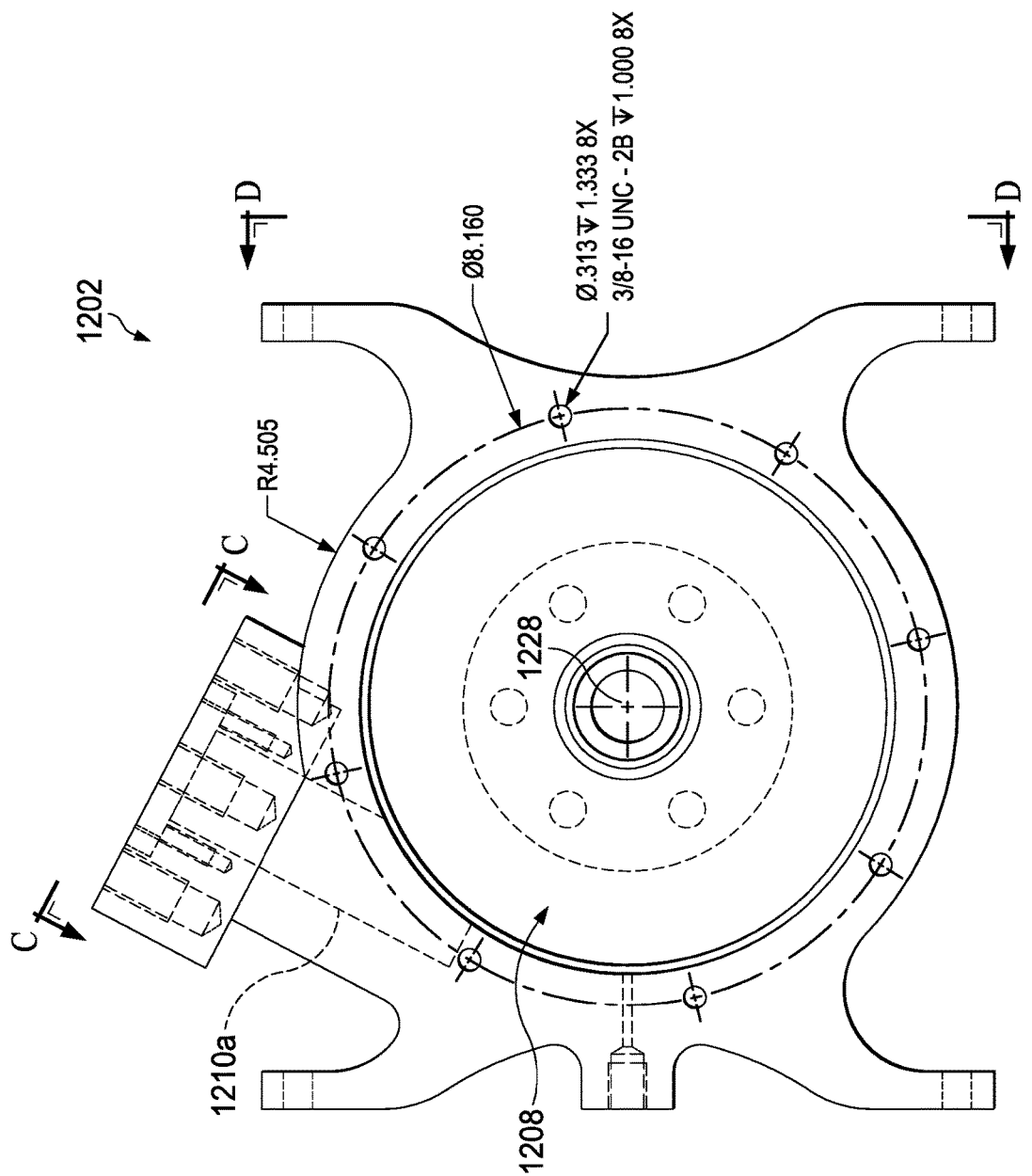
Figure 17B:
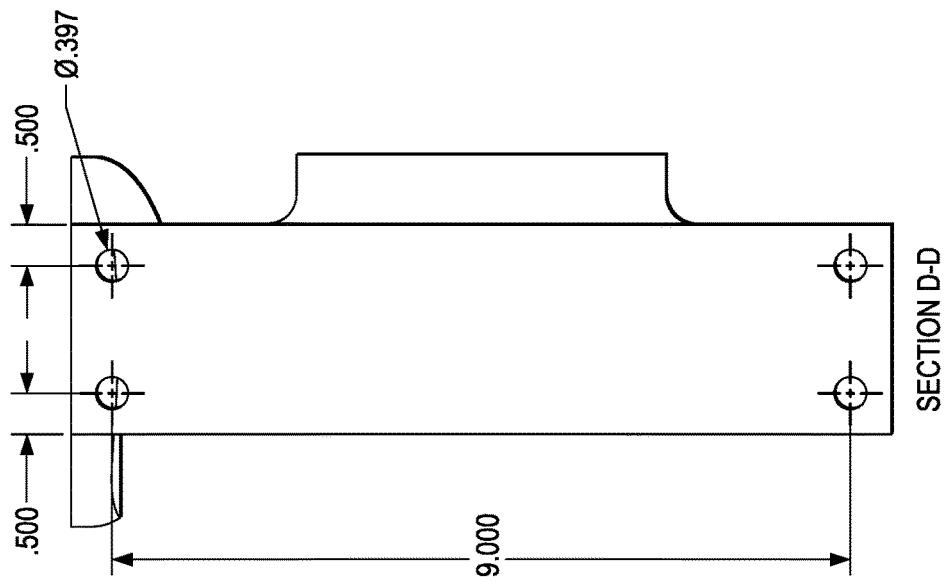
Figures 1, 17C:
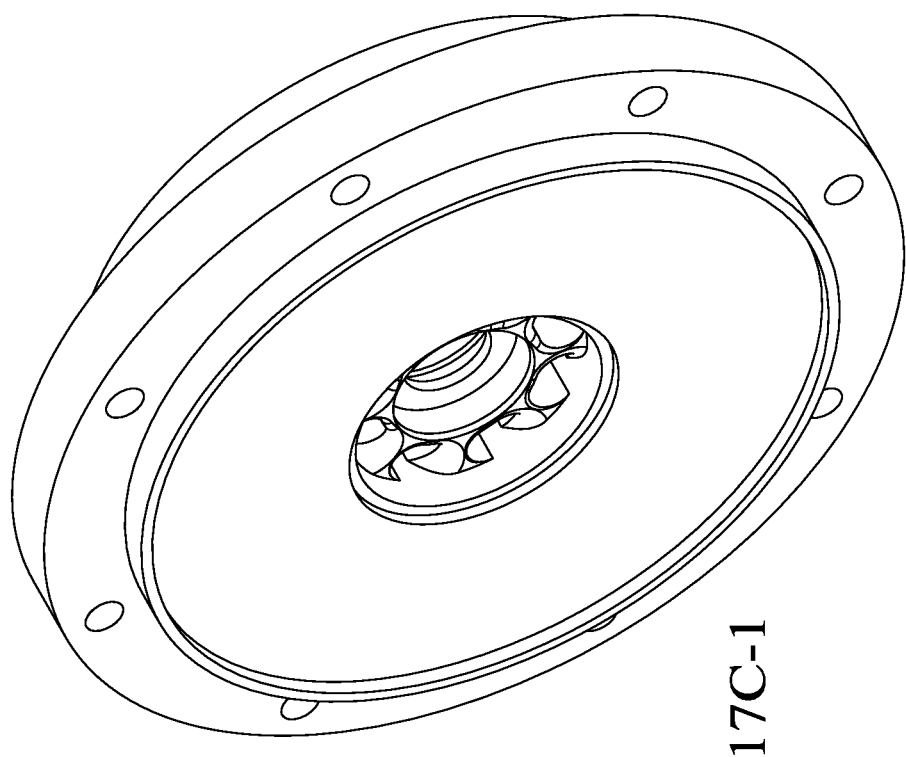
Figures 2, 17C:
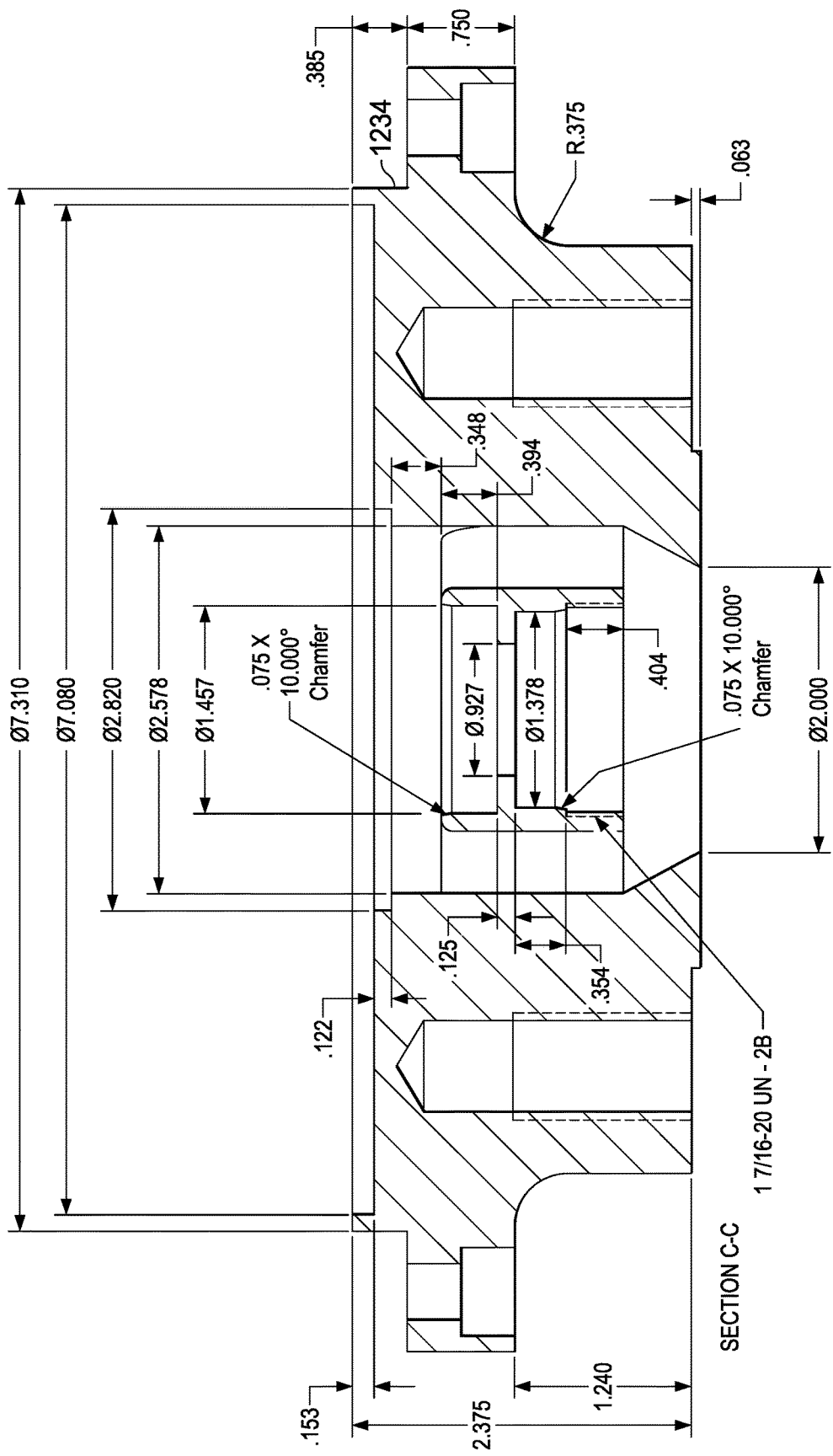
Figures 3, 17C:
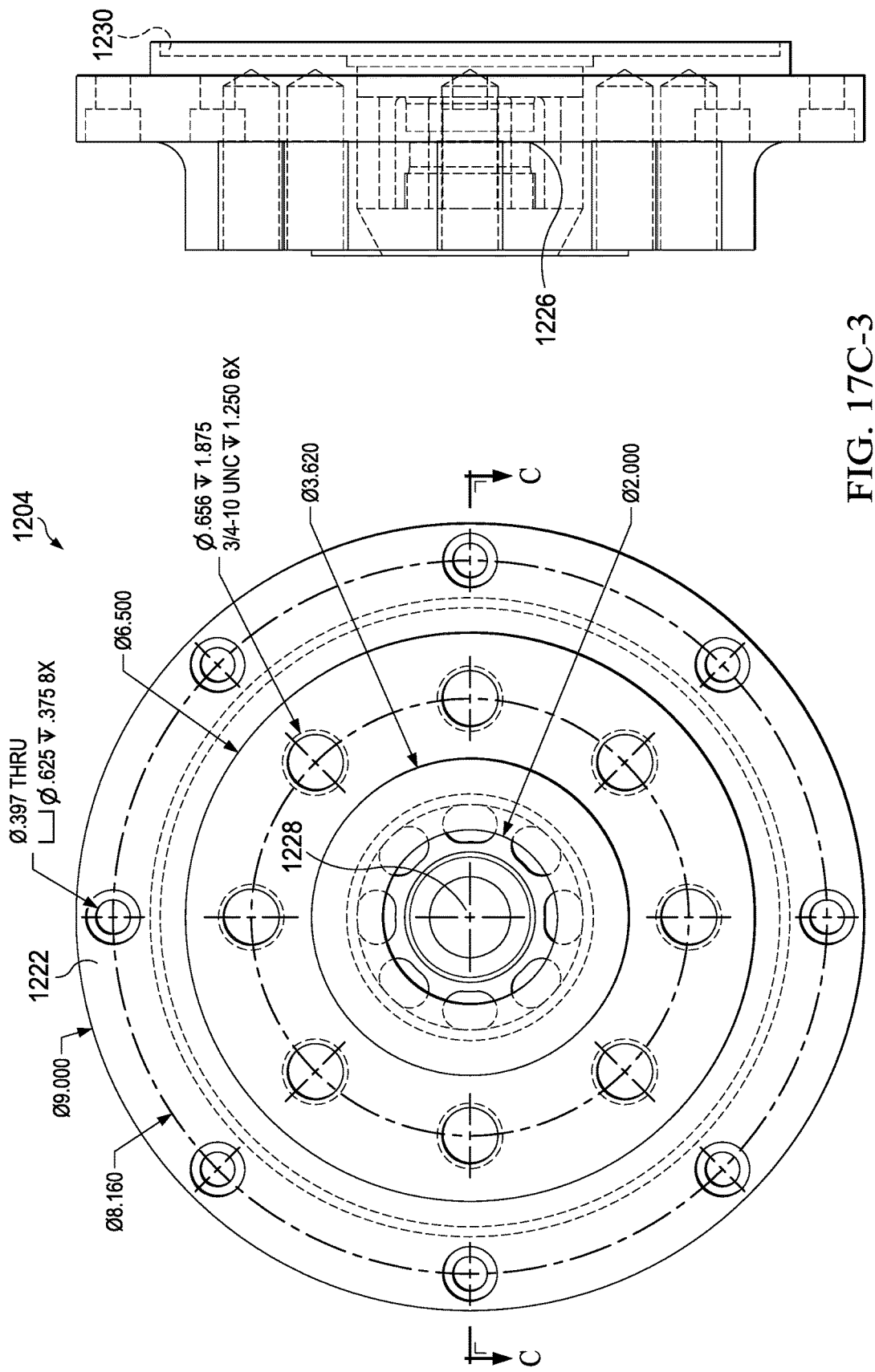
Figures 1, 17D:
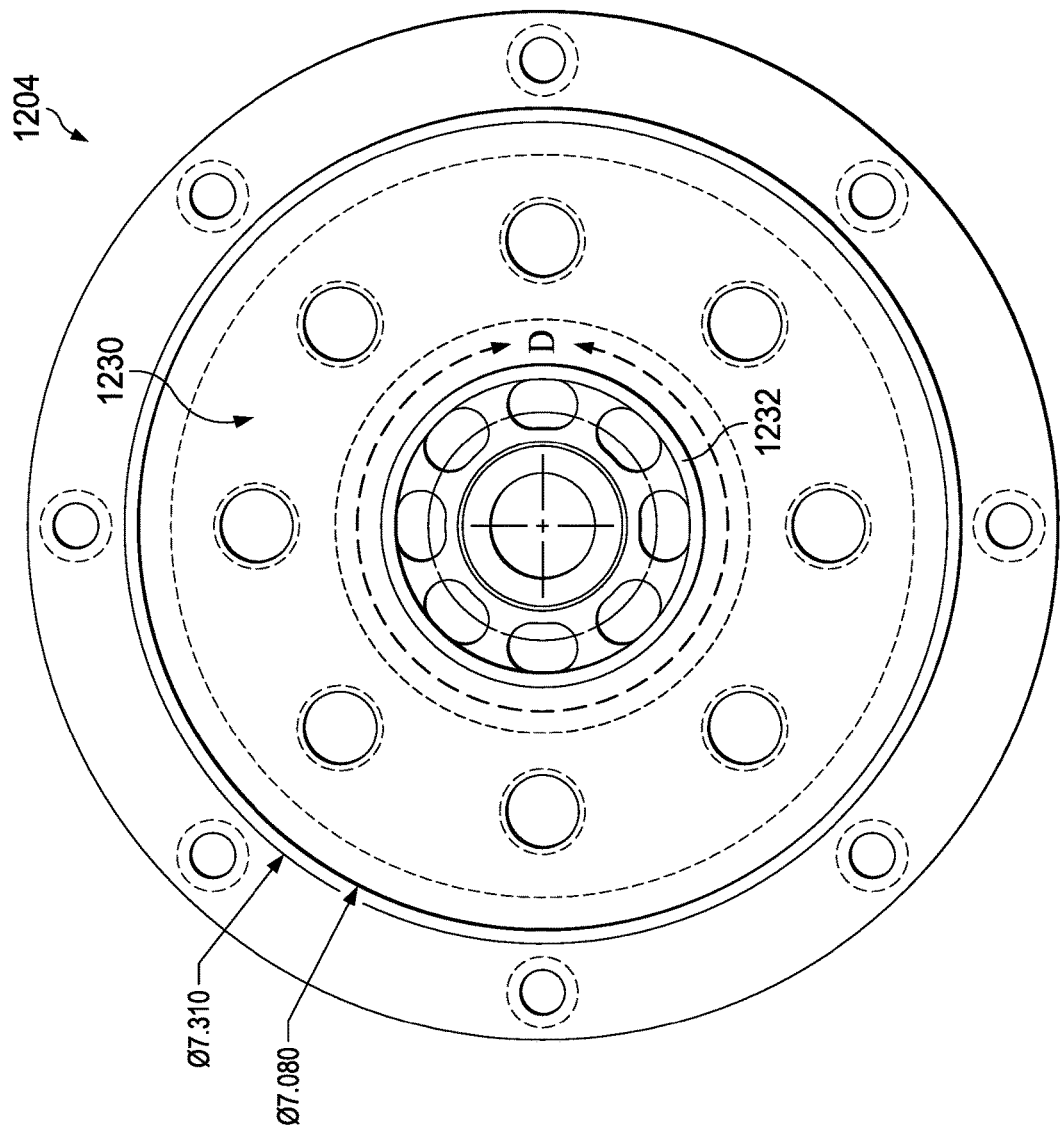
Figures 2, 17D:
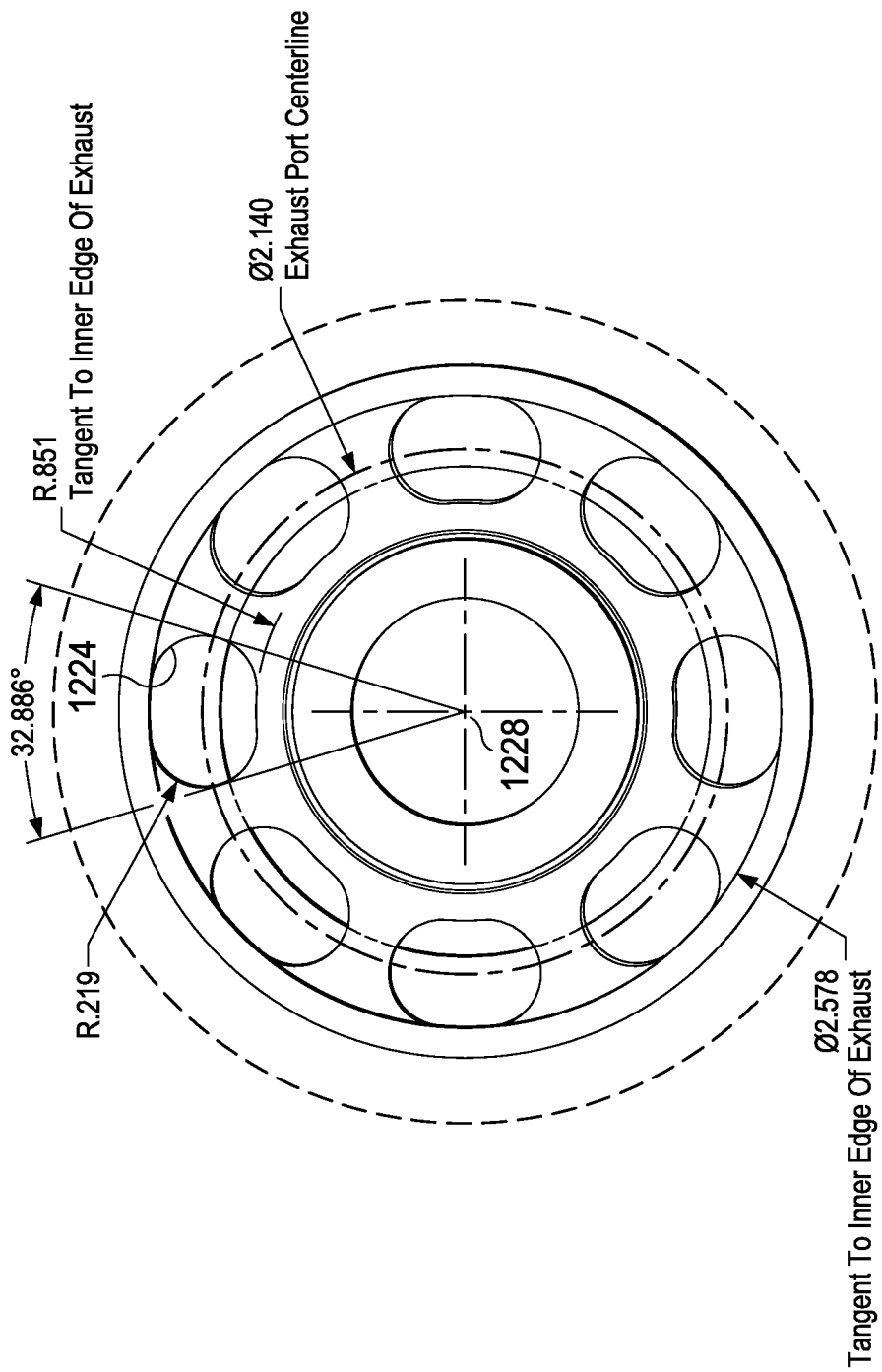
Figure 17E:
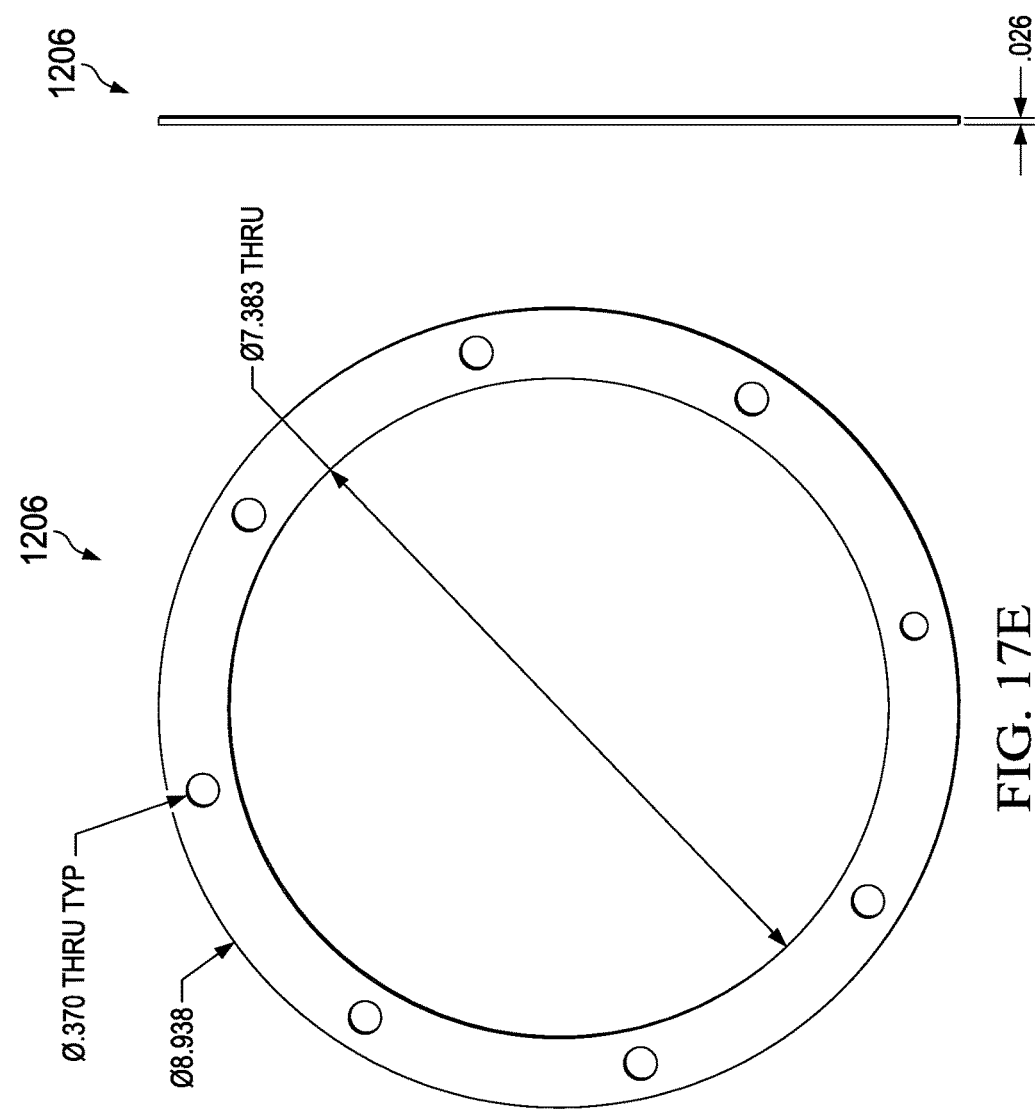
FIG. 17E is a diagram of a turbine cover gasket for the fluid/vapor turbine shown in FIG. 16.
Figure 17E:
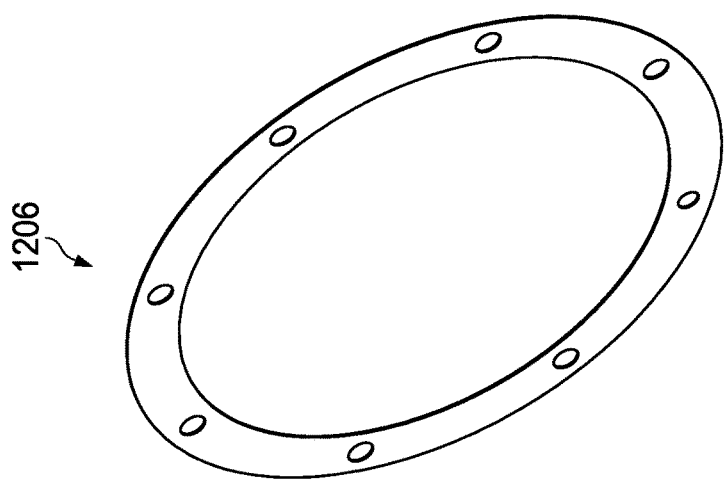

The turbine case is a metal housing having a main housing 1202 (FIGS. 17A-1, 17A-2, 17B-1, 17B-2), a cover 1204 (FIGS. 17C-1, 17C-2, 17C-3, 17D-1, 17D-2) and a gasket 1206 (FIG. 17E) disposed between the main housing 1202 (also called a shell) and the cover 1204 (also called a lid). The turbine case surrounds and completely encases the turbine discs 1300 (FIGS. 18A-1, 18A-2), 1302 (FIGS. 18B-1, 18B-2) and 1304 (FIGS. 18C-1, 18C-2). The turbine case is designed to contain the flow of fluids and gases from the inlet nozzle 1400 (FIG. 14A), around, over, and through the turbine discs 1300 (FIG. 13A), 1302 (FIG. 13B) and 1304 (FIG. 13C) to the exhaust port 1208. Additionally, integral to the turbine case 1200 is the ability to mount the bladeless to a frame, housing, or other fixture. Part of the case design is the labyrinth seal which prevents the gases from escaping from between the center rotating shaft 1500 (FIGS. 19A, 19B) and the case itself. More specifically and will be apparent from the description below, the labyrinth seal is formed by shape and positioning of the turbine discs, the main housing, the case and the drive shaft. The turbine case can be easily manufactured at high volume and low cost. No additional seals are needed or exterior mounting fixtures to hold the turbine to a frame or fixture. Due to its compact size (longer horizontal axis for the same overall surface area) when compared to other turbine disc designs, it can fit into a relatively small space.

FIGS. 17A-1, 17A-2, 17B-1 and 17B-2 are diagrams of a turbine main housing 1202 for the fluid/vapor turbine 1600 shown in FIG. 16. The main housing 1202 includes an annular cavity 1208 in which the turbine discs 1300 (rear), 1302 (intermediate) and 1304 (front) are free to rotate, one or more fluid/vapor inlets 1210, and a center through hole 1212 for the drive end 1502 of the shaft 1500 to extend through for connection to the generator 216. As shown, the main housing 1202 includes two holes 1212a and 1212b oriented on opposite sides of the main housing 1202. The diameter (e.g., 7.32 in) of the annular cavity 1208 is slightly larger than the diameter (e.g., 7.25 in) of the turbine discs 1300, 1302 and 1304. The bottom of the annular cavity 1214 includes a first annular recess 1216 to receive a portion 1312 of the rear disc 1300, and a second annular recess 1218 to receive a ridge 1508 on the annular disc stop 1506 of the shaft 1500. The second annular recess 1218 also includes an annular groove 1220 to receive an annular ridge or ring 1508 on the annular disc stop 1506 of the shaft 1500. The first annular recess 1216 has a slightly smaller radius (e.g., 3.540 in) than the radius (e.g., 3.665 in) the annular cavity 1208. The second annular recess 1218 has a slightly larger radius (e.g., 0.968 in) than the radius (e.g., 0.9375 in) of the annular disc stop 1506 of the shaft 1500.

FIGS. 17C-1, 17C-2, 17C-3, 17D-1 and 17D-2 are diagrams of a turbine cover 1204 for the fluid/vapor turbine 1600 shown in FIG. 16. The cover 1204 includes an exhaust outlet (threaded hole) 1222 for connection to the hoses or pipes that lead to the pressure vessel 218, a set of exhaust holes 1224 positioned proximate to the perimeter of the exhaust outlet 1222, and a recess or opening 1226 for the exhaust end 1504 of the shaft 1500. As shown, the set of exhaust holes 1224 comprise eight ellipse-shaped or oval-shaped holes equally spaced around the shaft 1500 at a fixed distance from the centerline 1228 of the housing 1200. The cover 1204 also includes a first annular recess 1230 to receive a portion of the front disc 1304, and a second annular recess 1232 to receive an annular ridge or ring 1330 on the front disc 1304. The first annular recess 1230 has a slightly smaller radius (e.g., 3.540 in) than the radius (e.g., 3.665 in) the annular cavity 1214. The second annular recess 1232 has a slightly larger radius (e.g., 0.1.360 in) than the radius (e.g., 1.320 in) of the annular ridge or ring 1330 on the front disc 1304. A portion of the cover 1234 extends into the annular cavity 1214 and the cover 1204 is affixed to the main housing 1202 using standard hardware and gasket 1206. FIG. 17E is a diagram of a turbine cover gasket 1206 for the fluid/vapor turbine 1600 shown in FIG. 16.

Figure 18A:
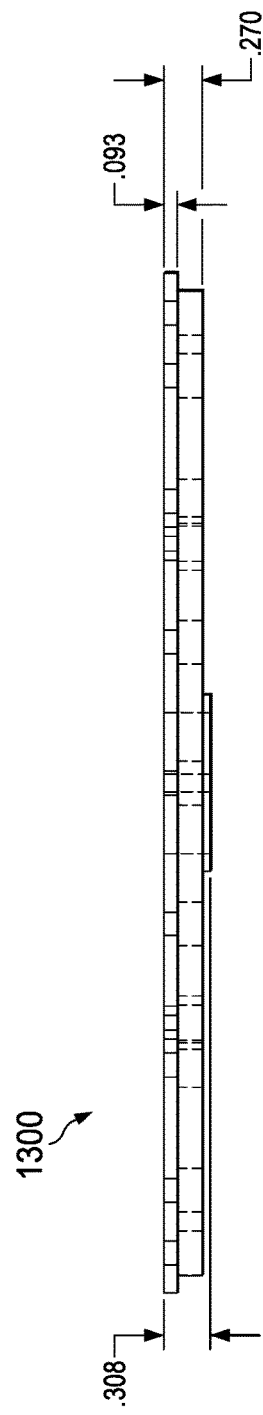
Figure 1:
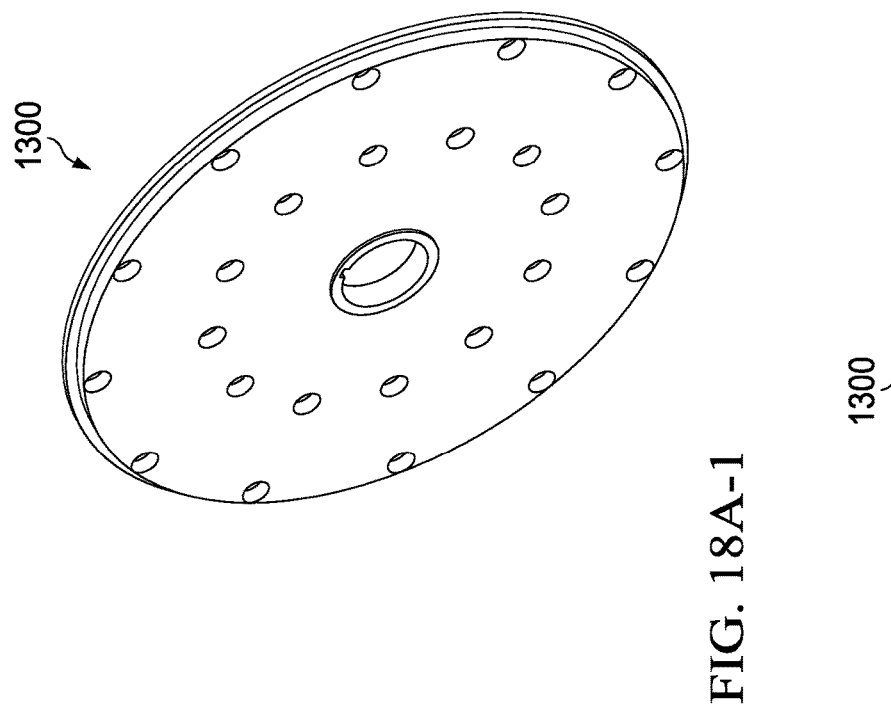
Figures 2, 18A:
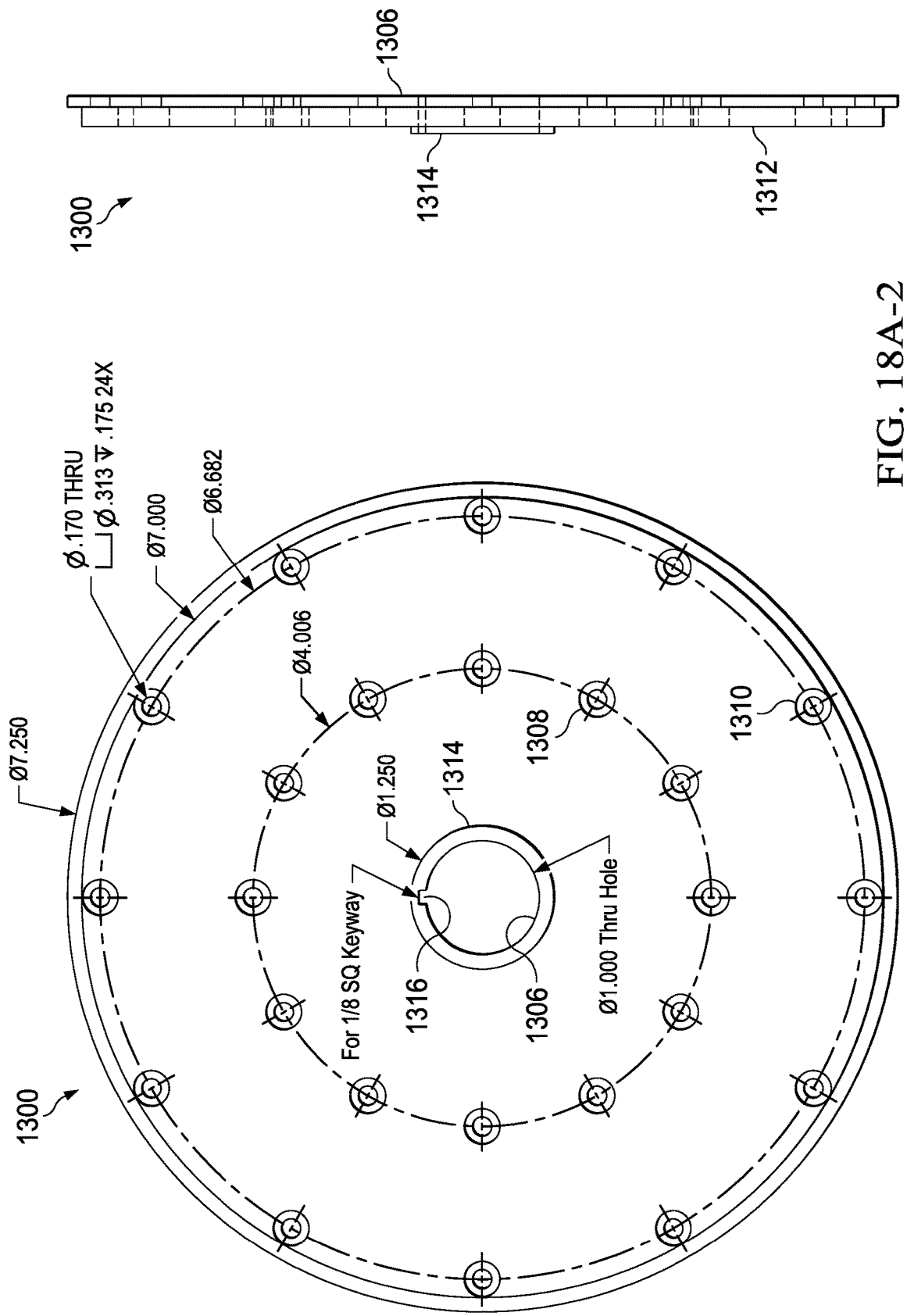
Figure 18B:
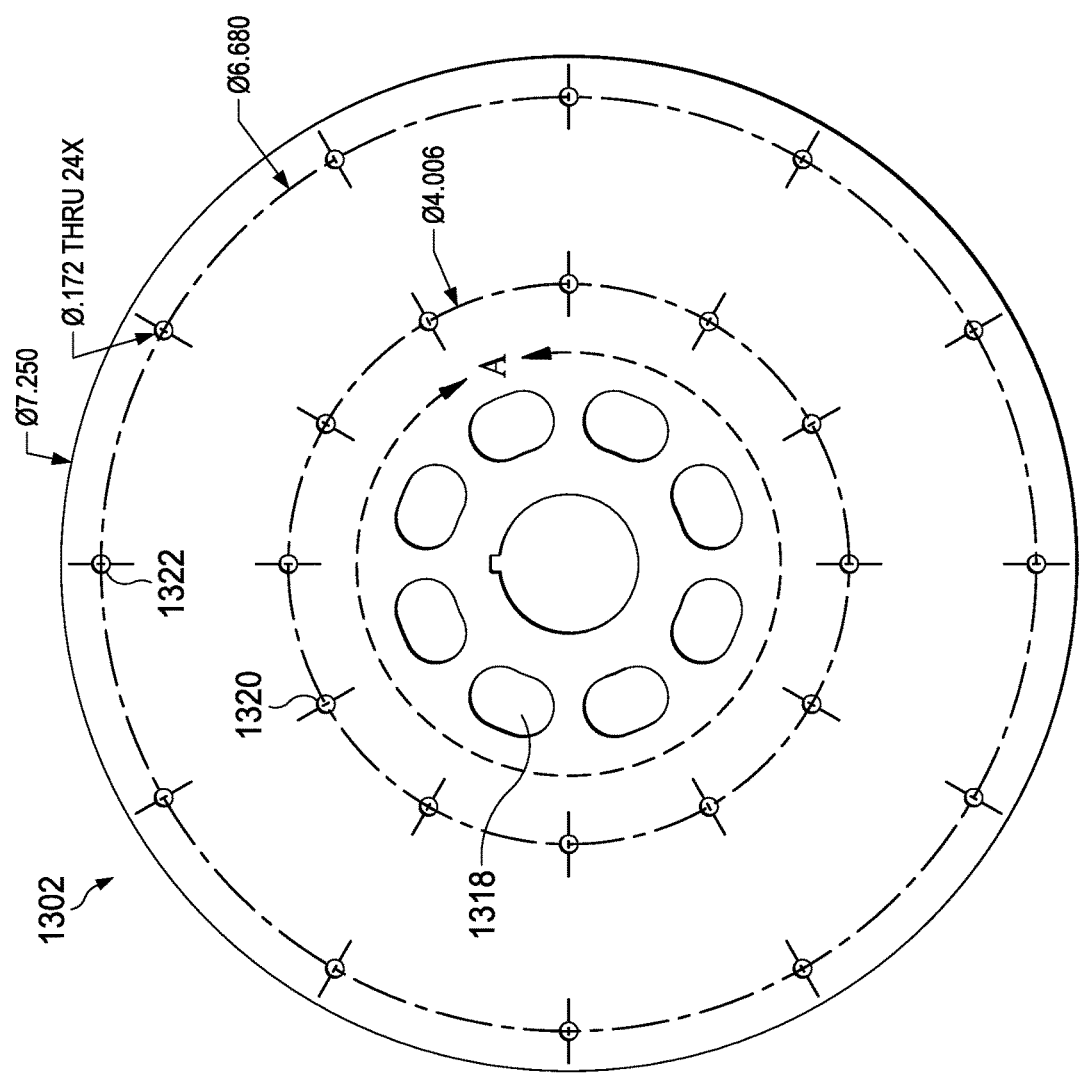
Figure 1:
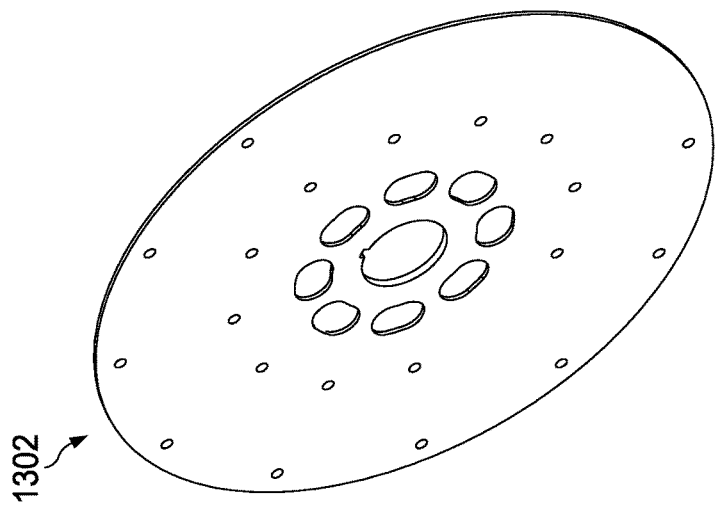
Figures 2, 18B:
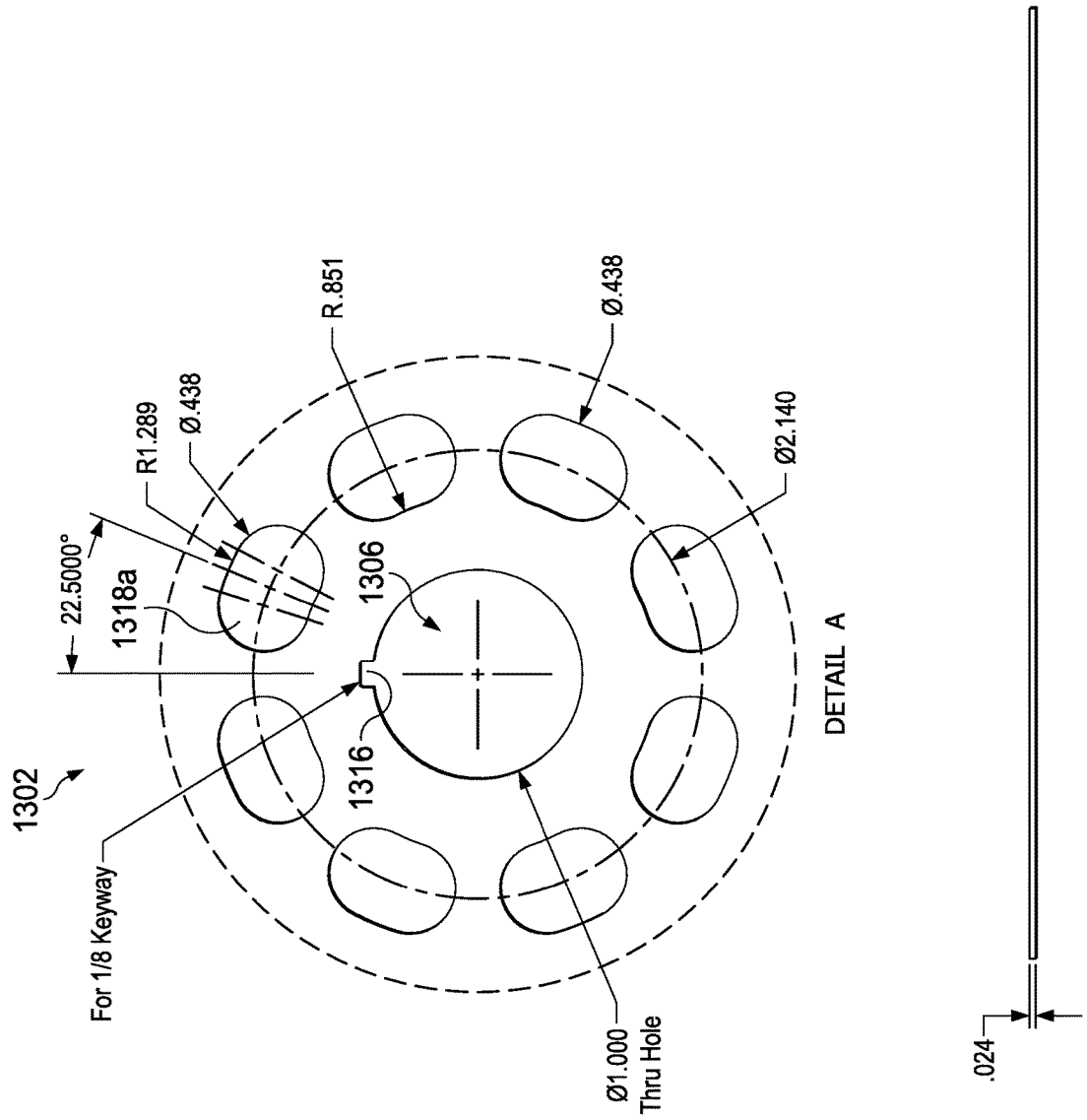
Figures 1, 18C:
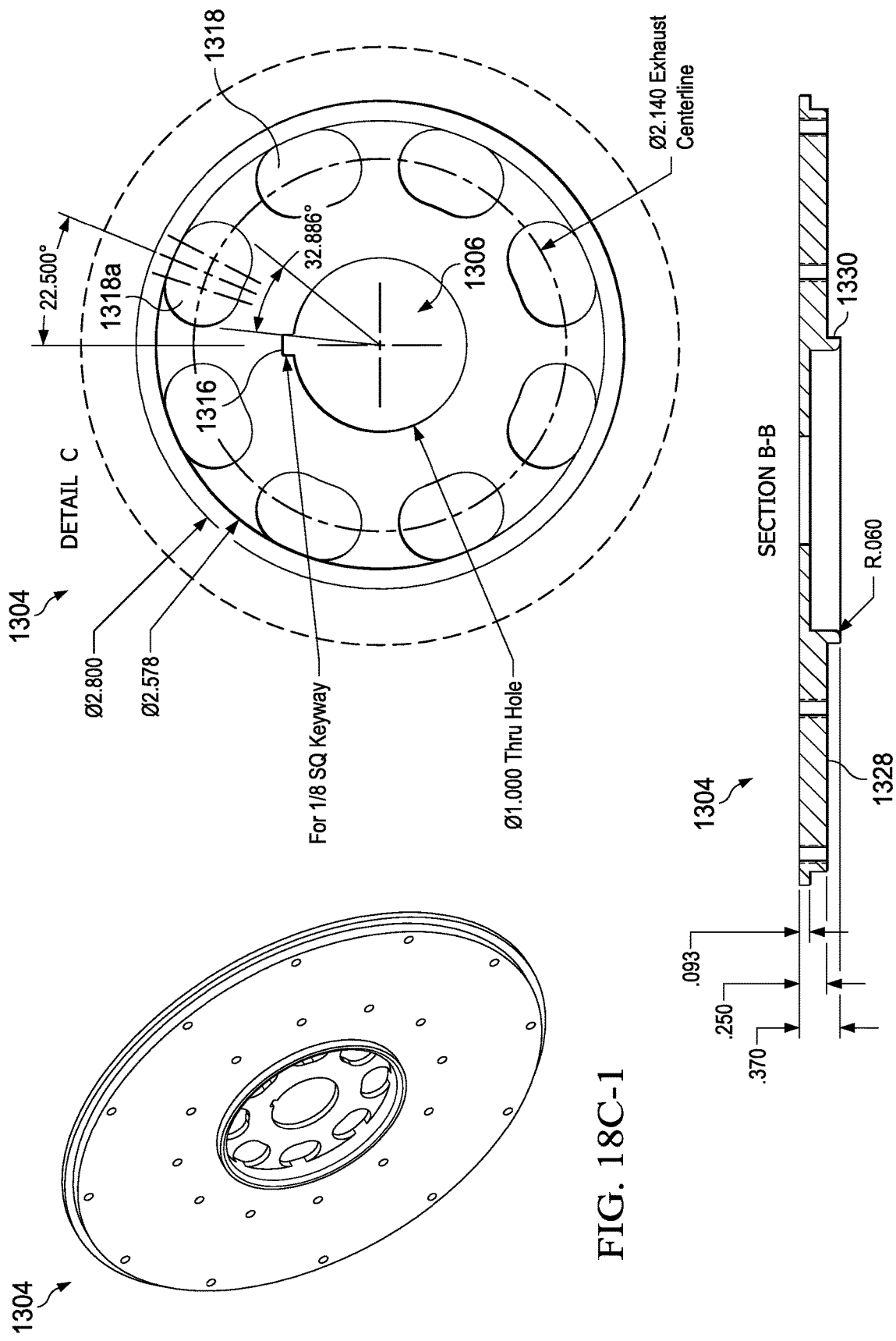
Figures 2, 18C:
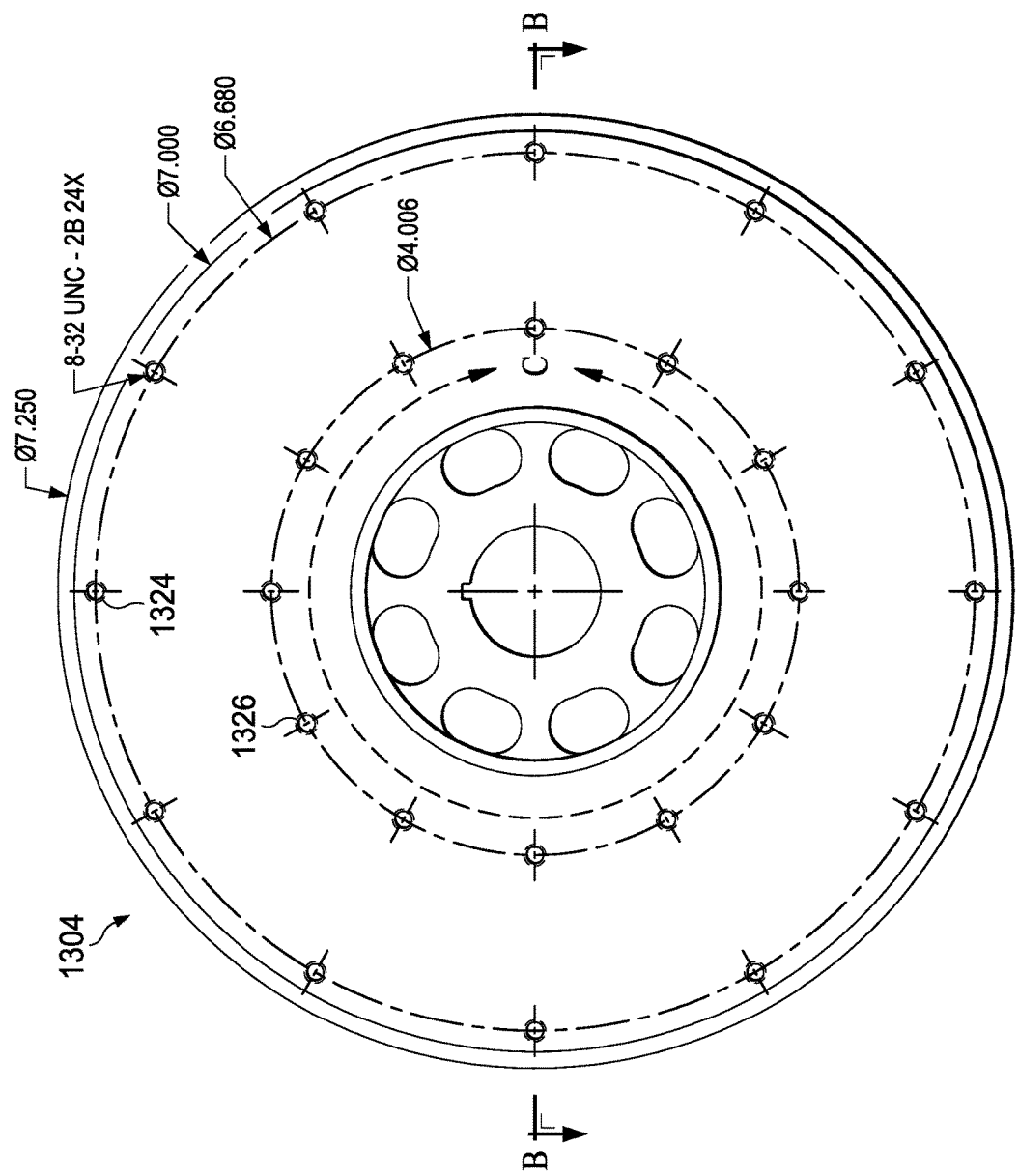

FIGS. 18A-1, 18A-2, 18B-1, 18B-2, 18C-1 and 18C-2 are diagrams of the rear 1300, intermediate 1302 and front 1304 discs, respectively, for the fluid/vapor turbine 1600 shown in FIG. 16. As shown in FIGS. 18A-1 and 18A-2, the rear disc 1300 includes an opening 1306 for the shaft 1500, a set of middle holes 1308 positioned annularly around the opening 1306, a set of outer holes 1310 positioned annularly around the opening 1306, a smaller diameter portion 1312, and a raised annular portion 1314 around the opening 1306. The opening 1306 includes a keyway 1316 for rotationally securing the rear disc 1300 to the shaft 1500. As shown, the set of middle holes 1308 comprises twelve holes equally spaced approximately thirty degrees (30°) from one another within a middle portion of the rear disc 1300 (e.g., at a radius of 2.003 in from the centerline 1228), and the set of outer holes 1310 comprises twelve holes equally spaced approximately thirty degrees (30°) from one another proximate to a perimeter of the rear disc 1300 (e.g., at a radius of about 3.344 in from the centerline 1228). Note that a different number, sizing and spacing (e.g., 15° to 60°) can be used. The smaller diameter portion 1312 fits into the first annular recess 1216 of the main housing 1202. The raised annular portion 1314 contacts the disc stop 1506 of the shaft 1500.

As shown in FIGS. 18B-1 and 18B-2, the intermediate disc 1302 includes an opening 1306 for the shaft 1500, a set of exhaust ports 1318 positioned annularly around the opening 1306, and a set of middle holes 1320 positioned annularly around the opening 1306, a set of outer holes 1322 positioned annularly around the opening 1306. The opening 1306 includes a keyway 1316 for rotationally securing the rear disc 1300 to the shaft 1500. As shown, the set of middle holes 1320 comprises twelve holes equally spaced approximately thirty degrees (30°) from one another within a middle portion of the intermediate disc 1302 (e.g., at a radius of 2.003 in from the centerline 1228), and the set of outer holes 1322 comprises twelve holes equally spaced approximately thirty degrees (30°) from one another proximate to a perimeter of the intermediate disc 1302 (e.g., at a radius of about 3.344 in from the centerline 1228). Note that a different number, sizing and spacing (e.g., 15° to 60°) can be used. The set of exhaust ports 1318 comprise eight ellipse-shaped or oval-shaped holes offset from one another by approximately forty-five degrees (45°) at a equal distance (e.g., 0.969 in) from the centerline 1228. The first exhaust port 1318a is offset from the keyway 1316 by approximately twenty-two and one-half degrees (22.5°). Note that a different number, offset (e.g., 15° to 30°), sizing and spacing (e.g., 30° to 60°) can be used. The pattern, size, and location of the discs in relationship to the turbine shaft 1500 is aerodynamically designed to create a turbulent free flow of exhaust gases from the turbine discs 1300, 1302 and 1304 to the exhaust pipe. The design has a higher flow rate and therefore is less restrictive than other designs. This design (better flow rate) facilities the turbine having a higher adiabatic efficiency. Note that more than one intermediate disc 1302 can be used.

As shown in FIGS. 18C-1 and 18C-2, the front disc 1304 includes an opening 1306 for the shaft 1500, a set of middle holes 1324 positioned annularly around the opening 1306, a set of outer holes 1326 positioned annularly around the opening 1306, a smaller diameter portion 1328, and a raised annular ridge or ring 1330 around the opening 1306. The opening 1306 includes a keyway 1316 for rotationally securing the rear disc 1300 to the shaft 1500. As shown, the set of middle holes 1324 comprises twelve holes equally spaced approximately thirty degrees (30°) from one another within a middle portion of the front disc 1304 (e.g., at a radius of 2.003 in from the centerline 1228), and the set of outer holes 1326 comprises twelve holes equally spaced approximately thirty degrees (30°) from one another proximate to a perimeter of the front disc 1304 (e.g., at a radius of about 3.344 in from the centerline 1228). Note that a different number, sizing and spacing (e.g., 15° to 60°) can be used. The smaller diameter portion 1328 fits into the first annular recess 1230 of the cover 1204. The raised annular ridge or ring 1330 fits into the second annular recess 1232 of the cover 1204. The set of exhaust ports 1318 comprise eight ellipse-shaped or oval-shaped holes offset from one another by approximately forty-five degrees (45°) at a equal distance (e.g., 0.969 in) from the centerline 1228. The first exhaust port 1318a is offset from the keyway 1316 by approximately twenty-two and one-half degrees (22.5°). Note that a different number, offset (e.g., 15° to 30°), sizing and spacing (e.g., 30° to 60°) can be used. The pattern, size, and location of the turbine discs in relationship to the turbine shaft 1500 is aerodynamically designed to create a turbulent free flow of exhaust gases from the turbine discs 1300, 1302 and 1304 to the exhaust pipe. The design has a higher flow rate and therefore is less restrictive than other designs. This design (better flow rate) facilities the turbine having a higher adiabatic efficiency.

Figure 19A:
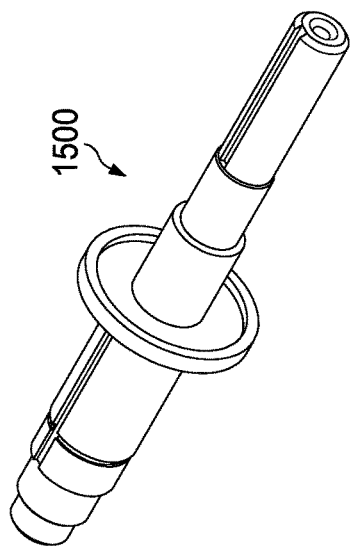
FIGS. 19A and 19B are diagrams of a shaft for the fluid/vapor turbine in shown in FIG. 16.
Figure 19A:
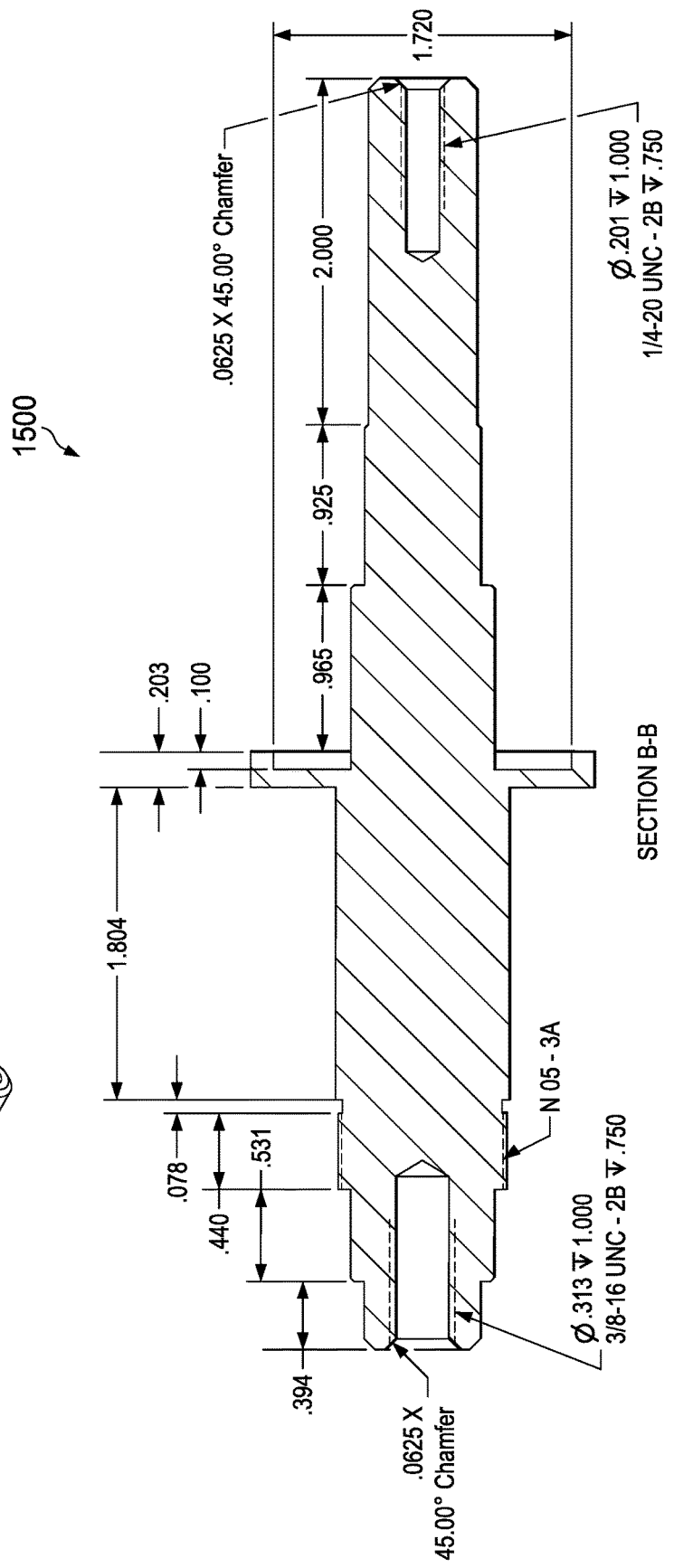
Figure 19B:
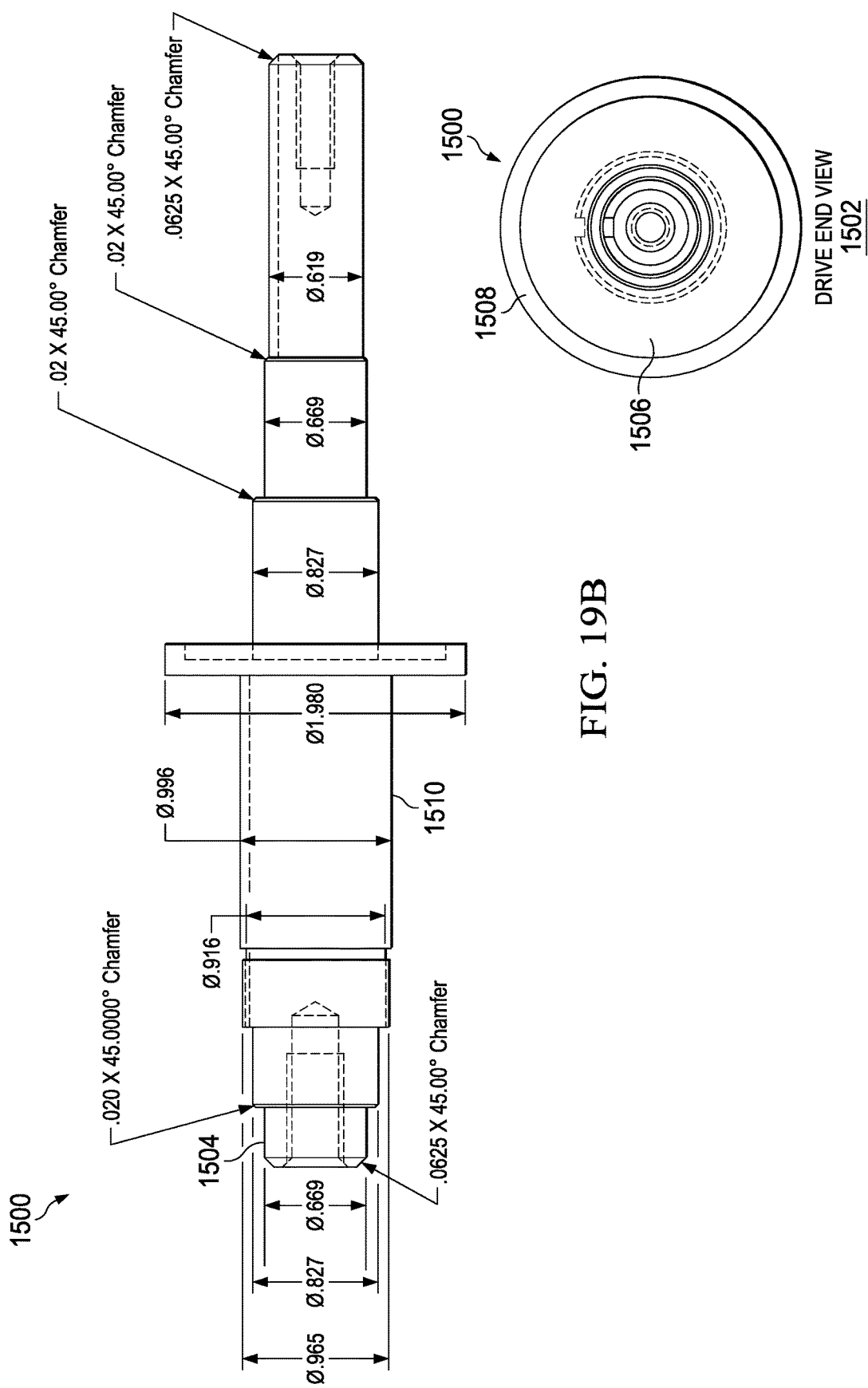
Figures 1, 20A:
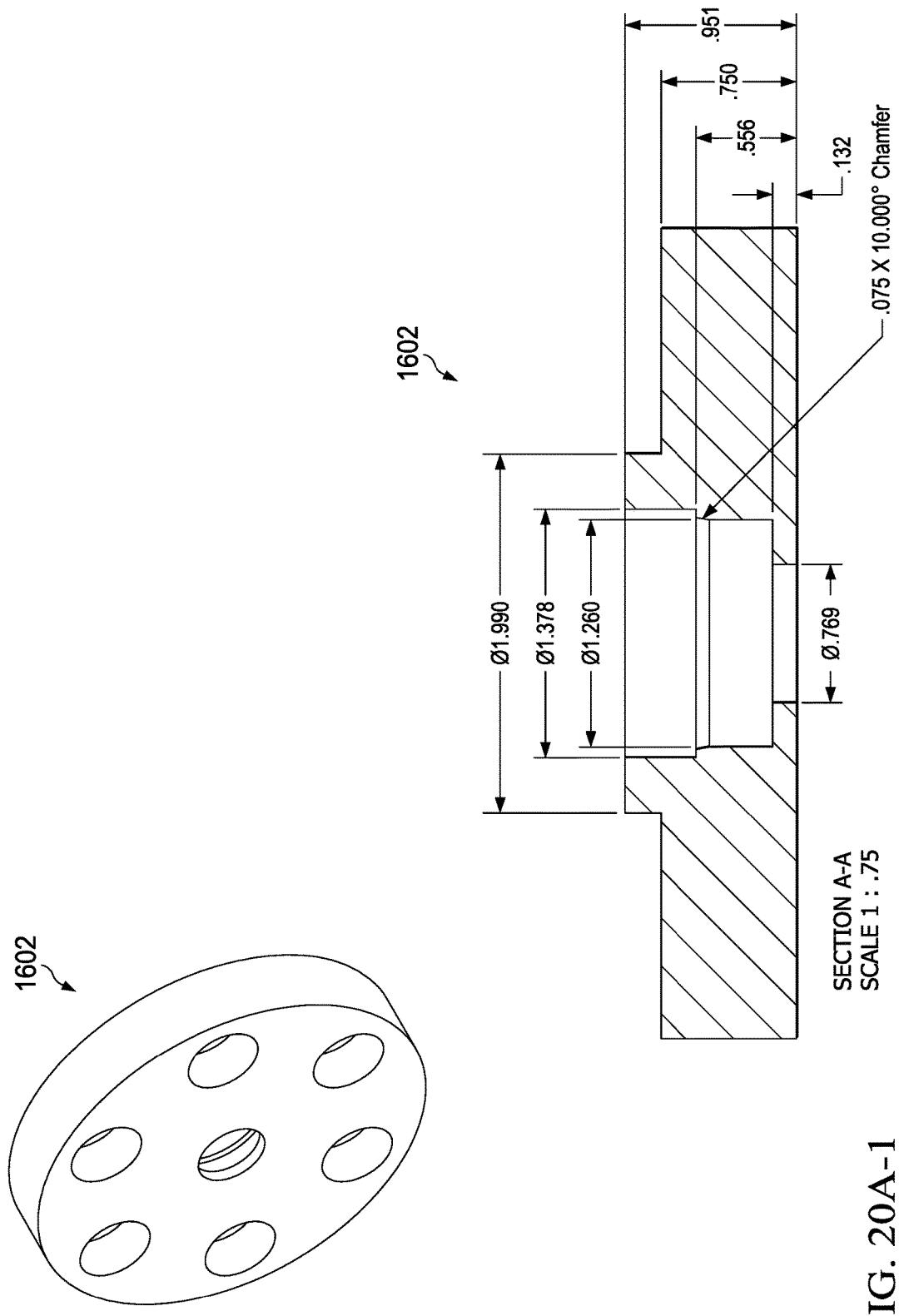
Figures 2, 20A:
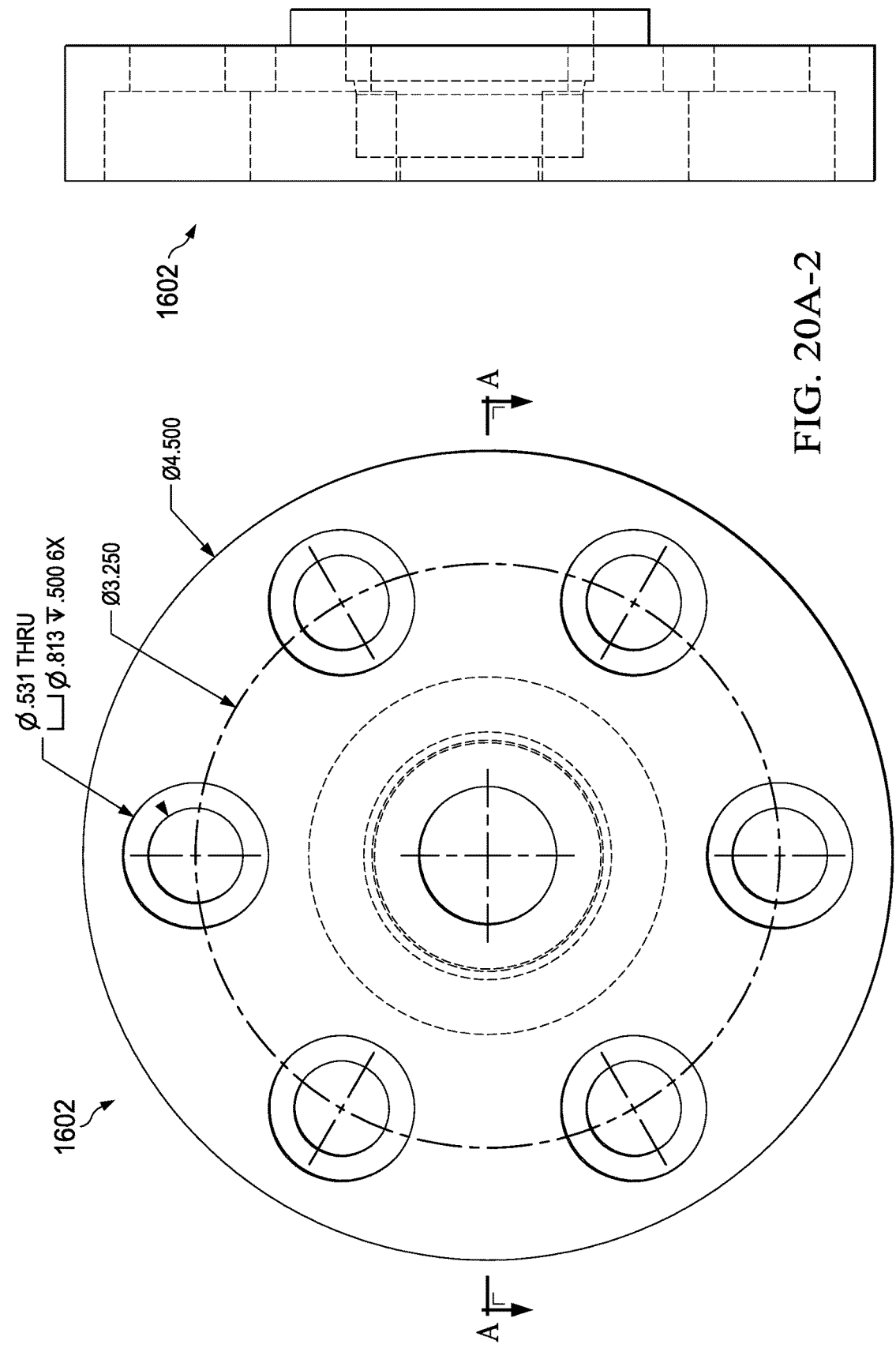

FIGS. 19A and 19B are diagrams of a shaft 1500 for the fluid/vapor turbine 1600 in shown in FIG. 16. The turbine shaft 1500 is a single rotational shaft supporting both the rotating discs 1300, 1302 and 1304 in the fluid/vapor turbine 212 and the rotating parts of a switch reluctance generator 216. The exhaust end 1504 of the shaft 1500 is supported by a first set of bearings 1606 (FIG. 16) located in the bearing cover 1602 (FIGS. 20A-1, 20A-2). The drive end 1502 of the shaft 1500 is supported by a second set of bearings 1608 located in the cover 1204. Designed on the shaft is the labyrinth seal used on the turbine case. As previously described, the shaft 1500 includes a keyway 1510, an annular disc stop 1506 and an annular ridge or ring 1508 on the annular disc stop 1506. FIGS. 20A-1 and 20A-2 are diagrams of a bearing cover 1602 for the fluid/vapor turbine 1600 shown in FIG. 16. FIG. 20B is a diagram of a bearing cover gasket 1604 for the fluid/vapor turbine 1600 shown in FIG. 16.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

What is claimed is:

1. A bladeless turbine comprising:
    three or more turbine discs disposed within a case, wherein each turbine disc has a center opening, a first set of holes substantially equally spaced from one another along a first radius from a centerline, a second set of holes substantially equally spaced from one another along a second radius from the centerline, and two or more of the turbine discs have a set of exhaust ports positioned annularly around the center opening;
    the case comprising a main housing and a cover having the centerline, and one or more fluid/vapor inlets oriented to direct a fluid/vapor onto an outer portion of the three or more turbine discs;
    a drive shaft passing through the center openings of the three or more turbine discs and attached to the three or more turbine discs, wherein the drive shaft is positioned within the case along the centerline, free to rotate within the case, and extends through the main housing;
    a fluid/vapor outlet in the cover and aligned with the centerline; and
    a set of exhaust holes proximate to and connected to the fluid/vapor outlet that are positioned annularly around the drive shaft.

2. The bladeless turbine as recited in claim 1, wherein the fluid/vapor causes the turbine discs to rotate, passes through the set of exhaust ports and the set of exhaust holes, and exits through the fluid/vapor outlet.

3. The bladeless turbine as recited in claim 1, further comprising a connector, injector, jet or nozzle disposed within each fluid/vapor inlet and secured to the case.

4. The bladeless turbine as recited in claim 1, wherein the set of exhaust ports and the set of exhaust holes are ellipse-shaped or oval-shaped.

5. The bladeless turbine as recited in claim 1, further comprising a first gasket between the main housing and the cover, and a labyrinth seal formed by shape and positioning of the turbine discs, the main housing, the case and the drive shaft.

6. The bladeless turbine as recited in claim 1, wherein the first radius is within a middle portion of the turbine disc, the second radius is proximate to a perimeter of the turbine disc, and the holes are spaced approximately 30 degrees from one another.

7. The bladeless turbine as recited in claim 1, further comprising:
    a center through hole within the case opposite the cover and aligned with the centerline;
    a bearing cover attached to the case and aligned with the center through hole;
    a bearing cover gasket disposed between the case and the bearing cover;
    one or more sets of first bearings disposed within the bearing cover that support the drive shaft; and
    one or more sets of second bearings disposed within the cover of the case that support the drive shaft.

8. The bladeless turbine as recited in claim 1, wherein:
    the center opening includes a keyway for rotationally securing each turbine disc to the drive shaft;
    the first set of holes comprise a set of twelve middle holes substantially equally spaced approximately thirty degrees from one another along the first radius from the centerline, wherein the first radius is within a middle portion of each turbine disc;
    the second set of holes comprise a set of twelve outer holes substantially equally spaced approximately thirty degrees from one another along the second radius from the centerline, wherein the second radius is proximate to a perimeter of each turbine disc;
    each set of exhaust ports comprise eight ellipse-shaped or oval-shaped holes offset from one another by approximately forty-five degrees at a equal distance from the centerline;
    the three or more turbine discs comprise a rear disc, one or more intermediate discs and a front disc;
    the main housing, and a raised annular portion around the center opening for the drive shaft that fits into the first annular recess of the main housing;
    the one or more intermediate discs includes the set of exhaust ports positioned annularly around the center opening; and
    the front disc includes the set of exhaust ports positioned annularly around the center opening, a smaller diameter portion that fits into a first annular recess of the cover, and a raised annular ridge or ring around the opening that fits into a second annular recess of the cover.

9. The bladeless turbine as recited in claim 1, wherein:
    the main housing comprises an annular cavity in which the three or more turbine discs are free to rotate, a center through hole for a drive end of the drive shaft to extend through, and two holes oriented on opposite sides of the main housing, wherein a bottom of the annular cavity includes a first annular recess to receive a portion of one of the three or more turbine discs, and a second annular recess to receive a ridge on an annular disc stop of the drive shaft and an annular groove to receive an annular ridge or ring on the annular disc stop of the drive shaft;
    the cover having an exhaust outlet, a set of eight ellipse-shaped or oval-shaped exhaust holes positioned proximate to a perimeter of the exhaust outlet and equally spaced around the drive shaft at a fixed distance from the centerline, a recess or opening for an exhaust end of the drive shaft, a first annular recess to receive a portion of one of the three or more turbine discs, a second annular recess to receive an annular ridge or ring one of the three or more turbine discs, and wherein a portion of the cover extends into the annular cavity and the cover is affixed to the main housing; and the drive shaft comprises a single rotational shaft supporting the three or more turbine discs, and includes a keyway, the annular disc stop, and the annular ridge or ring on the annular disc stop.

10. A bladeless turbine comprising:

three or more turbine discs disposed within a main housing, wherein each turbine disc has a center opening, a first set of holes substantially equally spaced from one another along a first radius from the centerline, a second set of holes substantially equally spaced from one another along a second radius from the centerline, and two or more of the turbine discs have a set of exhaust ports positioned annularly around the center opening;

the main housing comprising an annular cavity in which the three or more turbine discs are free to rotate, one or more fluid/vapor inlets oriented to direct a fluid/vapor onto an outer portion of the three or more turbine discs, a center through hole for a drive end of a drive shaft to extend through, and two holes oriented on opposite sides of the main housing, wherein a bottom of the annular cavity includes a first annular recess to receive a portion of one of the three or more turbine discs, and a second annular recess to receive a ridge on an annular disc stop of the drive shaft and an annular groove to receive an annular ridge or ring on the annular disc stop of the drive shaft;

a cover having an exhaust outlet, a set of eight ellipse-shaped or oval-shaped exhaust holes positioned proximate to a perimeter of the exhaust outlet and equally spaced around the drive shaft at a fixed distance from the centerline, a recess or opening for an exhaust end of the drive shaft, a first annular recess to receive a portion of one of the three or more turbine discs, a second annular recess to receive an annular ridge or ring one of the three or more turbine discs, and wherein a portion of the cover extends into the annular cavity and the cover is affixed to the main housing;

a drive shaft comprises a single rotational shaft passing through the center openings of the three or more turbine discs and attached to the three or more turbine discs, and includes a keyway, the annular disc stop, and the annular ridge or ring on the annular disc stop;

a fluid/vapor outlet in the cover and aligned with the centerline;

a set of exhaust holes proximate to and connected to the fluid/vapor outlet that are positioned annularly around the drive shaft;

a first gasket between the main housing and the cover, and a labyrinth seal formed by shape and positioning of the turbine discs, the main housing, the case and the drive shaft;

a bearing cover attached to the case and aligned with the center through hole;

a bearing cover gasket disposed between the case and the bearing cover;

one or more sets of first bearings disposed within the bearing cover that support the drive shaft; and one or more sets of second bearings disposed within the cover of the case that support the drive shaft.

11. The bladeless turbine as recited in claim 10, further comprising a connector, injector, jet or nozzle disposed within each fluid/vapor inlet and secured to the case.

12. The bladeless turbine as recited in claim 10, wherein the first radius is within a middle portion of the turbine disc, the second radius is proximate to a perimeter of the turbine disc, and the holes are spaced approximately 30 degrees from one another.

13. The bladeless turbine as recited in claim 10, wherein:

the center opening includes a keyway for rotationally securing each turbine disc to the drive shaft;

the first set of holes comprise a set of twelve middle holes substantially equally spaced approximately thirty degrees from one another along the first radius from the centerline, wherein the first radius is within a middle portion of each turbine disc;

the second set of holes comprise a set of twelve outer holes substantially equally spaced approximately thirty degrees from one another along the second radius from the centerline, wherein the second radius is proximate to a perimeter of each turbine disc each set of exhaust ports comprise eight ellipse-shaped or oval-shaped holes offset from one another by approximately forty-five degrees at a equal distance from the centerline;

the three or more turbine discs comprise a rear disc, one or more intermediate discs and a front disc;

the rear disc includes a smaller diameter portion that fits into a first annular recess of the main housing, and a raised annular portion around the center opening for the drive shaft that fits into the first annular recess of the main housing;

the one or more intermediate discs includes the set of exhaust ports positioned annularly around the center opening; and the front disc includes the set of exhaust ports positioned annularly around the center opening, a smaller diameter portion that fits into a first annular recess of the cover, and a raised annular ridge or ring around the opening that fits into a second annular recess of the cover.

14. A solar power system comprising:

one or more solar collectors, each solar collector comprising (a) one or more support structures for securely mounting the solar collector to a surface, (b) a reflective parabolic trough for concentrating solar energy along a focal axis and attached to the support structure(s) to allow rotation of the reflective parabolic trough around a longitudinal axis, (c) one or more receiver tubes attached to the reflective parabolic trough along the focal axis, wherein each receiver tube comprises (i) a metal tube having an inlet, an outlet and a solar absorption coating, and (ii) a transparent tube having a first seal and a second seal to vacuum or hermetically seal the metal tube between approximately the inlet and the outlet within the transparent tube, and (d) a motor operably connected to the reflective parabolic trough to rotate the reflective parabolic trough around the longitudinal axis;

a solar tracking device having one or more sensors to control the motor to align each solar collector to maximize the solar energy collected by the one or more receiver tubes;

a bladeless fluid/vapor turbine comprising: (a) three or more turbine discs disposed within a case, wherein each turbine disc has a center opening, a first set of holes substantially equally spaced from one another along a first radius from a centerline, a second set of holes substantially equally spaced from one another along a second radius from the centerline, and two or more of the turbine discs have a set of exhaust ports positioned annularly around the center opening, (b) the case comprising a main housing and a cover having the centerline, and one or more fluid/vapor inlets connected to the outlet of the receiver tube(s) and oriented to direct a fluid/vapor onto an outer portion of the three or more turbine discs, (c) a drive shaft passing through the center openings of the three or more turbine discs and attached to the three or more turbine discs, wherein the drive shaft is positioned within the case along the centerline, free to rotate within the case, and extends through the main housing, (d) a fluid/vapor outlet in the cover that is aligned with the centerline connected to the inlet of the receiver tube(s), and (e) a set of exhaust holes proximate to and connected to the fluid/vapor outlet that are positioned annularly around the drive shaft;

the generator connected to the drive shaft of the fluid/vapor turbine and having one or more electrical output terminals; and a controller connected to the motor, the solar tracking device, the fluid/vapor turbine and the generator to monitor and control the system.

15. The solar power system as recited in claim 14, wherein the one or more sensors of the solar tracking device comprises three or more photosensitive diodes disposed on the reflective parabolic trough such that when the reflective parabolic through is properly aligned: at least a first of the photosensitive diodes is positioned within a center of a shadow cast by the receiver tube(s), a least a second of the photosensitive diodes is positioned within and near a first edge of the shadow cast by the receiver tube(s), and a least a third of the photosensitive diodes is positioned within and near a second edge of the shadow cast by the receiver tube(s).

16. The solar power system as recited in claim 14, wherein the solar tracking device will position the solar collector at a previously recorded time-based position whenever the one or more sensors do not provide a position to maximize the solar energy collected by the receiver tube(s).

17. The solar power system as recited in claim 14, wherein the solar tracking device aligns each solar collector to maximize the solar energy collected by the receiver tube(s) regardless of weather conditions.

18. The solar power system as recited in claim 14, wherein the controller positions each solar collector to minimize damage in potentially damaging weather.

19. The solar power system as recited in claim 14, further comprising a user interface installed on a user device communicably coupled to the controller.

20. The solar power system as recited in claim 14, further comprising:
a pressure vessel connected between the inlet of the receiver tube(s) and the fluid/vapor outlet of the fluid/vapor turbine;
a first operating pressure modulation valve and a temperature/pressure sensor connected between the outlet of the receiver tube(s) and the fluid/vapor inlet of the fluid/vapor turbine; and
a second operating pressure modulation valve connected between the pressure vessel and the inlet of the receiver tube(s).

21. The solar power system as recited in claim 20, further comprising a primer/boost pump connected between the pressure vessel and the second operating pressure modulation valve.

22. The solar power system as recited in claim 20, further comprising:

a secondary line connecting the pressure vessel to a hose or pipe between the outlet of the receiver tube(s) and the first operating pressure modulation valve;
a third operating pressure modulation valve disposed in the secondary line; and
a back flow prevention valve connected between the fluid/vapor outlet of the fluid/vapor turbine and the pressure vessel.

23. The solar power system as recited in claim 20, further comprising:
a pressure relief valve attached to the pressure vessel;
a fluid level sensor attached to the pressure vessel and communicably coupled to the controller;
one or more additional temperature sensor and/or pressure sensors attached at various points in the system;
one or more heat exchangers attached within the system; and
a RPM sensor attached to the drive shaft and communicably coupled to the controller.

24. The solar power system as recited in claim 14, further comprising a connector, injector, jet or nozzle disposed within each fluid/vapor inlet and secured to the case.

25. The solar power system as recited in claim 14, wherein the set of exhaust ports and the set of exhaust holes are ellipse-shaped or oval-shaped.

26. The solar power system as recited in claim 14, further comprising a first gasket between the main housing and the cover, and a labyrinth seal formed by shape and positioning of the turbine discs, the main housing, the case and the drive shaft.

27. The solar power system as recited in claim 14, wherein the first radius is within a middle portion of the turbine disc, the second radius is proximate to a perimeter of the turbine disc, and the holes are spaced approximately 30 degrees from one another.

28. The solar power system as recited in claim 14, further comprising;
a center through hole within the case opposite the cover and aligned with the centerline;
a bearing cover attached to the case and aligned with the center through hole;
a bearing cover gasket disposed between the case and the bearing cover;
one or more sets of first bearings disposed within the bearing cover that support the drive shaft; and
one or more sets of second bearings disposed within the cover of the case that support the drive shaft.

29. The solar power system as recited in claim 14, wherein:
the center opening includes a keyway for rotationally securing each turbine disc to the drive shaft;
the first set of holes comprise a set of twelve middle holes substantially equally spaced approximately thirty degrees from one another along the first radius from the centerline, wherein the first radius is within a middle portion of each turbine disc;
the second set of holes comprise a set of twelve outer holes substantially equally spaced approximately thirty degrees from one another along the second radius from the centerline, wherein the second radius is proximate to a perimeter of each turbine disc;
each set of exhaust ports comprise eight ellipse-shaped or oval-shaped holes offset from one another by approximately forty-five degrees at a equal distance from the centerline;
the three or more turbine discs comprise a rear disc, one or more intermediate discs and a front disc;

the rear disc includes a smaller diameter portion that fits into a first annular recess of the main housing, and a raised annular portion around the center opening for the drive shaft that fits into the first annular recess of the main housing;

the one or more intermediate discs includes the set of exhaust ports positioned annularly around the center opening; and the front disc includes the set of exhaust ports positioned annularly around the center opening, a smaller diameter portion that fits into a first annular recess of the cover, and a raised annular ridge or ring around the opening that fits into a second annular recess of the cover.

30. The solar power system as recited in claim 14, wherein:

the main housing comprises an annular cavity in which the one or more turbine discs are free to rotate, a center through hole for a drive end of the drive shaft to extend through, and two holes oriented on opposite sides of the main housing, wherein a bottom of the annular cavity includes a first annular recess to receive a portion of one of the three or more turbine discs, and a second annular recess to receive a ridge on an annular disc stop of the drive shaft and an annular groove to receive an annular ridge or ring on the annular disc stop of the drive shaft;

the cover having an exhaust outlet, a set of eight ellipse-shaped or oval-shaped exhaust holes positioned proximate to a perimeter of the exhaust outlet and equally spaced around the drive shaft at a fixed distance from the centerline, a recess or opening for an exhaust end of the drive shaft, a first annular recess to receive a portion of one of the three or more turbine discs, a second annular recess to receive an annular ridge or ring one of the three or more turbine discs, and wherein a portion of the cover extends into the annular cavity and the cover is affixed to the main housing; and the drive shaft comprises a single rotational shaft supporting the three or more turbine discs, and includes a keyway, the annular disc stop, and the annular ridge or ring on the annular disc stop.

\* \* \* \* \*